United States Patent
Nango et al.

(10) Patent No.: US 9,810,389 B2
(45) Date of Patent: Nov. 7, 2017

(54) PLANAR OPTICAL MEMBER AND DAYLIGHTING DEVICE

(71) Applicant: SHARP KABUSHIKI KAISHA, Osaka-shi, Osaka (JP)

(72) Inventors: Tomoko Nango, Osaka (JP); Tsuyoshi Kamada, Osaka (JP); Shun Ueki, Osaka (JP); Takashi Katayama, Osaka (JP); Kazuyoshi Sakuragi, Osaka (JP); Masahiro Tsujimoto, Osaka (JP); Daisuke Shinozaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 15/024,117

(22) PCT Filed: Sep. 25, 2014

(86) PCT No.: PCT/JP2014/075435
§ 371 (c)(1),
(2) Date: Mar. 23, 2016

(87) PCT Pub. No.: WO2015/046336
PCT Pub. Date: Apr. 2, 2015

(65) Prior Publication Data
US 2016/0223155 A1    Aug. 4, 2016

(30) Foreign Application Priority Data

Sep. 26, 2013 (JP) .................................. 2013-200184
Jun. 17, 2014 (JP) .................................. 2014-124693

(51) Int. Cl.
*F21S 11/00* (2006.01)
*E06B 9/24* (2006.01)
(Continued)

(52) U.S. Cl.
CPC ............. *F21S 11/007* (2013.01); *E06B 7/082* (2013.01); *E06B 9/24* (2013.01); *E06B 9/28* (2013.01);
(Continued)

(58) Field of Classification Search
CPC ......... F21S 11/007; E06B 9/28; G02B 5/0278
(Continued)

(56) References Cited

U.S. PATENT DOCUMENTS 4,773,733 A  *  9/1988  Murphy, Jr. ............ E06B 9/386
                                                    160/176.1 R
9,429,288 B2 *  8/2016  Ueki ....................... E06B 9/386
(Continued)

FOREIGN PATENT DOCUMENTS

JP         9-282916        10/1997
JP         2004-538399     12/2004
(Continued)

OTHER PUBLICATIONS

International Search Report for PCT/JP2014/075435 dated Dec. 2, 2014, 2 pages.
(Continued)

*Primary Examiner* — Christopher Mahoney
(74) *Attorney, Agent, or Firm* — Nixon & Vanderhye P.C.

(57) ABSTRACT

A daylighting device of the present invention is provided with a planar optical member 1 and a support member. The planar optical member 1 is provided with a planar structure body which has a plurality of linear bodies 3 formed of optically transparent materials which are arrayed substantially in parallel and a plurality of binding members which are arranged in a direction which intersects with the plurality of the linear bodies 3 and which bind the plurality of the linear bodies 3 in a state of being arrayed substantially in parallel. The linear bodies 3 have reflective surfaces which
(Continued)

reflect light which is incident to the linear body 3 along a direction which intersects with a length direction of the linear body 3 and refractive surfaces which refract the light. In at least a part of a planar structure body, the orientations of reflective surfaces of at least some of the linear bodies out of the plurality of linear bodies 3 substantially match and the orientations of the refractive surfaces of at least some of the linear bodies substantially match.

20 Claims, 57 Drawing Sheets

(51) Int. Cl.
<br>    *E06B 7/082*     (2006.01)
<br>    *E06B 9/28*     (2006.01)
<br>    *G02B 5/04*     (2006.01)
<br>    *G02B 5/02*     (2006.01)
<br>    *G02B 7/182*     (2006.01)
<br>    *G02B 19/00*     (2006.01)

(52) U.S. Cl.
<br>    CPC ........... *G02B 5/0278* (2013.01); *G02B 5/045* (2013.01); *G02B 7/1822* (2013.01); *G02B 19/0028* (2013.01); *E06B 2009/2417* (2013.01); *F21S 11/00* (2013.01); *G02B 2207/123* (2013.01)

(58) Field of Classification Search
<br>    USPC .......... 359/596; 160/174, 175, 166.1, 136 R; 442/50
<br>See application file for complete search history.

(56) References Cited

U.S. PATENT DOCUMENTS

| | | |
|---|---|---|
| 2005/0022945 A1 | 2/2005 | Clauss |
| 2015/0129140 A1* | 5/2015 | Dean .......................... E06B 9/24 160/5 |
| 2016/0178164 A1* | 6/2016 | Nishida ................... E06B 9/303 359/596 |

FOREIGN PATENT DOCUMENTS

| | | |
|---|---|---|
| JP | 2012-235992 | 12/2012 |
| JP | 2013-155569 | 8/2013 |

OTHER PUBLICATIONS

Written Opinion of the ISA for PCT/JP2014/075435 dated Dec. 2, 2014, 3 pages.

* cited by examiner

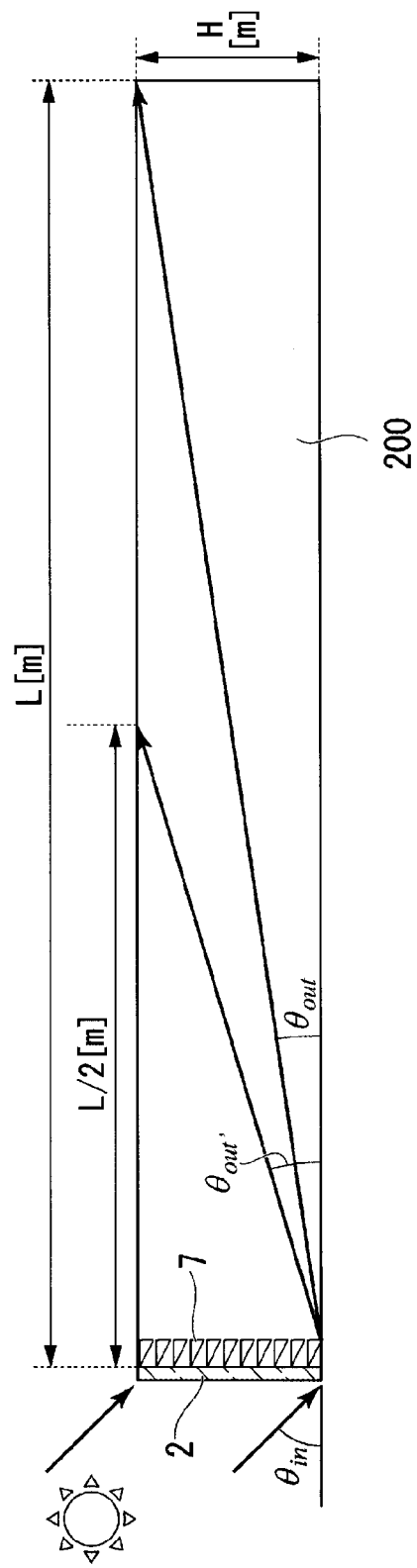

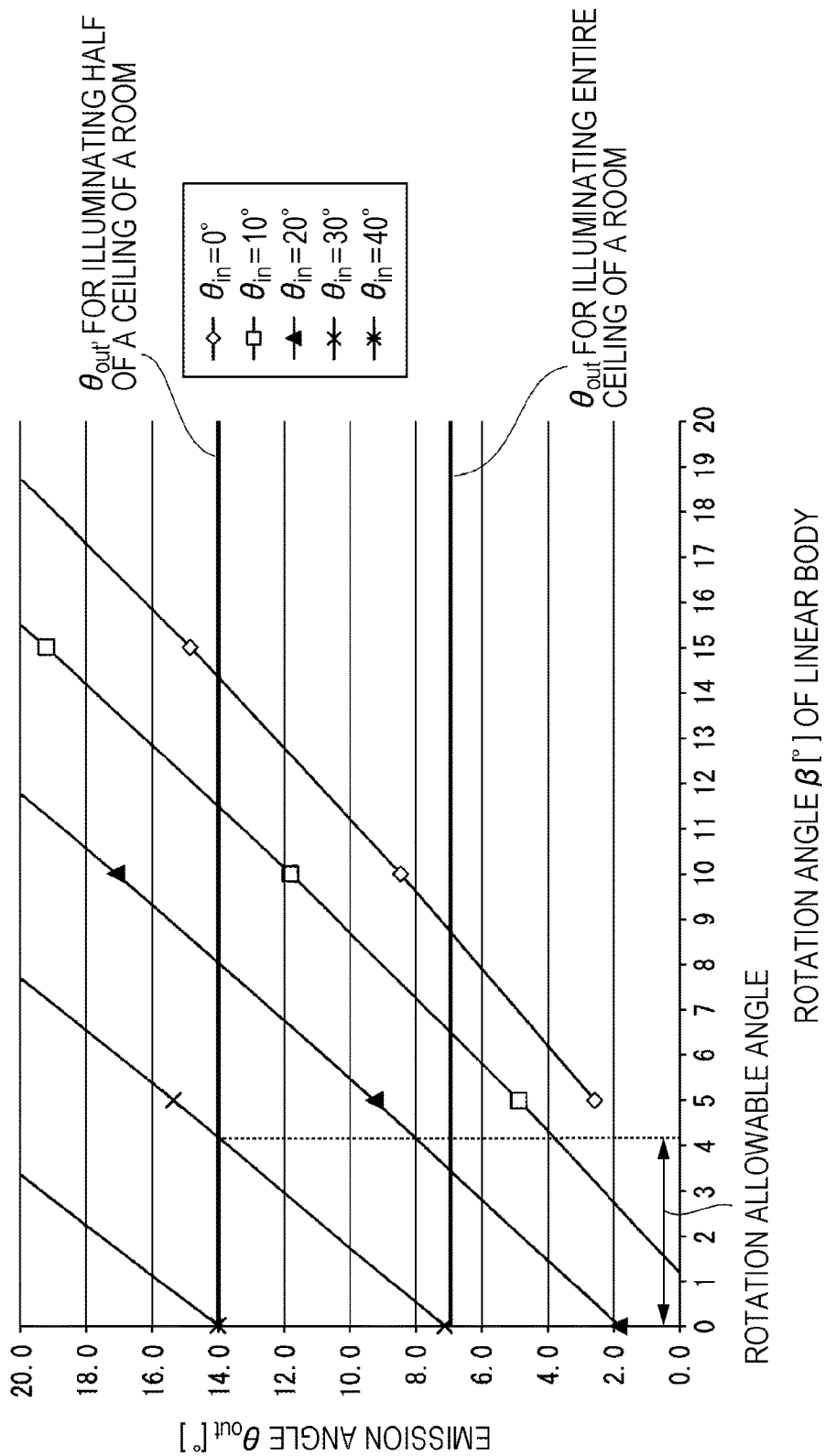

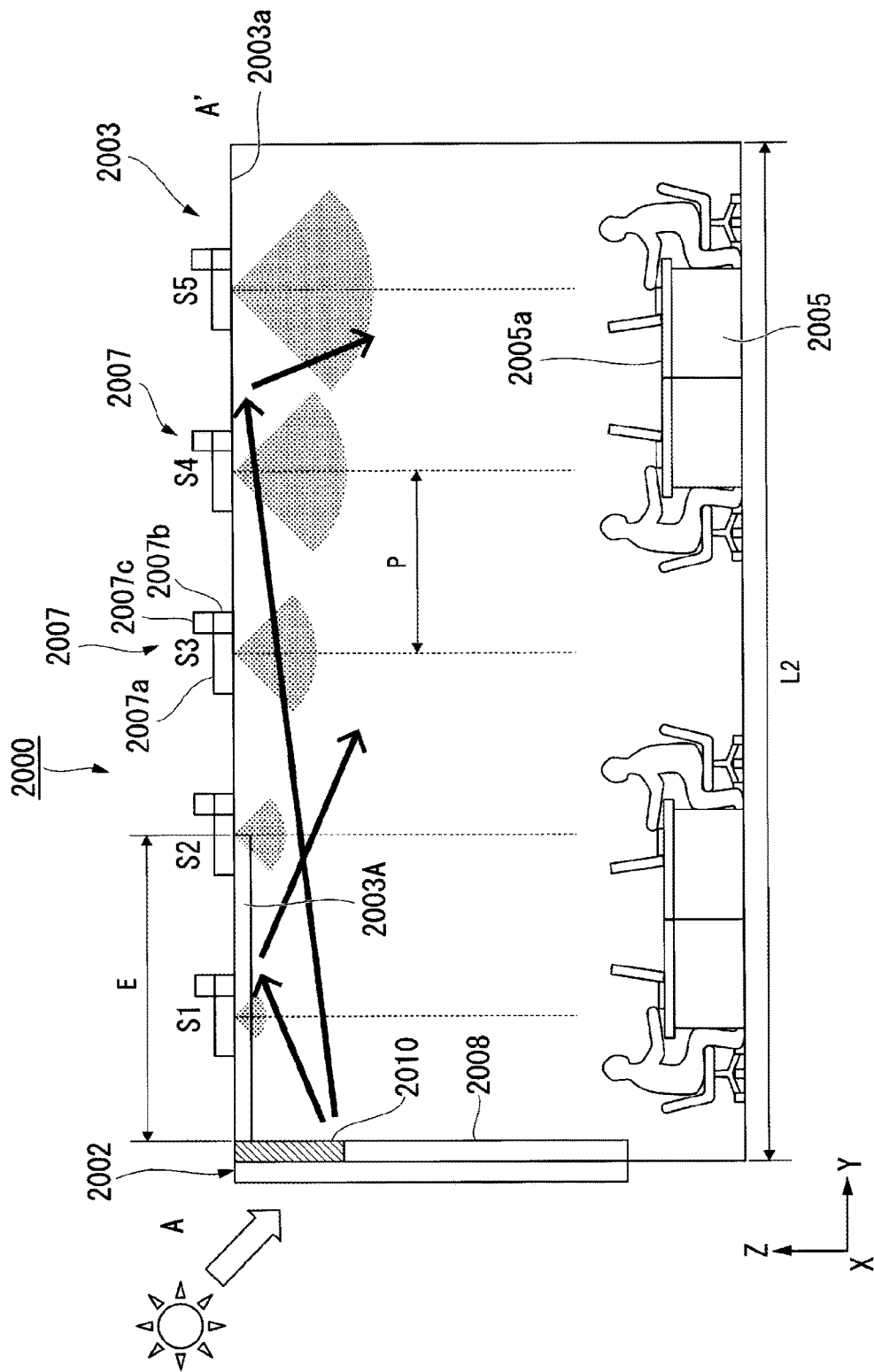

PLANAR OPTICAL MEMBER AND DAYLIGHTING DEVICE

TECHNICAL FIELD

The present invention relates to a planar optical member and a daylighting device.

This application is the U.S. national phase of International Application No. PCT/JP2014/075435 filed Sep. 25, 2014 which designated the U.S. and claims priority to Japanese Patent Application No. 2013-200184 which was applied for on Sep. 26, 2013 in Japan and Japanese Patent Application No. 2014-124693 which was applied for on Jun. 17, 2014 in Japan, the entire contents of each of which are hereby incorporated by reference.

BACKGROUND ART

A solar lighting device has been proposed as a means for taking sunlight into a room through a window or the like of a building (refer to PTL 1). The solar lighting device is provided with an optically transparent body or a reflecting body formed of textiles in which a large number of monofilaments or bar-shaped bodies having circular cross-sections are woven. In addition, bamboo blinds which are hung inside or outside of a building and which exhibit an excellent light collecting property are proposed (refer to PTL 2). The bamboo blinds are provided with a plurality of tubular or bar-shaped horizontal members which are arranged at intervals.

CITATION LIST

Patent Literature

PTL 1: Japanese Unexamined Patent Application Publication No. 9-282916
PTL 2: Japanese Unexamined Patent Application Publication No. 2012-235992

SUMMARY OF INVENTION

Technical Problem

In the solar lighting device in PTL 1, sunlight enters a room after being scattered on the surfaces of the monofilaments or bar-shaped bodies. That is, the solar lighting device takes in light in a room using light scattered on the surfaces of monofilaments or bar-shaped bodies. Therefore, the light which is reflected by the surfaces of the monofilaments or the bar-shaped bodies radiates in various directions from the floor to the ceiling. As a result, since the light directly enters the field of view of a user, the user experiences glare. In addition, since light scattering is used, there are light beam components going toward the floor and the light utilization efficiency is not high. Since the bamboo blinds in PTL 2 also use light scattering on the surface of the horizontal members, the bamboo blinds in PTL 2 have the same problem as the solar lighting device described above.

One aspect of the present invention has been made in order to solve the problems described above and has an object of providing a daylighting device with which the user experiences little glare and of which the light utilization efficiency is high. In addition, one aspect of the present invention has an object of providing a favorable planar optical member which is used in this type of daylighting device.

Solution to Problem

In order to achieve the object described above, there is provided a planar optical member according to an aspect of the present invention including a planar structure body which has a plurality of linear bodies formed of optically transparent materials which are arrayed substantially in parallel and a plurality of binding members which are arranged in a direction which intersects with the plurality of the linear bodies and which bind the plurality of the linear bodies in a state of being arrayed substantially in parallel, in which the linear bodies have a reflective surface which reflects light which is incident to the linear bodies along a direction which intersects with a length direction of the linear body, and a refractive surface which refracts the light, and, in at least a part of the planar structure body, orientations of the reflective surfaces of at least some of the linear bodies out of the plurality of the linear bodies substantially match, and orientations of the refractive surfaces of at least some of the linear bodies out of the plurality of the linear bodies substantially match.

In the planar optical member according to the aspect of the present invention, the linear bodies have a first portion and a second portion at different positions in the length directions of the linear bodies, and a shape or dimensions of a cross-section of the first portion may be different from a shape or dimensions of a cross-section of the second portion.

In the planar optical member according to the aspect of the present invention, each of the plurality of the linear bodies may have the first portion and the second portion of which dimensions of a cross-section are smaller than the first portion.

In such a case, the binding members may be stretched over the second portions of the plurality of linear bodies to bind the plurality of linear bodies.

In the planar optical member according to the aspect of the present invention, some of the linear bodies out of the plurality of the linear bodies may have a linking section which integrally links the linear bodies which are adjacent to each other.

In the planar optical member according to the aspect of the present invention, the planar structure body may be a planar structure body where one of the plurality of the linear bodies and the plurality of the binding members is set as weft and the other is set as warp and the weft and the warp are knitted.

In the planar optical member according to the aspect of the present invention, the linear bodies may have holes which pass therethrough in a direction which intersects with a length direction of the linear body. In such a case, the binding members may bind the plurality of the linear bodies in a state of being inserted through the holes in the plurality of the linear bodies.

In the planar optical member according to the aspect of the present invention, a cyclic spacer may be arranged between the linear bodies which are adjacent to each other. In such a case, the binding member may be inserted in the spacer.

In the planar optical member according to the aspect of the present invention, the plurality of the linear bodies may include two or more types of linear bodies where cross-sectional shapes orthogonal to a length direction are different from each other.

The planar optical member according to the aspect of the present invention may further include a plurality of the planar structure bodies. In such a case, the plurality of the planar structure bodies may be laminated in a direction which is orthogonal to a main surface.

In the planar optical member according to the aspect of the present invention, out of the plurality of the planar structure bodies, the binding members may be exchanged with each other between two of the planar structure bodies which are adjacent to each other in a laminated direction.

The planar optical member according to the aspect of the present invention may further include a linear light shielding member which is arranged substantially in parallel to the linear bodies in at least a part of at least one of the planar structure bodies out of the plurality of the planar structure bodies.

In the planar optical member according to the aspect of the present invention, a shape of a cross-section which is orthogonal to a length direction of the linear bodies is any one of substantially triangular, substantially quadrangular, and substantially pentagonal.

In the planar optical member according to the aspect of the present invention, an angle between the reflective surface and the refractive surface may continuously change according to a location on the reflective surface.

In the planar optical member according to the aspect of the present invention, the binding members may have optical transparency.

In the planar optical member according to the aspect of the present invention, the binding members may have a light scattering and emitting characteristic.

In the planar optical member according to the aspect of the present invention, the binding members may have a configuration which has a plurality of regions which have a different refractive index from peripheral regions.

In the planar optical member according to the aspect of the present invention, the binding members which are adjacent to each other in a length direction of the linear bodies may have a configuration in which at least parts of each in an extending direction are in contact with each other.

In the planar optical member according to the aspect of the present invention, an interval between the binding members which are adjacent to each other may be equal to or less than a width dimension in a direction which intersects with a length direction of the linear bodies.

The planar optical member according to the aspect of the present invention may have a shape in which a thickness of the binding members is thinner than a thickness of the linear bodies.

In the planar optical member according to the aspect of the present invention, the binding members may have a cross-sectional shape in a direction which intersects with a length direction which has a long axis and a short axis, and the long axis may be in contact with the linear body with an orientation along a length direction of the linear bodies.

In the planar optical member according to the aspect of the present invention, the binding members may have a plurality of regions which are lined up in a direction which intersects with a length direction.

In the planar optical member according to the aspect of the present invention, the binding members may be formed of a single linear member.

In the planar optical member according to the aspect of the present invention, the binding members may have a plurality of linear members.

In the planar optical member according to the aspect of the present invention, in the binding member formed of the plurality of the linear members, a number of the linear members which are present on an optical path of light which is incident to the binding member may be smaller than a number of the linear members which are lined up in a length direction of the linear body.

According to an aspect of the present invention, there is provided a daylighting device including the planar optical member according to the aspect of the present invention, and a support member which supports the planar optical member, in which external light is taken in through the planar optical member.

The daylighting device according to the aspect of the present invention may further include a winding mechanism which is able to wind the planar optical member in and out.

The daylighting device according to the aspect of the present invention may further include a storing mechanism in which the planar optical member is folded and stored so as to be able to be taken in and out.

In the daylighting device according to the aspect of the present invention, a plurality of the planar optical members may be allocated on the same surface.

The daylighting device according to the aspect of the present invention may further include a light adjusting member which adjusts an amount of light which is incident from the planar optical member in a direction which overlaps a main surface of the planar optical member.

The daylighting device according to the aspect of the present invention may further include a light adjusting member which adjusts an amount of light which is incident from outside on the same surface as a main surface of the planar optical member.

Advantageous Effects of Invention

According to one aspect of the present invention, it is possible to provide a daylighting device with which the user experiences little glare. According to one aspect of the present invention, it is possible to provide a favorable planar optical member which is used in this type of daylighting device.

BRIEF DESCRIPTION OF DRAWINGS

FIG. 9 is a cross-sectional view of a room where the planar optical member is installed.

FIG. 10 is a graph which shows a relationship between a rotation angle of the linear body and an emission angle of light.

FIG. 74 is a view which shows a room model which is provided with a light collecting apparatus and a light adjusting system, and a cross-sectional view taken along a line A-A' in FIG. 75.

DESCRIPTION OF EMBODIMENTS

First Embodiment

Description will be given below of a first embodiment of the present invention using FIG. 1 to FIG. 6.

The present embodiment is one example of a favorable planar optical member which is used for a daylighting device.

Figure 1:
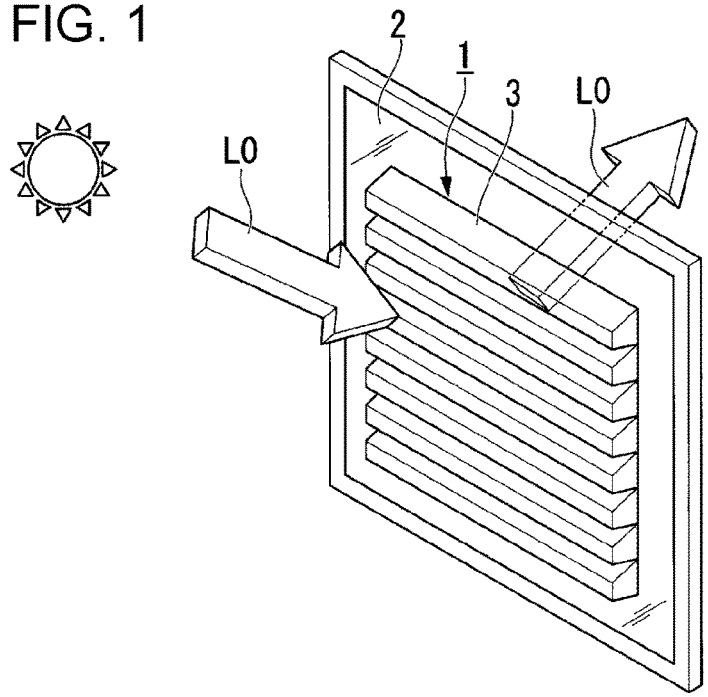
FIG. 1 is a perspective view which shows a use form of a planar optical member of a first embodiment.
Figure 2:
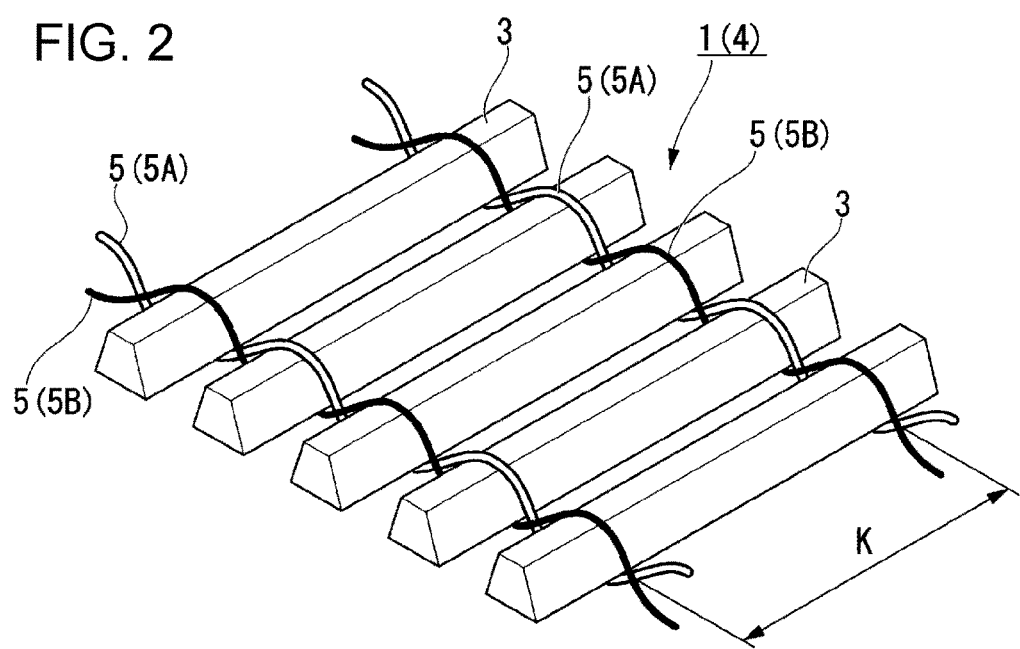
FIG. 2 is a perspective view which enlarges a binding section of the planar optical member.
Figure 3:
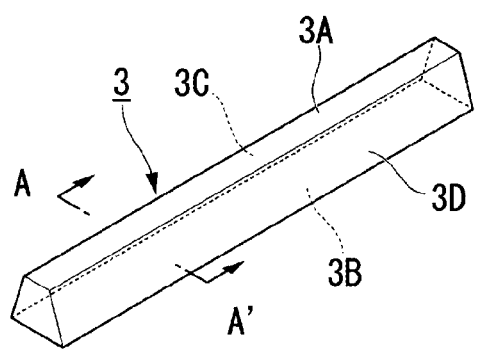
FIG. 3 is a perspective view of a linear body which configures the planar optical member.
Figure 4:
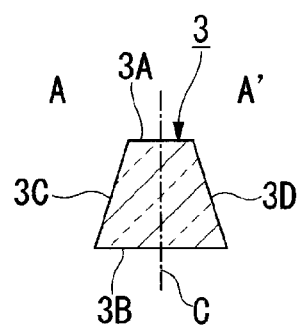
FIG. 4 is a cross-sectional view taken along a line A-A' in FIG. 3.
Figure 5:
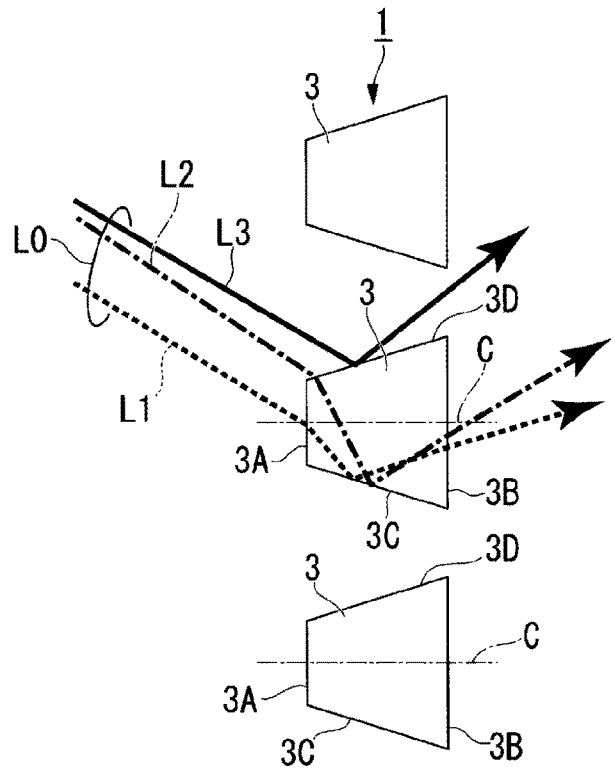
FIG. 5 is a view which shows a state where light is reflected by the planar optical member.
Figure 6:
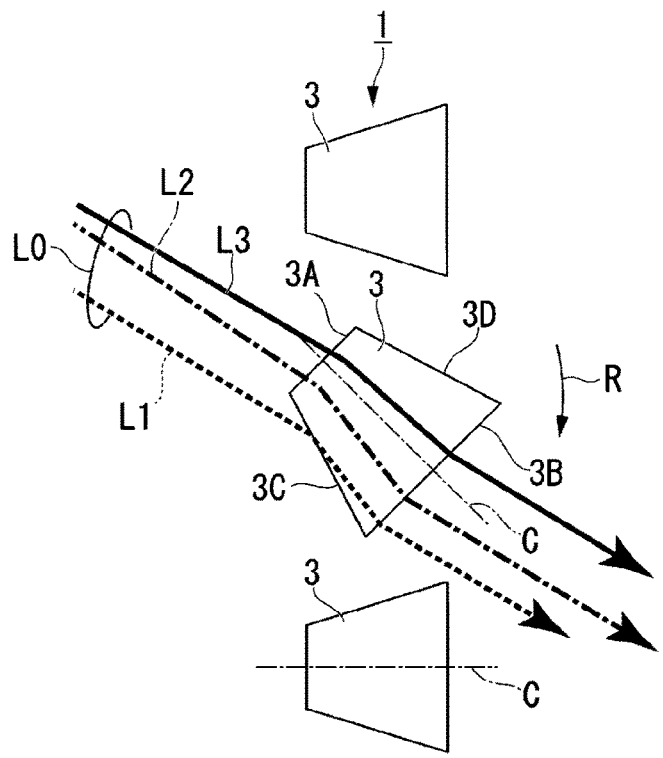
FIG. 6 is a view for illustrating problems when light is reflected by the planar optical member.

FIG. 1 is a perspective view which shows a use form of a planar optical member of the first embodiment. FIG. 2 is a perspective view which enlarges a binding section of the planar optical member. FIG. 3 is a perspective view of a linear body which configures the planar optical member. FIG. 4 is a cross-sectional view taken along a line A-A' in FIG. 3. FIG. 5 is a view which shows a state where light is reflected by the planar optical member. FIG. 6 is a view for illustrating problems when light is reflected by the planar optical member.

Here, in order to make each constituent element easy to view, the constituent elements may be shown while differentiating the scale reduction of the dimensions thereof in each diagram below.

When using the planar optical member of the first embodiment as a daylighting device, a planar optical member 1 is arranged on the inner side of a window glass 2 of a building as shown in FIG. 1. Due to this, sunlight L0 is taken into a room through the planar optical member 1. The planar optical member 1 is desirably arranged such that the length direction of a linear body 3 which will be described below substantially matches the horizontal direction. However, the length direction of the linear body 3 does not need to completely match the horizontal direction depending on the situation.

As shown in FIG. 2, the planar optical member 1 of the first embodiment is configured by one layer of a planar structure body 4. The planar structure body 4 which configures the planar optical member 1 is provided with a plurality of the linear bodies 3 and a plurality of threads 5. The plurality of the linear bodies 3 are arrayed substantially in parallel to each other. The plurality of the linear bodies 3 function as optical members for taking sunlight into a room and introducing the sunlight in the ceiling direction or the wall direction. The plurality of the threads 5 function as a binding member where the plurality of the linear bodies 3 are bundled in a state of being arrayed substantially in parallel. The plurality of the threads 5 extend in a direction which substantially intersects with the plurality of the linear bodies 3, that is, the vertical direction. Therefore, the threads are referred to as warp. The warp 5 includes a first warp 5A and a second warp 5B.

The linear bodies 3 are configured by optically transparent materials. As the optically transparent materials, for example, optically transparent resin materials such as polyethylene, polypropylene, acryl, polystyrene, acrylonitrile•butadiene•styrene copolymer synthesized resins (ABS resins), polyamide, polycarbonate, polytetrafluoroethylene (fluorine resin), polyethylene terephthalate (PET), and vinyl chloride, or optically transparent inorganic compounds such as glass, mixtures of the materials described above, and the like may be used. A material with a small light scattering property and a high optical transparency is desirably used for the optically transparent material.

As shown in FIG. 3 and FIG. 4, the linear bodies 3 are long members of which the shape as a whole is similar to a fiber, a thread, a filament, a bar, or the like. The cross-sectional shape which is orthogonal with the length direction of the linear bodies 3 is a trapezoid which is linearly symmetrical to a central line C. The "cross-section which is orthogonal to the length direction of the linear bodies 3" is simply referred to below as the "cross-section of the linear bodies 3". That is, the linear bodies 3 have two surfaces 3A and 3B which are parallel to each other and two surfaces 3C and 3D which are not parallel to each other. The areas of the two surfaces 3A and 3B which are parallel to each other are different from each other. The surface 3A which has a smaller area is arranged on the side to which light is incident, that is, on the side which faces a window. The surface 3B which has a larger area is arranged on the side from which light is emitted, that is, on the indoor side.

In the description below, the surface on the front side when viewed by the user in a room, that is, the surface with a larger area, is referred to as a "front surface 3B" and the surface on the rear side when viewed by the user in the room, that is, a surface with a smaller area, is referred to as a "rear surface 3A".

The cross-sectional shape of the linear bodies 3 is not particularly limited to a trapezoid. However, the cross-sectional shape of the linear bodies 3 is desirably any one of substantially triangular, quadrangular, or pentagonal. The area of the front surface 3B of the linear bodies 3 on the light emission side is desirably wider than the area of the rear surface 3A of the linear bodies 3 on the light incident side. In other words, the cross-sectional shape of the linear bodies 3 is desirably a shape in which the front is wider in the direction in which the light proceeds. The dimensions (the thickness) of the cross-section of the linear bodies 3 are substantially approximately tens of μm to several mm. For example, when the dimensions of the cross-section of the linear bodies 3 are approximately tens of μm, the linear bodies 3 take the form of a fiber or a thread. When the dimensions of the cross-section of the linear bodies 3 are approximately several mm, the linear bodies 3 take the form of a bar. In the linear bodies 3 of the first embodiment, the shape and dimensions of the cross-sections are constant in the length direction.

As shown in FIG. 2, the plurality of the linear bodies 3 are bundled by the first warp 5A and the second warp 5B in a state of being lined up substantially in parallel to each other. The plurality of the linear bodies 3 are bundled by the first warp 5A and the second warp 5B at a plurality of locations at intervals K in the length direction. The intervals K are not particularly limited and may be arbitrary.

The first warp 5A is passed through so as to sew the front surface 3B side and the rear surface 3A side of the plurality of the linear bodies 3 in a manner such as passing through the front surface 3B side of an arbitrary linear body 3 and passing through the rear surface 3A side of the linear body 3 which is adjacent to this linear body 3. The second warp 5B is passed through so as to sew the front surface 3B side and the rear surface 3A side of the plurality of the linear bodies 3 with the opposite orientation to the first warp 5A in a manner such as passing through the rear surface 3A side of the linear bodies 3 where the first warp 5A passes through the front surface 3B side and passing through the front surface 3B side of the linear bodies 3 where the first warp 5A passes through the rear surface 3A side. The first warp 5A and the second warp 5B bind the plurality of the linear bodies 3 with each other and have a function of fixing the orientation of the linear bodies 3 such that the individual linear bodies 3 do not rotate.

As shown in FIG. 5, when focusing on one of the linear bodies 3, a part of light L1 out of the sunlight L0 is incident to the rear surface 3A of the linear bodies 3 from diagonally above and is refracted so as to proceed toward a lower side inclined surface 3C. Since air is present at the periphery of the linear bodies 3, each of the surfaces of the linear bodies 3 is an interface between optically transparent materials which configure the linear bodies 3 and the air. For example, when the refractive index of the optically transparent materials is 1.5, each of the surfaces of the linear bodies 3 is an interface between a substance with a refractive index of 1.5 and air with a refractive index of 1.0. Therefore, the light which is incident to each of the surfaces of the linear bodies 3 at an incident angle of a critical angle or more is totally reflected by each of the surfaces. Accordingly, the light L1 is reflected by the lower side inclined surface 3C, proceeds toward the front surface 3B of the linear bodies 3, and is refracted to be emitted from the front surface 3B of the linear bodies 3.

In addition, a part of the light L2 is incident to an upper side inclined surface 3D of the linear bodies 3 from diagonally above and refracted so as to proceed toward the lower side inclined surface 3C. The light L2 is reflected by the lower side inclined surface 3C, proceeds toward the front surface 3B of the linear bodies 3, and is refracted to be emitted from the front surface 3B of the linear bodies 3. In addition, a part of light L3 is not able to be incident to the inner section of the linear bodies 3 on the upper side inclined surface 3D of the linear bodies 3 and is reflected by the upper side inclined surface 3D. In any case, all of the light L1 to L3 is emitted to the front surface 3B side of the linear bodies 3. Angled light components which have a certain degree of scattering are included in the sunlight L0; however, when considering that a large amount of light is incident to the planar optical member 1 from substantially the same direction, it is possible to adjust the light emitting direction to a desired direction by changing the angle of the lower side inclined surface 3C which is the reflective surface of the linear bodies 3 in addition to the cross-sectional shape of the linear bodies 3.

As described above, the lower side inclined surface 3C of the linear bodies 3 functions as a reflective surface which reflects light which is incident to the inner section of the linear bodies 3. The rear surface 3A and the front surface 3B of the linear bodies 3 function as refractive surfaces which refract light when incident or emitted. In other words, the linear bodies 3 have a reflective surface which reflects light which is incident to the linear bodies 3 along a direction which intersects with the length direction and a refractive surface which refracts the light. In the planar optical member 1, the orientations of the reflective surfaces 3C of all of the linear bodies 3 substantially match and the orientations of the refractive surfaces 3A and 3B of all of the linear bodies 3 substantially match. In other words, the orientations of the central lines C of the trapezoid formed by the cross-sectional shape of all of the linear bodies 3 substantially match.

Here, description will be given of problems in a case where the orientations of all of the linear bodies 3 do not match, using FIG. 6.

The problems will become clear when a comparison is made with FIG. 5 in which the orientations of the linear bodies 3 match; however, in the example in FIG. 6, the central linear body 3 out of the three linear bodies 3 which are shown in the diagram is greatly rotated in a direction which is shown with an arrow R. In this case, even when the incident angle of the light L1 to L3 which is incident to the planar optical member 1 is the same as FIG. 5, the light L1 to L3 is not reflected by the lower side inclined surface 3C of the linear bodies 3 which is to be the reflective surface and is emitted diagonally downward from the front surface 3B of the linear bodies 3. In this manner, when the linear bodies 3 are rotated, it is not possible to adjust the light emitting direction as designed. The higher the ratio of the rotated linear bodies, the greater the ratio of light which is not emitted in a desired direction. In this case, when light proceeds toward the user in a room, the user experiences glare.

In contrast to this, in the planar optical member 1 of the first embodiment, as shown in FIG. 5, the orientations of the reflective surfaces 3C of all of the linear bodies 3 substantially match and the orientations of the refractive surfaces 3A and 3B of all of the linear bodies 3 substantially match. Therefore, the emitting direction of the light which is emitted from any of the linear bodies 3 is also aligned to be diagonally upward and substantially constant. The light collection in the planar optical member 1 does not use light scattering as in the daylighting device in the related art, but uses reflection and refraction in the linear bodies 3. Accordingly, light distribution of the planar optical member 1 which is determined by an angle of the reflective surfaces 3C of the linear bodies 3 or the shapes of the linear bodies 3 is as originally designed. As originally designed has the specific meaning of irradiating the sunlight L0 in the ceiling direction or wall direction by changing the optical path of the light which is incident to the planar optical member 1 to be further above the horizontal plane.

According to the planar optical member 1 of the first embodiment, the sunlight L0 is sufficiently taken in from the rear surfaces 3A of the linear bodies 3 and the sunlight L0 is reflected by the lower side inclined surfaces 3C of the linear bodies 3 and guided to a ceiling or wall in a room. Since the orientations of the reflective surfaces 3C of all of the linear bodies 3 substantially match and the orientations of the refractive surfaces 3A and 3B of all of the linear bodies 3 substantially match, out of the sunlight L0 which is incident from diagonally above, there is little light which passes through diagonally downward as it is. By using the planar optical member 1, the user in a room does not experience much glare and a daylighting device which is able to improve the brightness of the room is obtained.

Here, the orientations of the reflective surfaces and the orientations of the refractive surfaces of all of the linear bodies 3 ideally match; however, for example, it is possible to allow rotation of approximately ±10° or less. The grounds for this are that, assuming a typical office, it is possible to obtain an illumination effect for at least half of the room using the daylighting device with rotation of approximately 10° or less.

Detailed description will be given below of the reasons why the allowable range of the rotation angle of the linear bodies 3 is preferably 10° or less.

Figure 7:
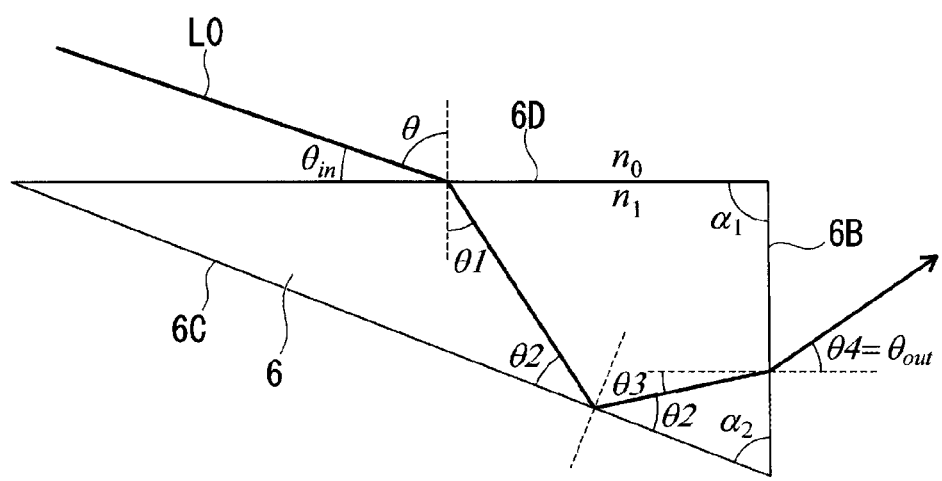
FIG. 7 is a view which shows a linear body which is used for calculating an allowable range of a rotation angle of the linear body.

For example, a linear body 6 of which the cross-sectional shape is triangular as shown in FIG. 7 is assumed. An incident surface of the sunlight L0 is set as an incident surface 6D, a reflective surface as a reflective surface 6C, and an emitting surface as an emitting surface 6B. In addition, an angle between the incident surface 6D and the emitting surface 6B is set as $\alpha 1$, an angle between the reflective surface 6C and the emitting surface 6B as $\alpha 2$, an angle between the incident light L0 and the horizontal plane as $\theta in$, and an angle between the emitting light L0 and the horizontal plane as $\theta out$. In addition, the refractive index of the linear body 6 is set as $n1$ and the refractive index of the space (normally, air) outside the linear body 6 as $n0$. At this time, the angles $\theta$, $\theta 1$, $\theta 2$, $\theta 3$, and $\theta 4$ of each section shown in FIG. 7 are represented by formulas (1) to (5) below.

[Math. 1]
$$\theta = 90 - \theta_{in} \tag{1}$$

[Math. 2]
$$\theta 1 = \arcsin\left(\frac{n_0}{n_1}\sin\theta\right) \tag{2}$$

[Math. 3]
$$\theta 2 = \alpha_1 + \alpha_2 - 90 - \theta 1 \tag{3}$$

-continued

[Math. 4]
$$\theta 3 = \alpha_2 - 90 + \theta 2 \quad (4)$$

[Math. 5]
$$\theta 4 = \arcsin\left(\frac{n_1}{n_0}\sin\theta 3\right) \quad (5)$$

The relationship between θout (θ4) and θin is represented as formula (6) below using Formulas (1) to (5) above.

[Math. 6]
$$\theta 4 = \arcsin\left[\frac{n_1}{n_0}\sin\left[\alpha_1 + 2\alpha_2 - 180 - \arcsin\left\{\frac{n_0}{n_1}\sin(90 - \theta_{in})\right\}\right]\right] \quad (6)$$

Figure 8A:
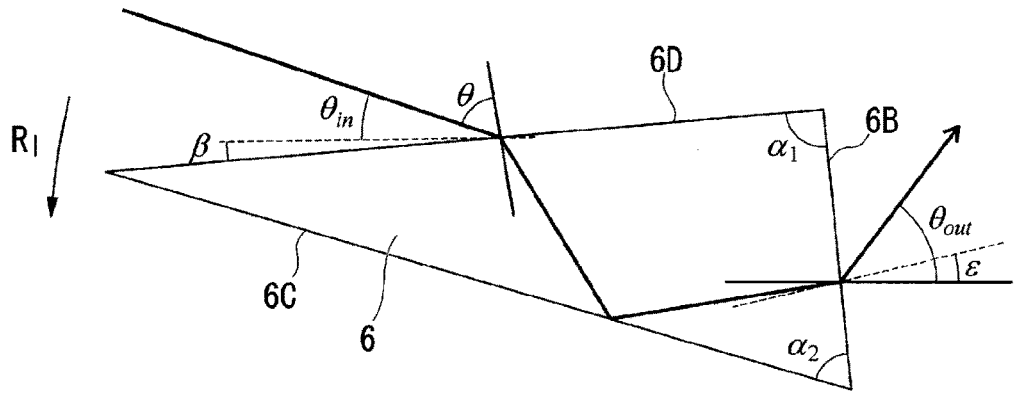
FIG. 8A is a view which shows a state of light beams in a state where the linear body is rotated counterclockwise.
Figure 8B:
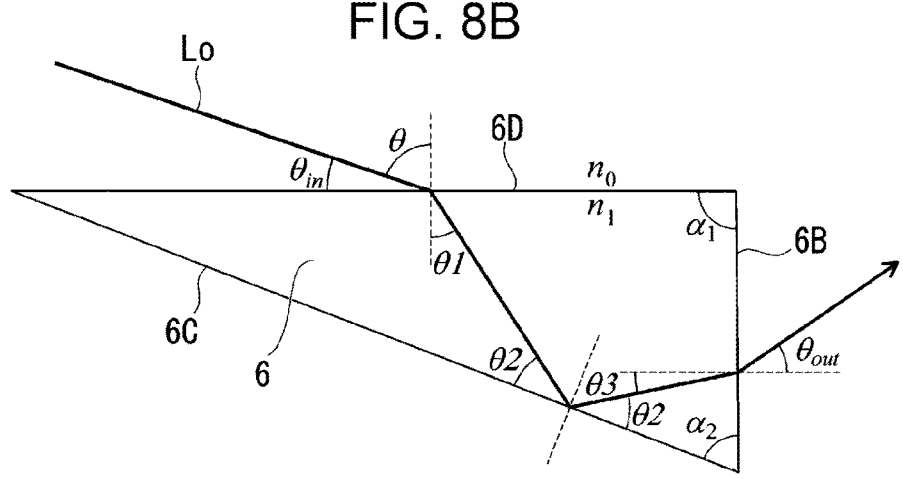
FIG. 8B is a view which shows a state of light beams in a state where the linear body is not rotating.
Figure 8C:
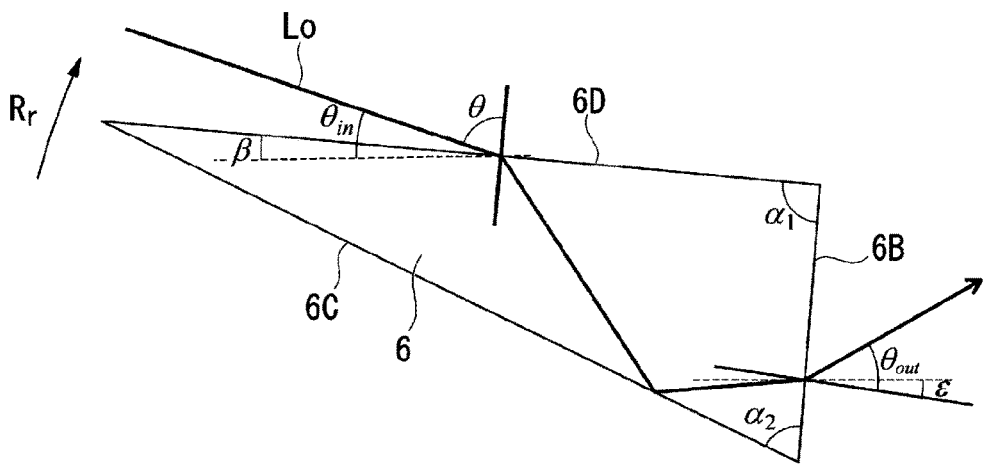
FIG. 8C is a view which shows a state of light beams in a state where the linear body is rotated clockwise.

Here, when the linear body 6 changes from a state of not rotating (refer to FIG. 8B) to a state of rotating counter-clockwise (refer to FIG. 8A) or the linear body 6 changes to a state of rotating clockwise (refer to FIG. 8C), the incident surface 6D is inclined at a rotation angle β with respect to the horizontal plane and, in accordance with this, the light emitting angle is inclined from θout at an angle ε. At this time, the angle ε is represented by formula (7) below.

[Math. 7]
$$\varepsilon = \alpha_1 + \beta - 90 \quad (7)$$

From formula (6) and formula (7), in a case of considering the rotation of the linear body 6, the relational formula between θin and θout is represented by formula (8) below.

[Math. 8]
$$\begin{aligned}\theta_{out} &= \theta 4 \pm \varepsilon \\ &= \arcsin\left[\frac{n_1}{n_0}\sin[\alpha_1 + 2\alpha_2 - 180 - \right. \\ &\quad \left. \arcsin\left\{\frac{n_0}{n_1}\sin(90 - \theta_{in} \mp \beta)\right\}\right]\right] \pm \alpha_1 + \beta - 90\end{aligned} \quad (8)$$

As shown in FIG. 9, a room 200 with a ceiling with a height H [m] and a length L [m] is assumed as an environment in which light is collected. In addition, it is supposed that the entirety of one surface of the room is the window 2 and a planar optical member 7 is installed over the entire surface of the window 2. In order for light to reach the end section of the ceiling on the furthest side of the room, θout needs to satisfy formula (9) below.

$$\tan\theta out = H/L \quad (9)$$

The light emitting angle is set as θout' when θout is changed due to the rotation of the linear body.

At this time, when a length L of the room 200 is set to 20 m and the height of the room 200 is set to 2.6 m, θout is approximately 7° when θin is 30°. In addition, in a case where it is assumed that the linear body is rotated and light does not reach the end sections on the furthest side of the room, θout' which is necessary for irradiating a region of half of the length L/2 of the room 200, that is, a region of 10 m on the window side, is approximately 14°. Conversely, in a case where there is a rotation of the linear body such that θout' is 14° or more, a light collecting effect due to the planar optical member is not obtained in half or more of a region from the far side of the room 200. For example, in a daylighting device which uses light scattering, when considering that only a region which is close to a window is bright, there is a demand for an effect of being able to irradiate at least approximately half of the room in the daylighting device which uses the planar optical member of the present embodiment.

As the shape of the linear body 6 shown in FIG. 7, a linear body where α1=90° and α2=65° is assumed.

A relationship between the rotation angle β and the light emitting angle θout when the linear body is rotated by the rotation angle β is shown in FIG. 10. The horizontal axis in FIG. 10 is the rotation angle β [°] of the linear body and the vertical axis in FIG. 10 is the light emitting angle θout [°].

For example, in a case where the incident angle θin is 30°, when the rotation angle β of the linear body is 0°, the emitting angle θout at which it is possible to irradiate the entire ceiling with light is 7° and the emitting angle θout' at which it is possible to irradiate half of the ceiling with light is 14°. From FIG. 10, the rotation angle β is approximately 4° when the emitting angle θout' is 14°. Accordingly, the allowable range of the rotation angle β of the linear body is within approximately 4°.

The allowable range of the rotation angle β of the linear body is obtained based on the reasoning described above; however, the allowable range changes according to various factors such as the angle of each section of the linear body, design parameters such as the refractive index of materials, the arrangement position (height) of a daylighting device, the installation environment such as the length of a room, the incident conditions of the sunlight, and the subjective evaluation of the user such as whether and to what extent it is possible to allow a decrease in light collecting effects. Accordingly, when considering variations due to these factors, the allowable range of the rotation angle β of the linear body 3 is preferably approximately 10° or less.

[First Modification Example of Linear Body>

Description will be given of a first modification example of the linear bodies 3 of the first embodiment.

In the first embodiment, the cross-sectional shape of the linear bodies 3 is trapezoid (quadrangular). With respect to this, as shown in FIG. 11A to FIG. 11E, the cross-sectional shape of linear bodies 8, 9, 10, 11, and 12 of the first modification example is triangular.

Figure 11A:
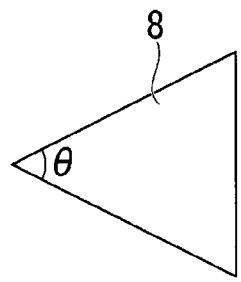
FIG. 11A is a first cross-sectional view which shows a first modification example of the linear body.
Figure 11B:
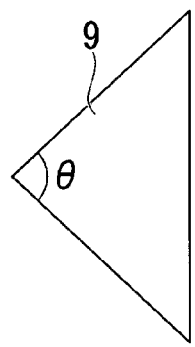
FIG. 11B is a second cross-sectional view which shows the first modification example of the linear body.
Figure 11C:
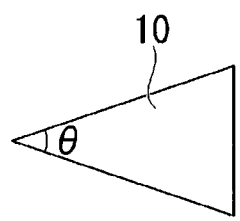
FIG. 11C is a third cross-sectional view which shows the first modification example of the linear body.

The cross-sectional shape of the linear bodies 8, 9, and 10 shown in FIG. 11A to FIG. 11C are isosceles triangles.

Figure 11D:
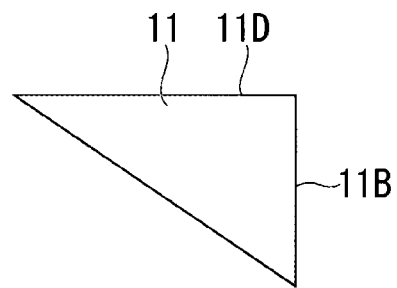
FIG. 11D is a fourth cross-sectional view which shows the first modification example of the linear body.
Figure 11E:
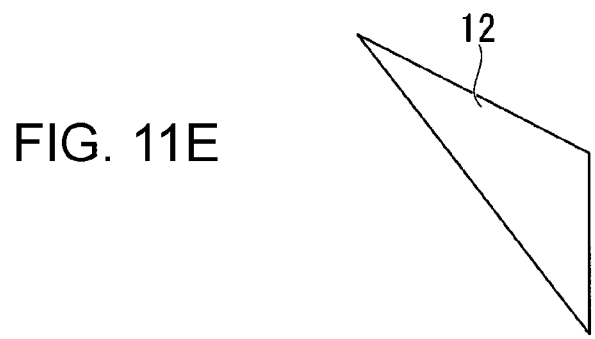
FIG. 11E is a fifth cross-sectional view which shows the first modification example of the linear body.

The cross-sectional shape of the linear body 8 shown in FIG. 11A has an isosceles triangle shape with a vertical angle θ of substantially 45°. The cross-sectional shape of a linear body 9 shown in FIG. 11B has an isosceles triangle shape with a vertical angle θ of substantially 90°. The cross-sectional shape of a linear body 10 shown in FIG. 11C has an isosceles triangle shape with a vertical angle θ of substantially 35°. The cross-sectional shape of a linear body 11 shown in FIG. 11D is an isosceles right triangular shape. The angle between an upper surface 11D and a front surface 11B of the linear body 11 is a right angle. The cross-sectional shape of a linear body 12 shown in FIG. 11E is a scalene triangle.

[Second Modification Example of Linear Body>

Description will be given of a second modification example of the linear bodies 3 of the first embodiment.

As shown in FIG. 12A to 12D, the cross-sectional shape of linear bodies 15, 16, 17, and 18 of the second modification example is a quadrangular shape.

Figure 12A:
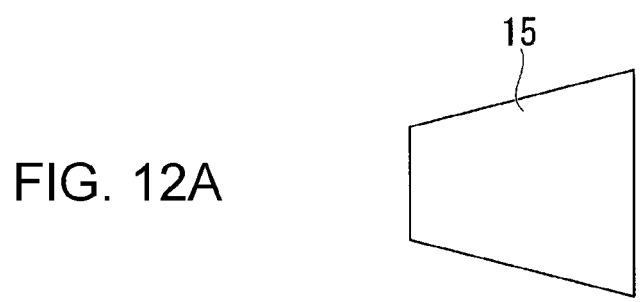
FIG. 12A is a first cross-sectional view which shows a second modification example of the linear body.
Figure 12B:
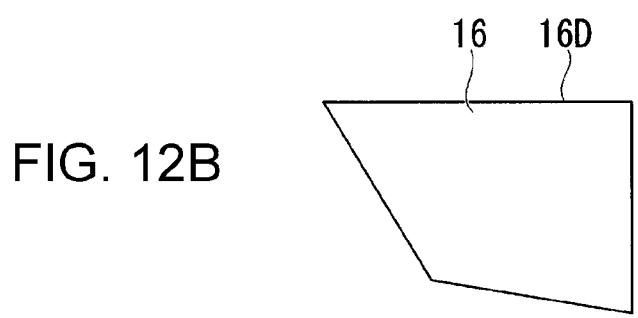
FIG. 12B is a second cross-sectional view which shows the second modification example of the linear body.
Figure 12C:
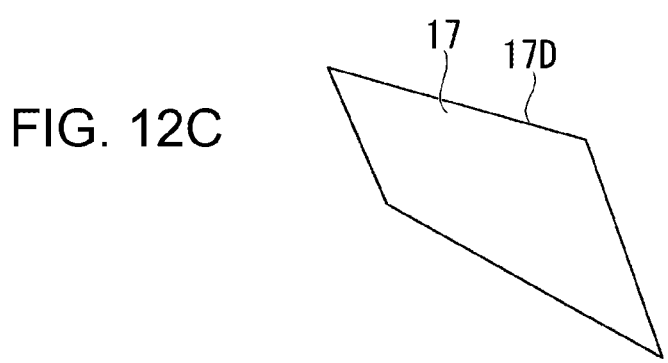
FIG. 12C is a third cross-sectional view which shows the second modification example of the linear body.
Figure 12D:
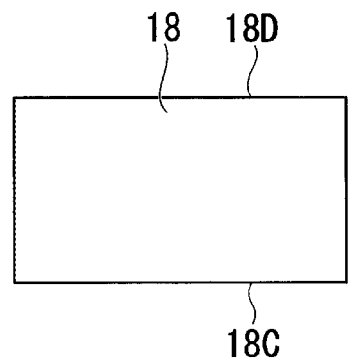
FIG. 12D is a fourth cross-sectional view which shows the second modification example of the linear body.

A linear body 15 shown in FIG. 12A is the same as the linear body 3 which is used in the planar optical member of the first embodiment. Regarding a linear body 16 shown in FIG. 12B, the sides of the quadrangle which forms the cross-sectional shape are not parallel. An upper surface 16D of the linear body 16 substantially matches the horizontal plane. Regarding a linear body 17 shown in FIG. 12C, none of the sides of the quadrangle which forms the cross-sectional shape are parallel. An upper surface 17D of the linear body 17 is inclined downward from the light incident side to the light emitting side. The cross-sectional shape of a linear body 18 shown in FIG. 12D is a rectangular shape. An upper surface 18D and a lower surface 18C of the linear body 18 substantially match the horizontal plane.

[Third Modification Example of Linear Body]

Description will be given of a third modification example of the linear bodies 3 of the first embodiment.

Figure 13A:
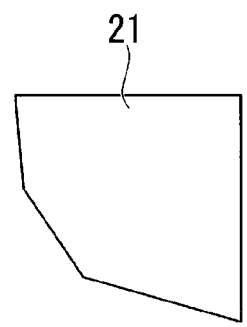
FIG. 13A is a first cross-sectional view which shows a third modification example of the linear body.
Figure 13B:
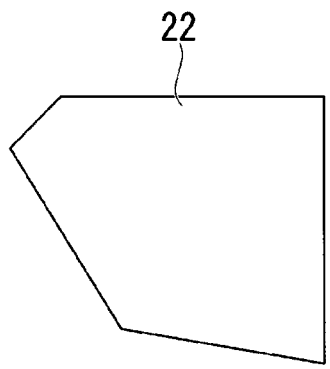
FIG. 13B is a second cross-sectional view which shows the third modification example of the linear body.

As shown in FIGS. 13A and 13B, the cross-sectional shape of linear bodies 21 and 22 of the third modification example is a pentagonal shape.

[Fourth Modification Example of Linear Body]

Description will be given of a fourth modification example of the linear bodies 3 of the first embodiment.

Figure 14A:
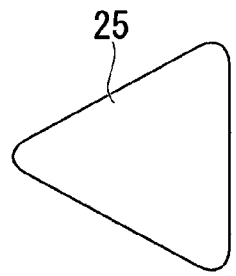
FIG. 14A is a first cross-sectional view which shows a fourth modification example of the linear body.
Figure 14B:
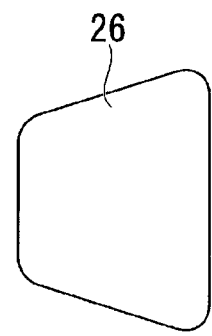
FIG. 14B is a second cross-sectional view which shows the fourth modification example of the linear body.

As shown in FIGS. 14A and 14B, the cross-sectional shape of linear bodies 25 and 26 of the fourth modification example has round corner sections. The cross-sectional shape of a linear body 25 shown in FIG. 14A has a triangular shape with three round corner sections. The cross-sectional shape of a linear body 26 shown in FIG. 14B has a trapezoid shape with four round corner sections.

[Fifth Modification Example of Linear Body]

Description will be given of a fifth modification example of the linear bodies 3 of the first embodiment.

Figure 15A:
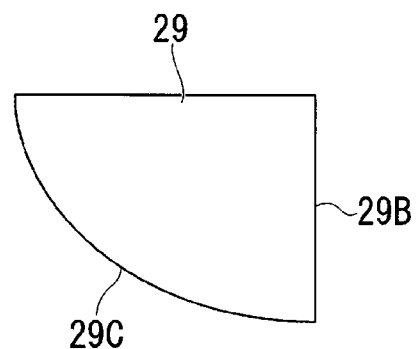
FIG. 15A is a first cross-sectional view which shows a fifth modification example of the linear body.
Figure 15B:
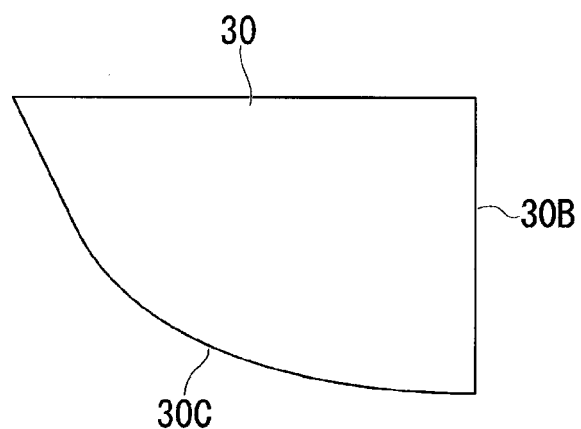
FIG. 15B is a second cross-sectional view which shows the fifth modification example of the linear body.

In the first embodiment, the lower side inclined surface 3C of the linear bodies 3 which functions as a reflective surface is a flat surface. With respect to this, as shown in FIGS. 15A and 15B, lower side inclined surfaces 29C and 30C of linear bodies 29 and 30 of the fifth modification example include a curved surface which is curved to be convex toward the lower side. Regarding a linear body 29 shown in FIG. 15A, the entire lower side inclined surface 29C is a curved surface. Regarding a linear body 30 shown in FIG. 15B, a part of the lower side inclined surface 30C is a flat surface and the remaining part is a curved surface. In both cases, front surfaces 29B and 30B of the linear bodies 29 and 30, which are refractive surfaces, are flat surfaces. As the examples, the angle between the reflective surfaces and the refractive surfaces of the linear bodies may continuously change according to the place on the reflective surface.

When using any of the linear bodies in the first to fifth modification examples described above, by matching the orientations of the reflective surfaces or the refractive surfaces over a plurality of linear bodies, it is possible to obtain the same effects as the first embodiment such that it is possible to realize a daylighting device which is able to improve the brightness of a room without the user in the room experiencing much glare.

[First Modification Example of Planar Optical Member]

In the planar optical member 1 of the first embodiment, the plurality of the linear bodies 3 were bundled by the warp 5 at locations at set intervals in the length direction. In contrast to this, the planar optical members of the first to fourth modification examples are configured by a planar structure body where a plurality of linear bodies are weft and the plurality of weft and a plurality of warp are knitted.

Figure 16:
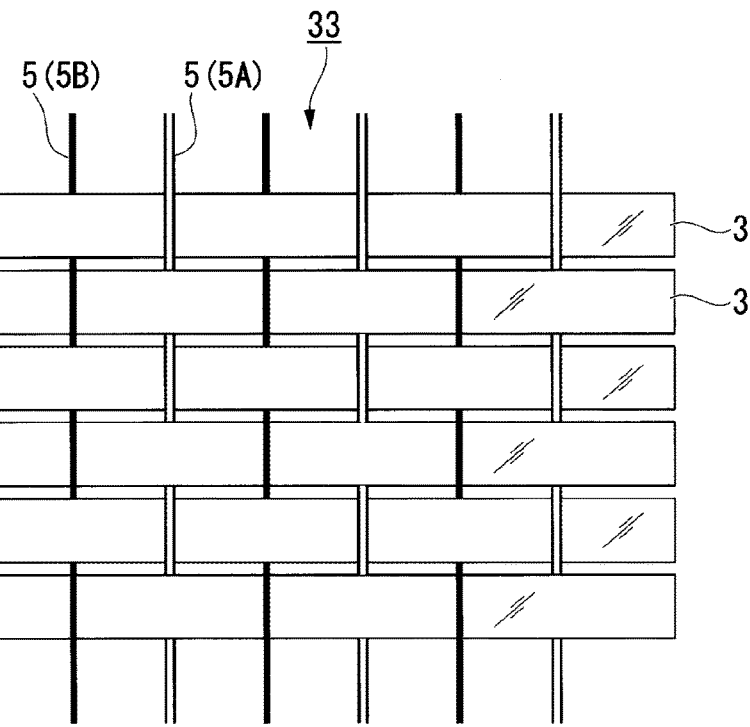
FIG. 16 is a plan view which shows a first modification example of the planar optical member.

In a planar optical member 33 of the first modification example, as shown in FIG. 16, the first warp 5A is arranged so as to alternately sew every linear body 3 on the rear surface side, the front surface side, the rear surface side, the front surface side, and so on from the linear body 3 on the upper side toward the linear body 3 on the lower side. The second warp 5B which is adjacent to the first warp 5A is arranged so as to alternately sew every linear body 3 on the front surface side, the rear surface side, the front surface side, the rear surface side, and so on from the linear body 3 on the upper side toward the linear body 3 on the lower side. The first warp 5A and the second warp 5B extend substantially in parallel in the vertical direction. The plurality of linear bodies 3, the first warp 5A, and the second warp 5B are configured by a planar structure body such as a textile known as a so-called plain weave.

[Second Modification Example of Planar Optical Member]

Figure 17:
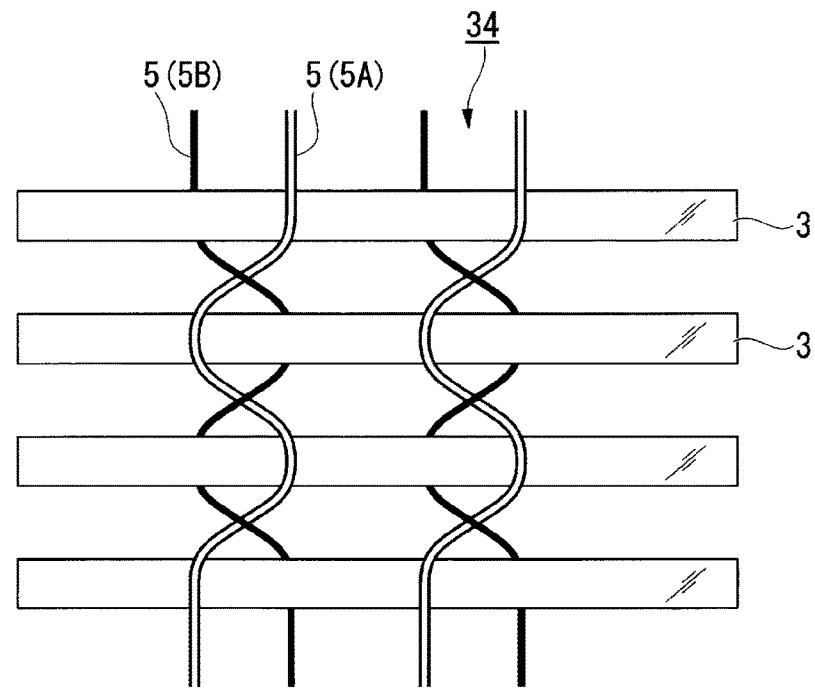
FIG. 17 is a plan view which shows a second modification example of the planar optical member.

In a planar optical member 34 of the second modification example, as shown in FIG. 17, the first warp 5A is arranged so as to alternately sew every linear body 3 on the rear surface side, the front surface side, the rear surface side, the front surface side, and so on from the linear body 3 on the upper side toward the linear body 3 on the lower side. The second warp 5B which is adjacent to the first warp 5A is arranged so as to alternately sew every linear body 3 on the front surface side, the rear surface side, the front surface side, the rear surface side, and so on from the linear body 3 on the upper side toward the linear body 3 on the lower side. The first warp 5A and the second warp 5B are twisted once in the intervals between adjacent linear bodies 3. The plurality of linear bodies 3, the plurality of the first warp 5A and the second warp 5B are configured by a planar structure body such as a textile known as a so-called leno weave. In a case of using a leno weave, the effect of fixing the orientation of the linear bodies 3 is improved. Here, apart from the plain weave and the leno weave described above, it is also possible to adopt weaving styles such as a twill weave or a satin weave.

[Third Modification Example of Planar Optical Member]

In the planar optical members 33 and 34 of the first and second modification examples, the warp 5 is arranged so as to alternately sew the rear surface side and the front surface side of every linear body 3. Instead of this configuration, the warp 5 may be arranged so as to alternately sew the rear surface side and the front surface side of every unit when a plurality of the linear bodies 3 are one unit.

Figure 18A:
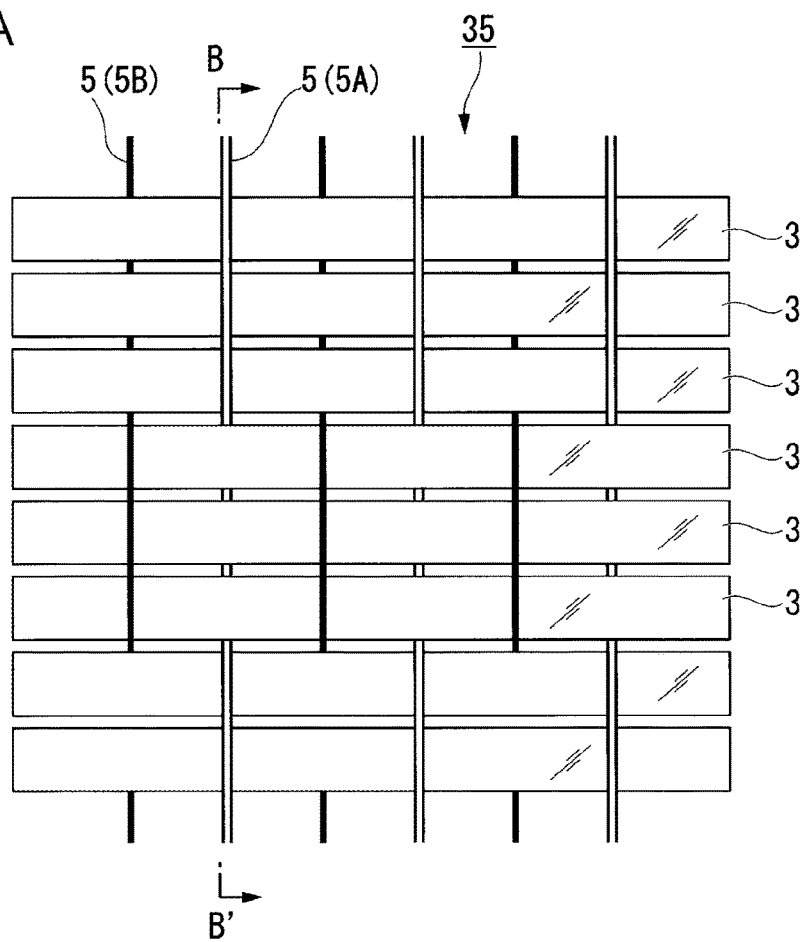
FIG. 18A is a plan view which shows a third modification example of the planar optical member.
Figure 18B:
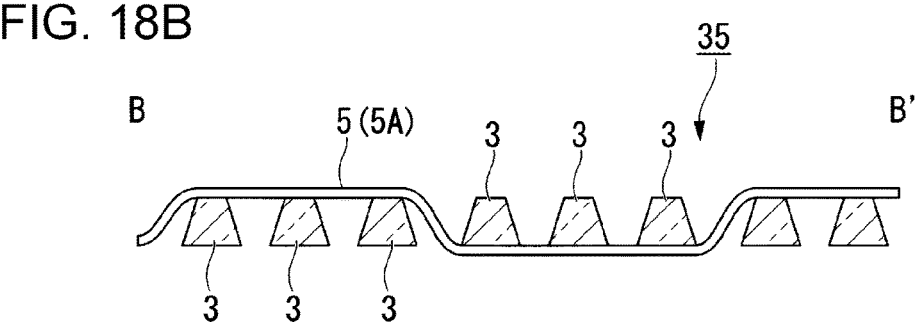
FIG. 18B is a cross-sectional view taken along a line B-B' in FIG. 18A.

In a planar optical member 35 of the third modification example, as shown in FIG. 18A and FIG. 18B, the first warp 5A is arranged so as to alternately sew every unit on the rear surface side, the front surface side, and so on from the upper side when three linear bodies 3 are one unit. The second warp 5B which is adjacent to the first warp 5A is arranged so as to alternately sew every unit on the front surface side, the rear surface side, and so on from the upper side when three linear bodies 3 are one unit. The three linear bodies 3 which form one unit are lined up in the main surface direction of the planar optical member 35.

[Fourth Modification Example of Planar Optical Member]

Figure 19:
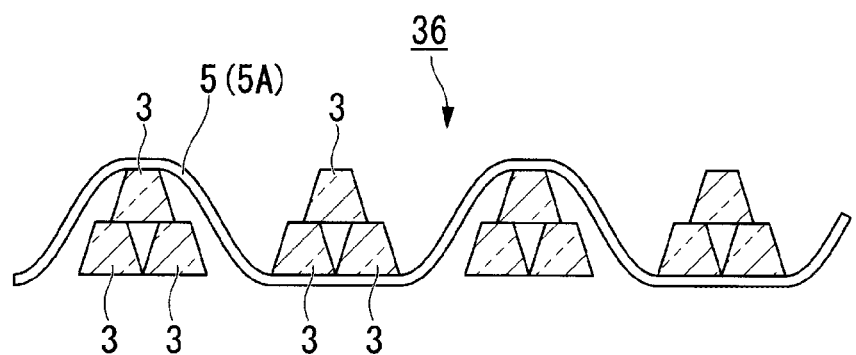
FIG. 19 is a cross-sectional view which shows a fourth modification example of the planar optical member.

In a planar optical member 36 of the fourth modification example, as shown in FIG. 19, the first warp 5A is arranged so as to alternately sew every unit on the rear surface side, the front surface side, and so on from the upper side when three linear bodies 3 are one unit. Although not shown in the diagram, the second warp 5B which is adjacent to the first warp 5A is arranged so as to alternately sew every unit on the front surface side, the rear surface side, and so on from the upper side when three linear bodies 3 are one unit. The three linear bodies 3 which form one unit are integrally arranged in a triangular shape.

In a case of using any of the planar optical members 33, 34, 35, and 36 of the first to fourth modification examples described above, it is also possible to obtain the same effects as the first embodiment such that it is possible to realize a daylighting device which is able to improve the brightness of a room without the user in the room experiencing much glare by matching the orientations of the reflective surface 3C or the refractive surfaces 3A and 3B over the plurality of the linear bodies 3.

In the first embodiment and the first to fourth modification examples, specifically, in a case where the linear bodies 3 take the form of fiber or thread and, for example, have approximately the same thickness as the warp 5, the entire planar optical member is as though it was formed of cloth. In this case, the user is able to roll or fold the planar optical member.

Second Embodiment

Description will be given of a second embodiment of the present invention using FIG. 20 and FIG. 21.

The basic configuration of the planar optical member of the second embodiment is the same as that of the first embodiment, but the configuration of the linear body is different from that of the first embodiment.

Figure 20:
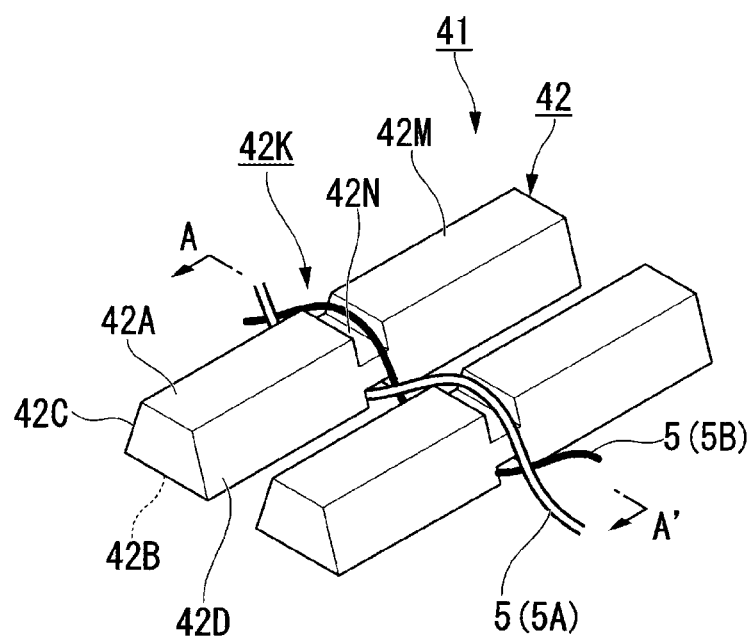
FIG. 20 is a perspective view which enlarges a binding section of a planar optical member of a second embodiment.

FIG. 20 is a perspective view which enlarges a binding section of a planar optical member of the second embodiment. FIG. 21 is a cross-sectional view taken along a line A-A' in FIG. 20.

Figure 21:
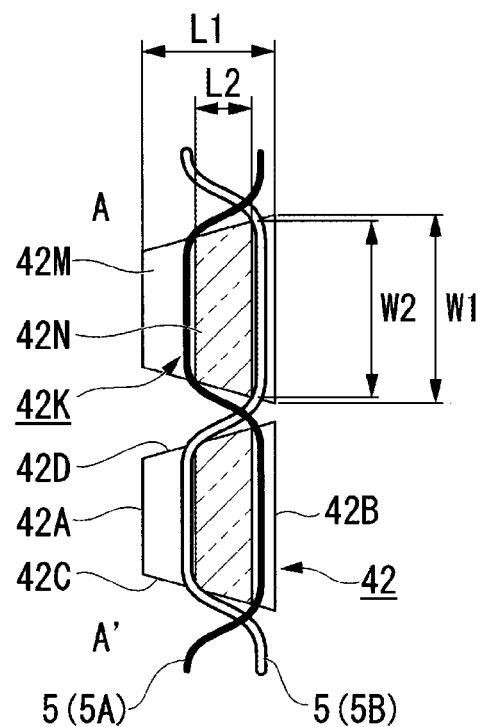
FIG. 21 is a cross-sectional view taken along a line A-A in FIG. 20.

In FIG. 20 and FIG. 21, the same reference numerals are used for the constituent elements which are common to the diagrams used in the first embodiment and detailed description thereof will be omitted.

As shown in FIG. 20 and FIG. 21, a linear body 42 of a planar optical member 41 of the second embodiment has a cut-out section 42K at a plurality of positions at intervals in the length direction. The cut-out section 42K is cut out toward the inner side from a front surface 42B and a rear surface 42A of the linear body 42 and is not cut out from a lower side inclined surface 42C and an upper side inclined surface 42D of the linear body 42. The portion other than the cut-out section 42K is referred to as a first portion 42M of the linear body 42 and the portion in which the cut-out section 42K is provided is referred to as a second portion 42N of the linear body 42. The linear body 42 has the first portion 42M and the second portion 42N of which the cross-sectional shapes and dimensions are different from each other.

Since the cut-out section 42K is provided in the second portion 42N, the dimensions between a front surface and a rear surface of the second portion 42N are smaller than the dimensions between a front surface and a rear surface of the first portion 42M. Thus, the cross-sectional shape of the second portion 42N is a flat trapezoid with long dimensions in the direction which is parallel to the front surface and the rear surface, compared to the cross-sectional shape of the first portion 42M.

When the dimension in the direction which is parallel to the front surface 42B and the rear surface 42A of the linear body 42 is set as W and the dimension in a direction which is orthogonal to the front surface 42B and the rear surface 42A of the linear body 42 is set as L, W/L is defined as the aspect ratio of the linear body 42. The dimension in the direction which is parallel to the front surface and the rear surface of the first portion 42M is set as W1, the dimension in the direction which is orthogonal to the front surface and the rear surface of the first portion 42M is set as L1, the dimension in the direction which is parallel to the front surface and the rear surface of the second portion 42N is set as W2, and the dimension in the direction which is orthogonal to the front surface and the rear surface of the second portion 42N is set as L2. When the difference of the cross-sectional shapes between the first portion 42M and the second portion 42N is described using the aspect ratios, the aspect ratio W2/L2 of the second portion 42N is greater than the aspect ratio W1/L1 of the first portion 42M.

The positions of the first portion 42M and the second portion 42N in the length direction of the linear body 42 substantially match over all of the linear bodies 42. The first warp 5A and the second warp 5B bind a plurality of the linear bodies 42 by being stretched over the second portion 42N of the plurality of the linear bodies 42. That is, the second portion 42N out of the linear bodies 42 functions as a binding section for binding the plurality of the linear bodies 42 by stretching over the first warp 5A and the second warp 5B. In other respects, the configuration is the same as the first embodiment.

According to the planar optical member 41 of the second embodiment, it is possible to obtain the same effects as the first embodiment such that it is possible to realize a daylighting device which is able to improve the brightness of a room without the user in the room experiencing much glare.

Specifically, in a case of the second embodiment, the first warp 5A and the second warp 5B are stretched over the second portion 42N which has greater aspect ratio than the first portion 42M out of the linear bodies 42. Therefore, the effect where the first warp 5A and the second warp 5B suppress the linear bodies from rotating is greater than the first embodiment in which the linear bodies do not have a cut-out section. Thus, the predetermined light distribution is more reliably maintained in the planar optical member 41 than in the first embodiment. Furthermore, the positional shift in the length direction of the linear bodies 42N is suppressed by the first warp 5A and the second warp 5B being stretched over the second portion 42N. Due to this, an effect of being able to prevent the linear bodies 42 from being dropped is also obtained.

[First Modification Example of Linear Body]

Description will be given of the first modification example of the linear bodies 42 of the second embodiment.

It is possible to adopt various types of shapes for the cut-out section for forming the second portion (the binding section) of the linear body.

Figure 22:
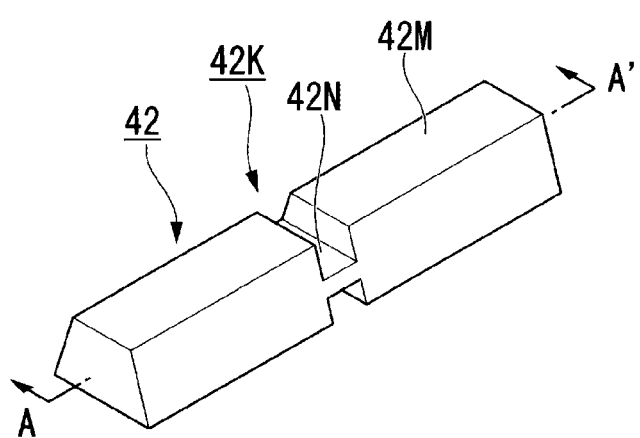
FIG. 22 is a perspective view which shows a first modification example of a linear body which is used for the planar optical member of the second embodiment.
Figure 23A:
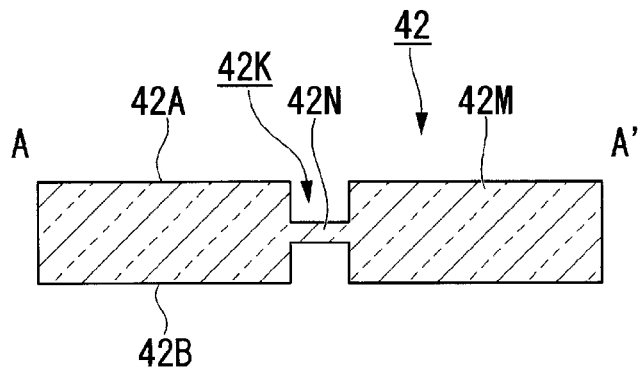
FIG. 23A is a first cross-sectional view which shows the first modification example of the linear body.
Figure 23B:
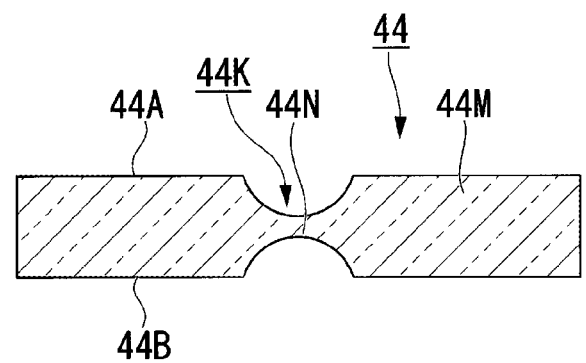
FIG. 23B is a second cross-sectional view which shows the first modification example of the linear body.
Figure 23C:
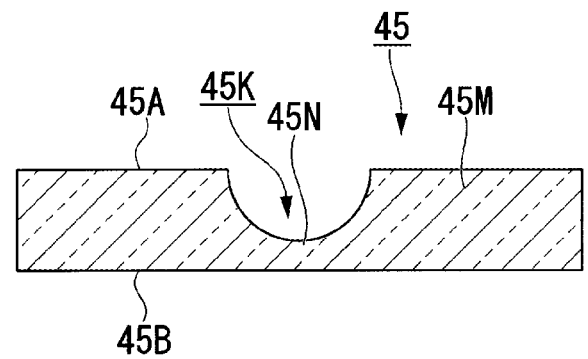
FIG. 23C is a third cross-sectional view which shows the first modification example of the linear body.

The linear body 42 shown in FIG. 22 is a linear body which is used in the second embodiment. FIG. 23A is a cross-sectional view taken along a line A-A' in FIG. 22. In this manner, the cut-out section 42K of the second portion 42N of the linear body 42 may be a groove of which the cross-sectional shape which is provided on both the front surface 42B side and the rear surface 42A side is rectangular. Alternatively, as shown in FIG. 23B, a cut-out section 44K of a second portion 44N of a linear body 44 may be a groove of which the cross-sectional shape provided on both a front surface 44B side and a rear surface 44A side is circular. Alternatively, as shown in FIG. 23C, a cut-out section 45K of a second portion 45N of a linear body 45 may be a groove which is provided in only one of the surface 45B side or the rear surface 45A side.

[Second Modification Example of Linear Body]

Description will be given of the second modification example of the linear body 42 of the second embodiment.

The second portion (the binding section) need not be a configuration in which a cut-out section is simply provided with respect to the first portion.

Figure 24:
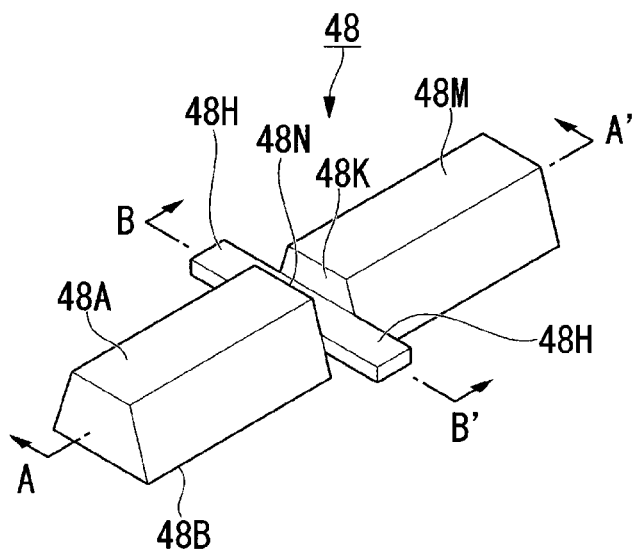
FIG. 24 is a perspective view which shows the second modification example of the linear body.
Figure 25A:
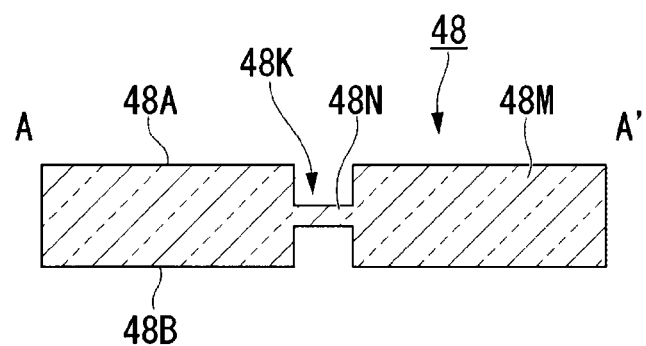
FIG. 25A is a cross-sectional view taken along a line A-A' in FIG. 24.
Figure 25B:
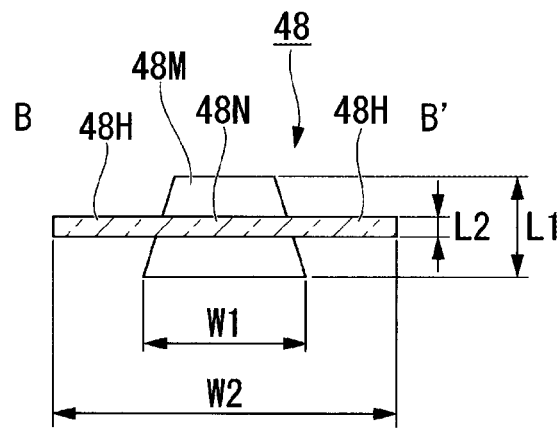
FIG. 25B is a cross-sectional view taken along a line B-B' in FIG. 24.

FIG. 24 is a perspective view which shows the linear body of the second modification example. FIG. 25A is a cross-sectional view taken along a line A-A' in FIG. 24. FIG. 25B is a cross-sectional view taken along a line B-B' in FIG. 24.

As shown in FIG. 24, a second portion 48N in a linear body 48 of the second modification example has a cut-out section 48K which is cut out from a front surface 48B and a rear surface 48A of the linear body 48 toward the inner side and a projecting section 48H which projects toward the outer side in a direction which is parallel to the front surface 48B and the rear surface 48A of the linear body 48. By the second portion 48N having the projecting section 48H, as shown in FIG. 25B, the aspect ratio W2/L2 of the second portion 48N is sufficiently great compared to the aspect ratio W1/L1 of a first portion 48M. Due to this, the effect of preventing the linear body 48 from rotating is greater.

[Third Modification Example of Linear Body]

Description will be given of the third modification example of the linear body 42 of the second embodiment.

In addition to providing a cut-out section in the second portion of the linear body, the configuration may have a thickened first portion.

Figure 26:
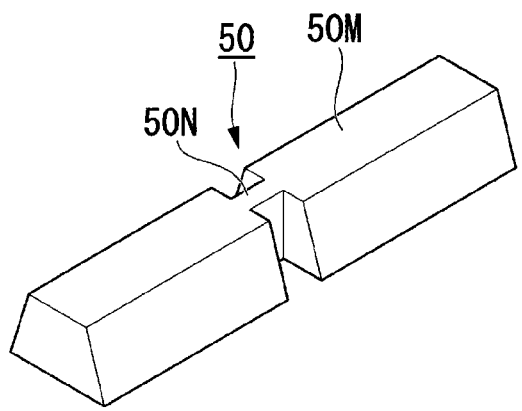
FIG. 26 is a perspective view which shows a third modification example of the linear body.
Figure 27A:
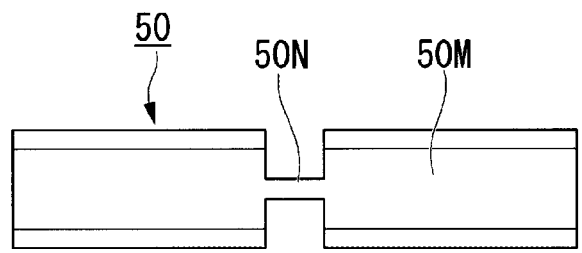
FIG. 27A is a first lateral view which shows the third modification example of the linear body.
Figure 27B:
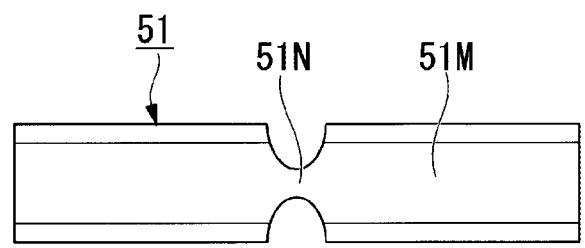
FIG. 27B is a second lateral view which shows the third modification example of the linear body.
Figure 27C:
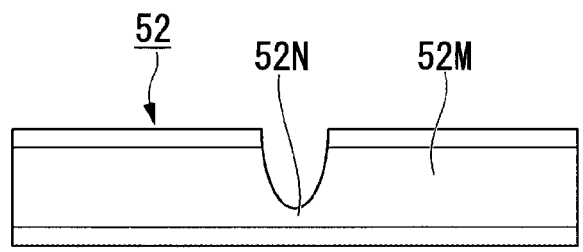
FIG. 27C is a third lateral view which shows the third modification example of the linear body.

FIG. 26 is a perspective view which shows a second modification example of the linear body. FIG. 27A is a plan view of the linear body in FIG. 26. FIG. 27B and FIG. 27C are plan views which show other modification examples.

As shown in FIG. 27A, a linear body 50 of the third modification example has a first portion 50M where the first portion 42M in the linear body 42 of the second embodiment shown in FIG. 23A is thickened.

A linear body 51 shown in FIG. 27B has a first portion 51M where the first portion 44M in the linear body 44 of the first modification example in FIG. 23B is thickened. A linear body 52 shown in FIG. 27C has a first portion 52M where the first portion 45M in the linear body 45 of the first modification example shown in FIG. 23C is thickened. The shape of the thickened portion may be any shape such as rectangular, circular, or triangular.

Third Embodiment

Description will be given of the third embodiment of the present invention using FIG. 28.

The basic configuration of the planar optical member of the third embodiment is the same as the first embodiment, but the configuration of the linear body is different from the first embodiment.

Figure 28:
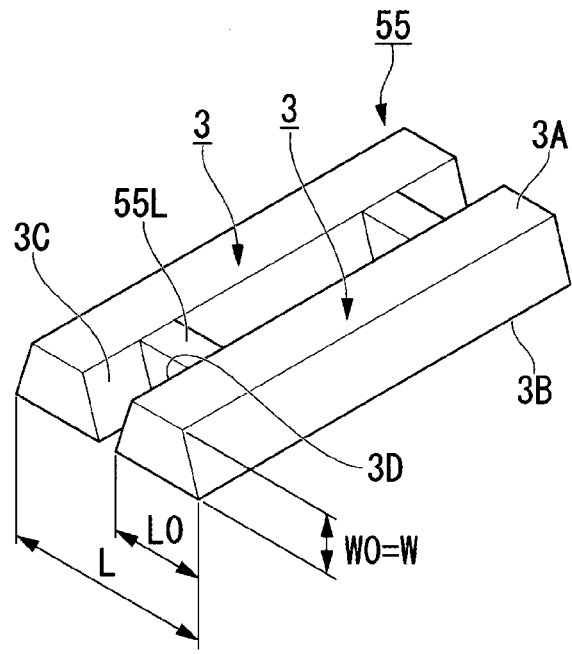
FIG. 28 is a perspective view which shows a linear body which is used for a planar optical member of a third embodiment.

FIG. 28 is a perspective view which shows the linear body of the third embodiment.

In FIG. 28, the same reference numerals are used for the constituent elements which are common to the diagrams which are used in the first embodiment and detailed description thereof will be omitted.

As a means for improving the effect of suppressing the linear body from rotating, the second embodiment is configured such that a second portion of which the aspect ratio is higher than the first portion is provided in a part of one linear body and the second portion binds a plurality of linear bodies. Instead of this configuration, in the third embodiment, as shown in FIG. 28, a linking linear body 55 which is integrated by linking two of the linear bodies 3 used in the first embodiment is used. A linking section 55L is provided at certain intervals in the length direction of the linear body 3 in a form protruding from the inclined surfaces 3C and 3D of the linear body 3 to the outside. Two of the linear bodies 3 are linked by the linking section 55L in a state of being arranged in parallel to each other. By creating the linking linear body 55 by linking two of the linear bodies 3, the aspect ratio W/L of the linking linear body 55 is greater than the aspect ratio W0/L0 of the linear body 3.

Using a plurality of this type of linking linear bodies 55, a plurality of the linking linear bodies 55 are bound by a warp such that the orientations of the reflective surfaces 3C of all of the linking linear bodies 55 substantially match and the orientations of the refractive surfaces 3A and 3B of all of the linking linear bodies substantially match.

According to the planar optical member of the third embodiment, it is possible to obtain the same effects as the first and second embodiments such that it is possible to realize a daylighting device which is able to improve the brightness of a room without the user in the room experiencing much glare.

Specifically, in a case of the third embodiment, the aspect ratio of the linking linear body 55 is greater than the aspect ratio of the linear body 3 of the first embodiment. Therefore, the effect of suppressing the linking linear body 55 from rotating is greater than that of the first embodiment. Therefore, the predetermined light distribution in the planar optical member is more reliably maintained compared to the first embodiment.

[Modification Example of Linear Body]

Description will be given of a modification example of the linear body of the third embodiment.

Figure 29:
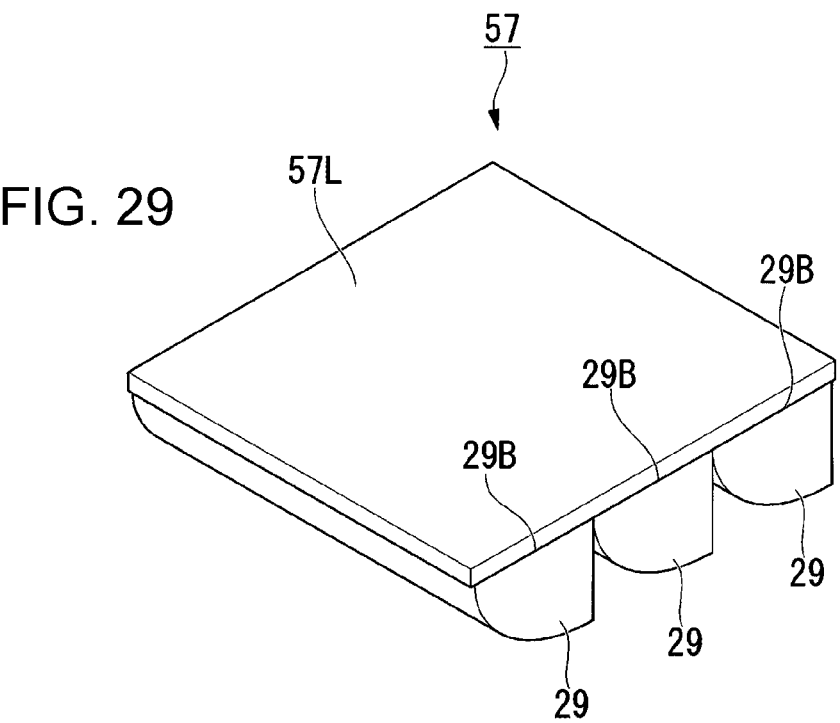
FIG. 29 is a perspective view which shows a modification example of the linear body.

FIG. 29 is a perspective view which shows a linear body of the modification example.

In the linking linear body 55 of the third embodiment, the linking section 55L protrudes from the inclined surfaces 3C and 3D of the linear body 3 to the outside. Instead of this configuration, a linking section 57L in a linking linear body 57 of the modification example is configured by a board body which is arranged over a front surface 29B of a plurality of linear bodies 29. In the example in FIG. 29, three of the linear bodies 29 are linked by the flat linking section 57L being fixed over the front surface 29B of the three of the linear bodies 29. In this case, the aspect ratio of the linking linear body 57 is also greater than the aspect ratio of a linear body 29 before being linked. Due to this, it is possible to obtain the same effects as the third embodiment.

Fourth Embodiment

Description will be given of the fourth embodiment of the present invention using FIG. 30 and FIG. 31.

The basic configuration of the planar optical member of the fourth embodiment is the same as the first embodiment, but the configuration of the linear body is different from the first embodiment.

Figure 30:
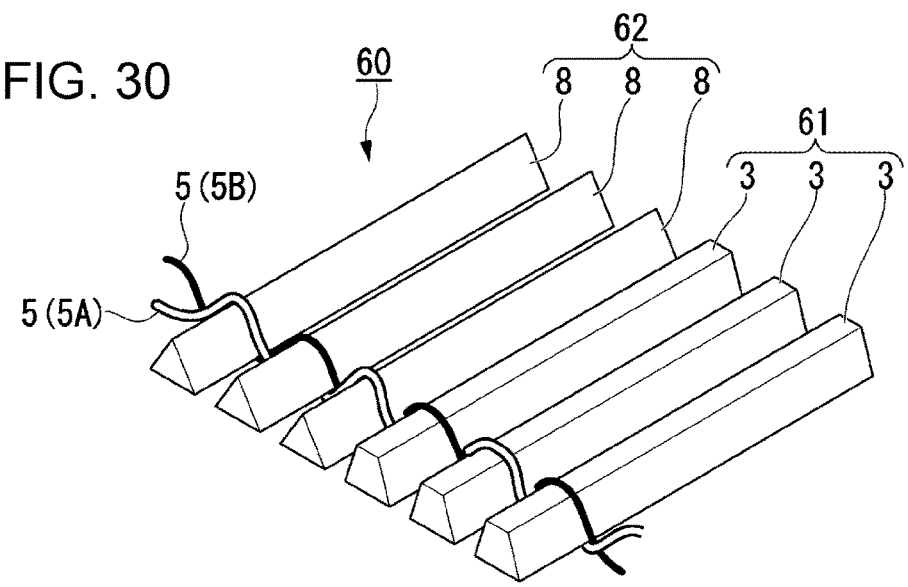
FIG. 30 is a perspective view which shows a planar optical member of a fourth embodiment.

FIG. 30 is a perspective view which shows a planar optical member of the fourth embodiment. FIG. 31 is a view which shows a state where light is reflected by the planar optical member.

Figure 31:
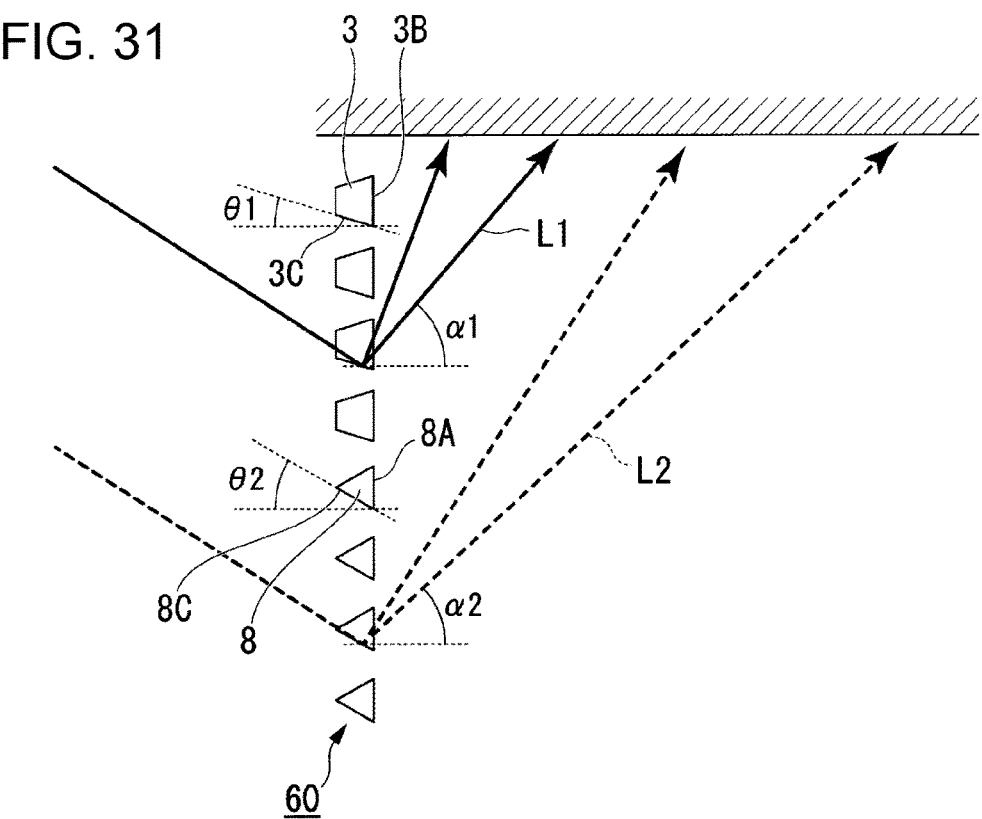
FIG. 31 is a view which shows a state where light is reflected by the planar optical member.

In FIG. 30 and FIG. 31, the same reference numerals are used for the constituent elements which are common to the diagrams which are used in the first embodiment and detailed description thereof will be omitted.

The planar optical member 1 of the first embodiment is configured by only one type of the linear body 3. With respect to this, a planar optical member 60 of the fourth embodiment is configured by two types of linear bodies 3 and 8 which have different cross-sectional shapes as shown in FIG. 30. The planar optical member 60 is provided with linear bodies 3 of which the cross-sectional shape is a trapezoid (quadrangular) and linear bodies 8 of which the cross-sectional shape is triangular. In the fourth embodiment, in order to simplify the description, the linear body 3 of which the cross-sectional shape is quadrangular is referred to as a first linear body 3 and the linear body 8 of which the cross-sectional shape is triangular is referred to as a second linear body 8. A first unit 61 in which three of the first linear bodies 3 are arranged in parallel to each other and a second unit 62 in which three of the second linear bodies 8 are arranged in parallel to each other are alternately arranged.

As shown in FIG. 31, all of the linear bodies 3 and 8 are arranged in the same orientation such that the front surfaces 3B and 8B on the light emitting side are lined up substantially on the same planar surface. In the three of the first linear bodies 3 which configure the first unit 61, the orientations of the reflective surfaces 3C substantially match. In the same manner, in the three of the second linear bodies 8 which configure the second unit 62, the orientations of the reflective surfaces 8C substantially match. Since the first linear bodies 3 and the second linear bodies 8 have different cross-sectional shapes, the orientations of the reflective surface 3C and 8C do not match between the first linear bodies 3 and the second linear bodies 8 and face different directions. That is, in the planar optical member, the orientations of the reflective surfaces 3C and 8C all of the linear bodies need not necessarily substantially match and the orientations of the refractive surfaces of all of the linear bodies need not necessarily substantially match. The orientations of the reflective surfaces of some linear bodies out of a plurality of linear bodies may substantially match and the orientations of the refractive surfaces of some linear bodies may substantially match.

An angle θ1 between the lower side inclined surface 3C which is the reflective surface of the first linear body 3 and the horizontal plane is smaller than an angle θ2 between the lower side inclined surface 8C which is the reflective surface of the second linear body 8 and the horizontal plane. Therefore, even when light is incident at the same angle with respect to the first linear body and the second linear body, the light L1 which is reflected by the lower side inclined surface 3C of the first linear body 3 and the light L2 which is reflected by the lower side inclined surface 8C of the second linear body 8 have different proceeding directions. An angle α1 between the proceeding direction of the light L1 which is reflected by the lower side inclined surface 3C of the first linear body 3 and the horizontal plane is greater than an angle α2 between the proceeding direction of the light L2 which is reflected by the lower side inclined surface 8C of the second linear body 8 and the horizontal plane. Therefore, in a case of installing the planar optical member 60 by the window in a room, the light L1 which is emitted from the first linear body 3 reaches, for example, a region on a side which is closer to the window in the ceiling. On the other hand, the light L2 which is emitted from the second linear body 8 reaches, for example, a region on a side which is further from the window in the ceiling.

According to the planar optical member 60 of the fourth embodiment, it is possible to obtain the same effects as the first to third embodiments such that it is possible to realize a daylighting device which is able to improve the brightness of a room without the user in the room experiencing much glare.

Specifically, in the fourth embodiment, the planar optical member 60 is provided with the first linear bodies 3 and the second linear bodies 8 which have different cross-sectional shapes. Therefore, it is possible to differentiate the proceeding directions of the light L1 and L2 which is emitted from the linear bodies 3 and 8 and make the illumination distribution uniform in the room. The planar optical member 60 is, for example, provided with a site for illuminating the vicinity directly above the installation position of the planar optical member 60 and a site which illuminates locations which are far from directly above the installation position of the planar optical member. Due to this, the planar optical member 60 is able to reduce the unevenness of the light distribution.

The position of the sun changes according to the time of day and even changes at the same time of day according to the season. With respect to this, according to the fourth embodiment, by optimizing the types of linear bodies to be used, the repeating units, the arrangements, and the like, it is possible to realize a planar optical member with which it is possible to always obtain a desired light distribution regardless of changes in the position of the sun.

[Modification Example of Planar Optical Member]

Description will be given of a modification example of the planar optical member of the fourth embodiment.

Figure 32:
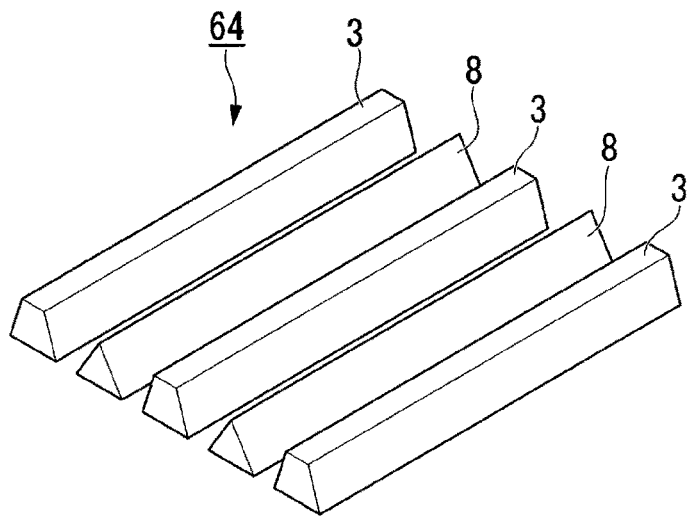
FIG. 32 is a plan view which shows a modification example of the planar optical member.

FIG. 32 is a perspective view which shows the planar optical member of the modification example.

In the planar optical member 60 of the fourth embodiment, the first linear bodies 3 and the second linear bodies 8 are alternately arranged as a plurality of units. Instead of this configuration, in a planar optical member 64 of the modification example, each linear body of the first linear bodies 3 and the second linear bodies 8 is alternately arranged. In this configuration, when only viewing the first linear bodies 3, the orientations of the reflective surfaces and the refractive surfaces also substantially match over all the first linear bodies 3. When only viewing the second linear bodies 8, the orientations of the reflective surfaces and the refractive surfaces also substantially match over all the second linear bodies 8. In the planar optical member 64 of the modification example, the same effects as the fourth embodiment are also obtained.

In the fourth embodiment, a planar optical member where two types of linear bodies of the first linear body 3 of which the cross-sectional shape is a trapezoid and the second linear body 8 of which the cross-sectional shape is triangular are mixed is given as an example. However, the mixed linear bodies are not necessarily limited to two types and may be three or more types. In a case of mixing different types of linear bodies, linear bodies which are different with regard to the presence or absence of a cut-out section in the linear bodies, the shape, the style of weaving with the warp, and the like, may also be combined as appropriate according to the linear bodies.

Fifth Embodiment

Description will be given of the fifth embodiment of the present invention using FIG. 33 and FIG. 34.

The basic configuration of the planar optical member of the fifth embodiment is the same as the first embodiment, but the form of binding a plurality of linear bodies is different from the first embodiment.

Figure 33:
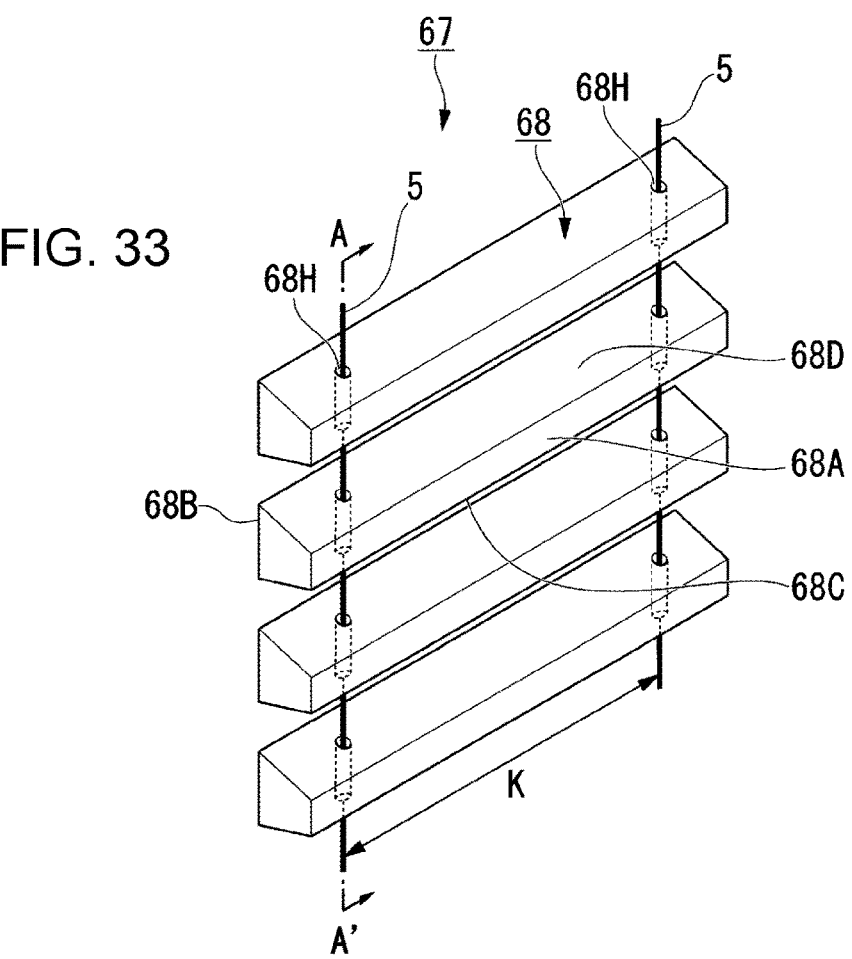
FIG. 33 is a perspective view which enlarges a binding section of a planar optical member of a fifth embodiment.

FIG. 33 is a perspective view which shows the planar optical member of the fifth embodiment. FIG. 34 is a cross-sectional view taken along a line A-A' in FIG. 33.

Figure 34:
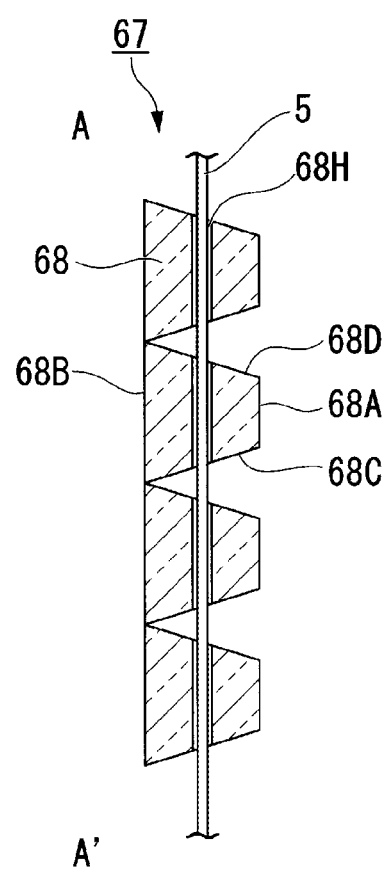
FIG. 34 is a cross-sectional view taken along a line A-A' in FIG. 33.

In FIG. 33 and FIG. 34, the same reference numerals are used for the constituent elements which are common to the diagrams which are used in the first embodiment and detailed description thereof will be omitted.

As shown in FIG. 33 and FIG. 34, in a planar optical member 67 of the fifth embodiment, linear bodies 68 of which the cross-sectional shape is a trapezoid which is the same as the first embodiment are used. Holes 68H are provided in the linear bodies 68 so as to pass therethrough in a direction which is parallel to a front surface 68B and a rear surface 68A. A plurality of the holes 68H are provided at intervals K in the length direction of the linear bodies 68. The holes 68H are provided to be lined up at the same positions in the length direction over the plurality of the linear bodies 68. The warp 5 binds the plurality of the linear bodies 68 in a state of passing through the holes 68H of the plurality of the linear bodies 68. By the warp 5 being inserted in the holes 68H of the plurality of the linear bodies 68, the orientations of the reflective surfaces 68C of the plurality of the linear bodies 68 substantially match and the orientations of the refractive surfaces 68A and 68B of the plurality of the linear bodies 68 substantially match.

The internal diameter of the holes 68H of the linear bodies 68 is slightly larger than the outer diameter of the warp 5 and there is a minute clearance between the inner wall of the holes 68H and the warp 5. Therefore, strictly speaking, the linear bodies 68 rotate at only a minute angle within a range of the clearance; however, the angle is within the allowable range.

According to the planar optical member 67 of the fifth embodiment, it is possible to obtain the same effects as the first to fourth embodiments such that it is possible to realize a daylighting device which is able to improve the brightness of a room without the user in the room experiencing much glare. In addition, by the warp 5 being inserted in the holes 68H of the plurality of the linear bodies 68, it is possible to suppress the rotation of the linear bodies 68 and the positional shifting in the length direction.

[Modification Example of Planar Optical Member]

Description will be given of a modification example of the planar optical member of the fifth embodiment.

Figure 35A:
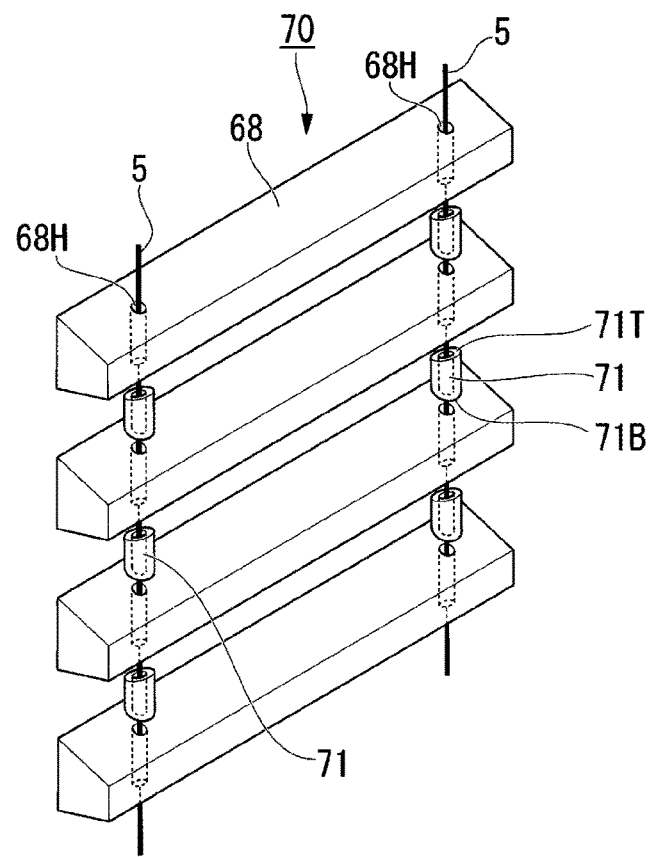
FIG. 35A is a perspective view which shows a modification example of the planar optical member.
Figure 35B:
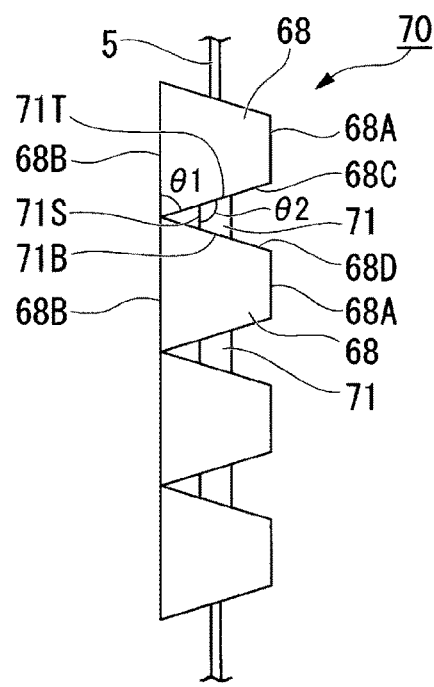
FIG. 35B is a lateral view which shows a modification example of the planar optical member.

FIG. 35A is a perspective view of the planar optical member of the modification example. FIG. 35B is a lateral view of the planar optical member of the modification example.

As shown in FIG. 35A and FIG. 35B, in a planar optical member 70 of the modification example, a cylindrical spacer 71 is arranged between the adjacent linear bodies 68. The warp 5 is inserted in the spacer 71 in the space between the adjacent linear bodies 68. An upper end 71T and a lower end 71B of the spacer 71 are diagonally cut matching an angle between the lower side inclined surface 68C of the linear bodies 68 on the upper side and the upper side inclined surface 68D of the linear bodies 68 on the lower side.

In detail, when the angle between the front surface 68B of the linear bodies 68 and the lower side inclined surface 68C is θ1 and the angle between a side surface 71S of the spacer 71 and the upper end 71T is θ2, θ2=180°−θ1 is set. Due to this, the upper end 71T and the lower end 71B of the spacer 71 come into contact with the lower side inclined surface 68C of the linear bodies 68 on the upper side and the upper side inclined surface 68D of the linear bodies 68 on the lower side without gaps. In the planar optical member 70 of the modification example, the same effects as the fifth embodiment are also obtained. Furthermore, by the spacer 71 of which both ends are diagonally cut being inserted between the adjacent linear bodies 68, it is possible to prevent the linear bodies 68 from being rotated even a little due to the clearance between the inner wall of the holes 68H and the warp 5.

Sixth Embodiment

Description will be given of the sixth embodiment of the present invention using FIG. 36 and FIG. 37.

The basic configuration of the planar optical member of the sixth embodiment is the same as the first embodiment, but the point of being provided with two layer planar structure bodies is different from the first embodiment.

Figure 36:
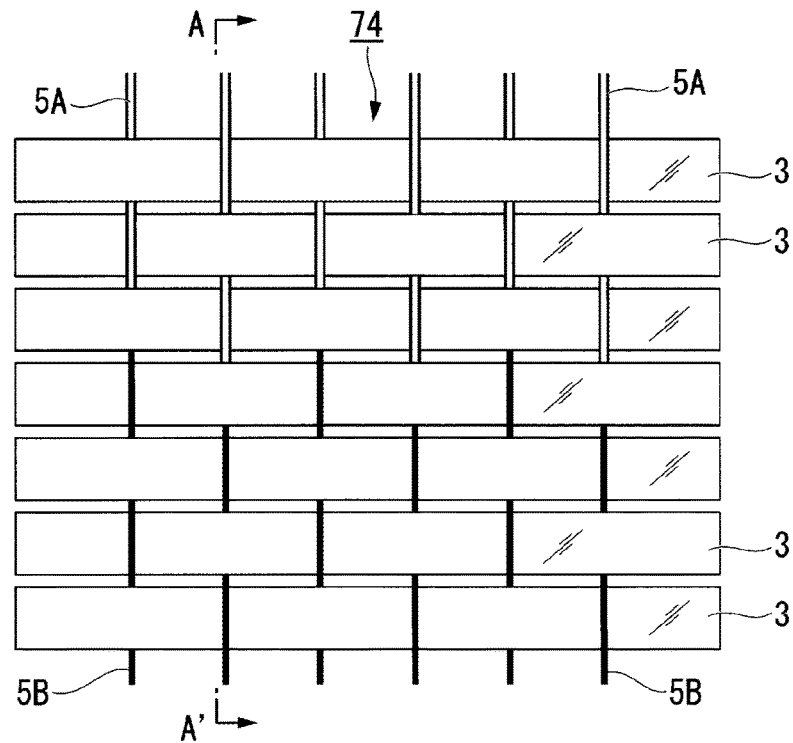
FIG. 36 is a plan view which shows a planar optical member of a sixth embodiment.

FIG. 36 is a plan view which shows the planar optical member of the sixth embodiment. FIG. 37 is a cross-sectional view taken along a line A-A' in FIG. 36.

Figure 37:
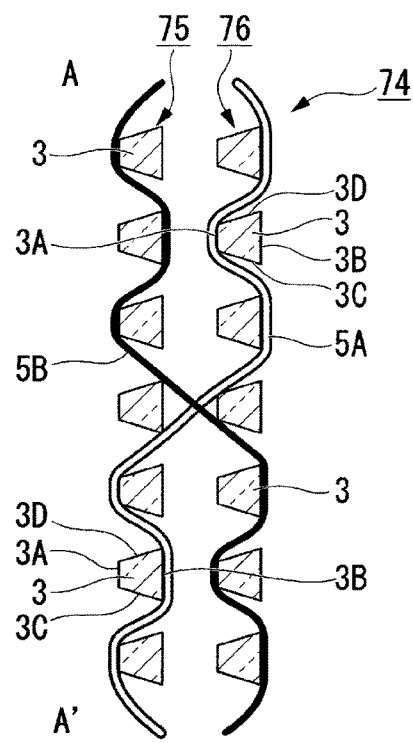
FIG. 37 is a cross-sectional view taken along a line A-A' in FIG. 36.

In FIG. 36 and FIG. 37, the same reference numerals are used for the constituent elements which are common to the diagrams which are used in the first embodiment and detailed description thereof will be omitted.

As shown in FIG. 37, a planar optical member 74 of the sixth embodiment is configured by two layers of planar structure bodies 75 and 76. The two layers of the planar structure bodies 75 and 76 are arranged at intervals such that the main surfaces of each of the planar structure bodies 75 and 76 are opposed to each other. The planar structure bodies 75 and 76 have the same configuration and are provided with a plurality of the linear bodies 3 and a plurality of the warps 5A and 5B. The plurality of the linear bodies 3 are arrayed substantially in parallel to each other in the horizontal direction. The plurality of the warp 5A and 5B extend in a direction which substantially intersects with the plurality of the linear bodies 3, that is, the vertical direction. As shown in FIG. 36, the planar structure bodies 75 and 76 have a configuration in which the plurality of the linear bodies 3 and the plurality of the warps 5A and 5B are woven by a plain weave.

As shown in FIG. 37, the warps 5A and 5B which are used in the two planar structure bodies 75 and 76 alternate at specific locations. That is, when viewed in the up and down direction, the warp 5A which configures the planar structure body 76 on a front layer side is drawn out to the rear surface side at specific locations and configures the planar structure body 75 on a rear layer side. In contrast, the warp 5B which configures the planar structure body 75 on the rear layer side is drawn out to the front surface side at specific locations and configures the planar structure body 76 on the front layer side.

According to the planar optical member 74 of the sixth embodiment, it is possible to obtain the same effects as the first to fifth embodiments such that it is possible to realize a daylighting device which is able to improve the brightness of a room without the user in the room experiencing much glare.

In a case of the sixth embodiment in particular, since the planar optical member 74 is configured by the two layer planar structure bodies 75 and 76, for example, there may be cases where the light which passes through the gaps in the linear bodies 3 of the planar structure body 75 on the rear layer side is incident to the linear bodies 3 of the planar structure body 76 on the front layer side. Accordingly, even in a case where the gaps between the adjacent linear bodies 3 are wide, little light passes through the gaps and the user in the room does not experience much glare. Furthermore, since the warp 5A and 5B alternate on the front and rear, for example, it is possible to increase the degree of design freedom when the colors of the threads are changed or the like.

[First Modification Example of Planar Optical Member]

Description will be given of the first modification example of the planar optical member of the sixth embodiment.

Figure 38A:
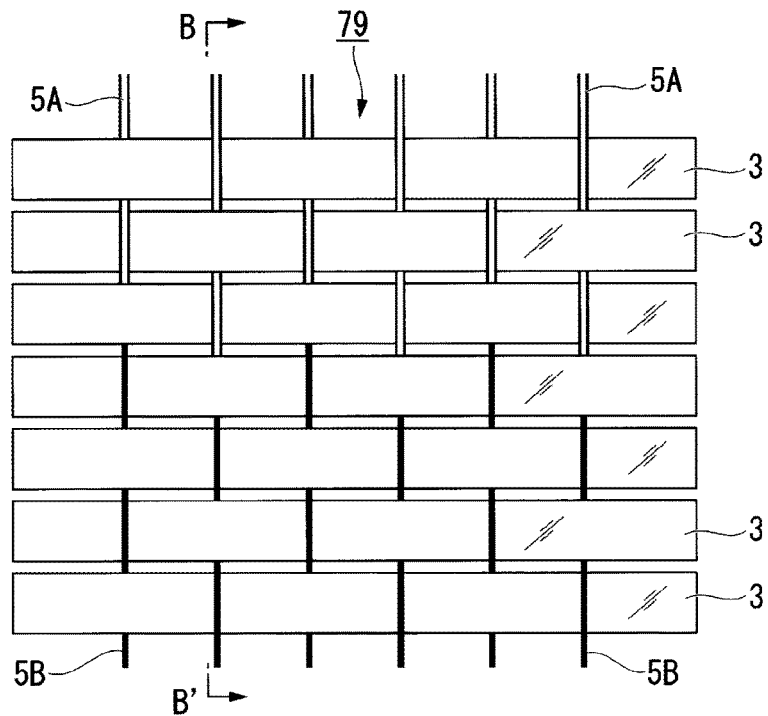
FIG. 38A is a plan view which shows a modification example of the planar optical member.
Figure 38B:
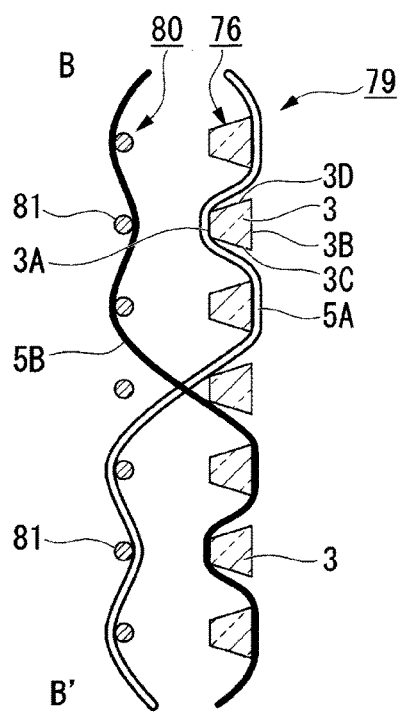
FIG. 38B is a cross-sectional view taken along a line B-B' in FIG. 38A.

FIG. 38A is a plan view of the planar optical member of the first modification example. FIG. 38B is a cross-sectional view taken along a line B-B' in FIG. 38A.

As shown in FIGS. 38A and 38B, a planar optical member 79 of the first modification example has a two layer configuration in the same manner as the sixth embodiment; however, the planar structure body 76 which includes the plurality of the linear bodies 3 is only on the front layer side and the rear layer side is a woven fabric 80. That is, a normal thread 81 is also arranged on the rear layer side in a horizontal direction instead of the linear bodies 3 and the rear layer side is configured by the woven fabric 80 formed of a weft 81 and the warps 5A and 5B. In this case, since the woven fabric 80 is arranged on the light incident side of the planar structure body 76, the stitching is preferably large enough to take light in. In the planar optical member 79 of the first modification example, the same effects as the sixth embodiment are also obtained.

[Second Modification Example of Planar Optical Member]

Description will be given of the second modification example of the planar optical member of the sixth embodiment.

Figure 39A:
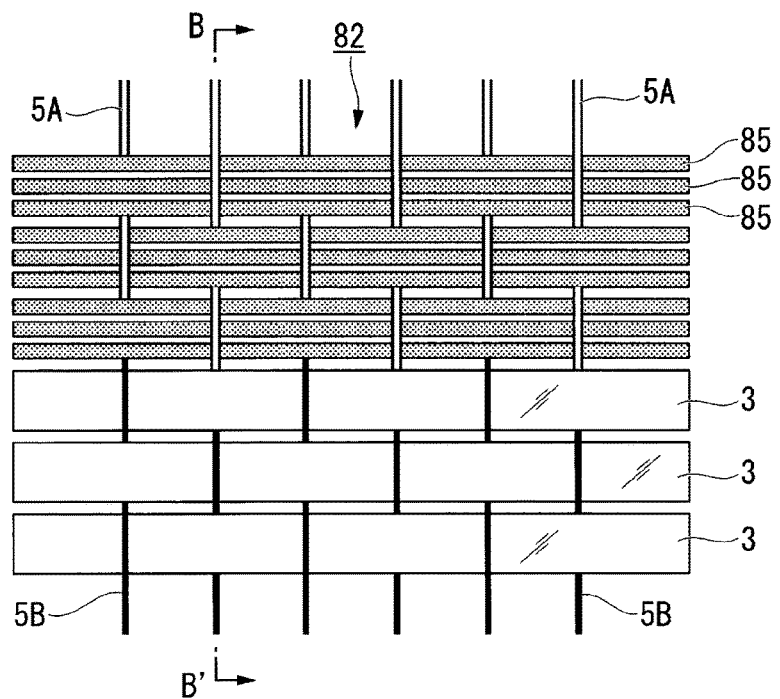
FIG. 39A is a plan view which shows another modification example of the planar optical member.
Figure 39B:
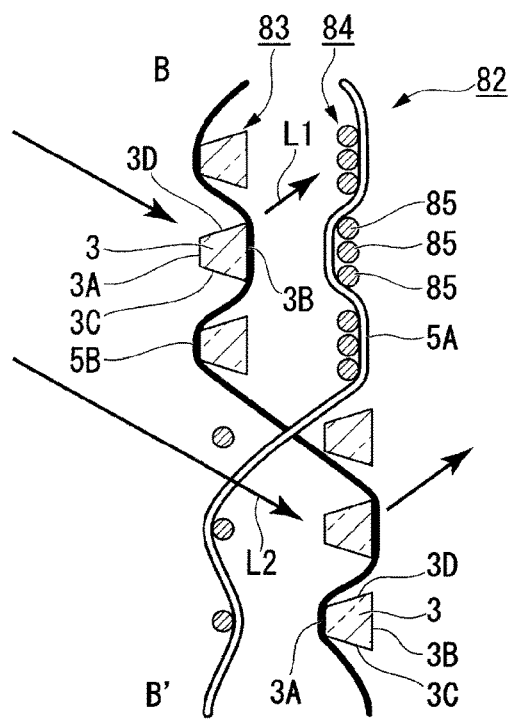
FIG. 39B is a cross-sectional view taken along a line B-B' in FIG. 39A.

FIG. 39A is a plan view of the planar optical member of the second modification example. FIG. 39B is a cross-sectional view taken along a line B-B' in FIG. 39A.

As shown in FIGS. 39A and 39B, in a planar optical member 82 of the second modification example, the warps 5A and 5B which are used in two planar structure bodies 83 and 84 alternate at specific locations in the same manner as the sixth embodiment. Furthermore, in the planar structure body 84 on the front layer side, a plurality of wefts 85 with a light shielding property are arranged on the upper side of the intersecting locations of the warp 5A and 5B and a plurality of the linear bodies 3 are arranged on the lower side of the intersecting locations of the warp 5A and 5B. In contrast, in the planar structure body 83 on the rear layer side, the plurality of the linear bodies 3 are arranged on the upper side of the intersecting locations of the warp 5A and 5B and the plurality of the wefts 85 with a light shielding property are arranged on the lower side of the intersecting locations of the warp 5A and 5B.

In the planar optical member 82 of the second modification example, the same effects as the sixth embodiment are also obtained. Furthermore, in a case of the second modification example, for example, the portion of the weft 85 in the planar structure body 84 on the front layer side has clogged stitching and the portion of the weft 85 in the planar structure body 83 on the rear layer side has a large mesh. In this manner, the light L1 which passes through the linear bodies 3 of the planar structure body 83 on the rear layer side is shielded by the portion of the weft 85 of the planar structure body 84 on the front layer side. On the other hand, the light L2 which passes through the gaps in the portion of the weft 85 of the planar structure body 83 on the rear layer side passes through the linear bodies 3 of the planar structure body 84 on the front layer side. Due to this, it is possible to realize a planar optical member imparted with a contrast with different brightness according to the place on the surface.

Seventh Embodiment

Description will be given of the seventh embodiment of the present invention using FIG. 40A and FIG. 40B.

In the seventh embodiment, a daylighting device which is provided with the planar optical member of the first to sixth embodiments will be given as an example.

Figure 40A:
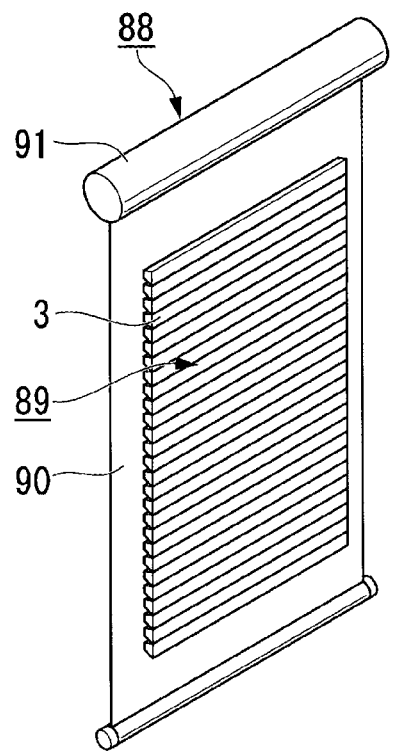
FIG. 40A is a perspective view which shows a daylighting device of a seventh embodiment in a light collecting state.
Figure 40B:
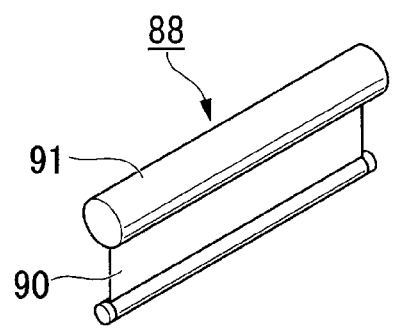
FIG. 40B is a perspective view which shows the daylighting device of the seventh embodiment in a stored state.

FIG. 40A and FIG. 40B are perspective views which show the planar optical member of the seventh embodiment and FIG. 40A shows a light collecting state and FIG. 40B shows a stored state.

In FIG. 40A and FIG. 40B, the same reference numerals are used for the constituent elements which are common to the diagrams which are used in the first embodiment and detailed description thereof will be omitted.

As shown in FIGS. 40A and 40B, a daylighting device 88 of the seventh embodiment is provided with a planar optical member 89 of the first to sixth embodiments, a support member 90 which supports the planar optical member 89, and a winding mechanism 91 which is able to wind the planar optical member 89 in and out. The daylighting device 88 is, for example, installed by the window and takes sunlight into the room through the planar optical member 89.

The support member 90 is, for example, configured by fabric, optically opaque members, members for adding color to the linear bodies of the planar structure body, and the like, and a part thereof is an optically transparent section. The optically transparent section may be an opening section where the fabric, optically opaque members, members for adding color to the linear bodies of the planar structure body, or the like are opened, or the opening section may be covered by an optically transparent member. The planar optical member 89 is arranged to match the optically transparent section of the support member 90. The winding mechanism 91 preferably has a configuration which stops at an arbitrary position when the planar optical member 89 is taken out along with the support member 90 from the stored state shown in FIG. 40B. It is possible to adopt, for example, a mechanism which is used for a roll screen for the winding mechanism 91. Specific examples of the optically opaque members include optical members with light scattering property and a light shielding property such as frosted glass. In addition, other than members for adding color to the linear bodies of a planar structure body, members imparting a light scattering property and a light shielding property to the linear bodies of the planar structure body may also be adopted.

The members adding coloring, a light scattering property, and a light shielding property need not necessarily have the same structure as the linear bodies of the planar structure body. In addition, in a case where it is difficult to wind the support member which is configured by the members, the configuration may be foldable and is not necessarily windable.

According to the daylighting device 88 of the seventh embodiment, by using the planar optical member 89 of the first to sixth embodiments, the user in a room does not experience much glare and it is possible to obtain a daylighting device which is able to improve the brightness of the room. In addition, since it is possible to switch between a light collecting state and a stored state, for example, there is flexibility in the uses such as installation at a place where the scenery is important and switching the daylighting device 88 to a stored state when viewing the scenery.

[First Modification Example of Daylighting Device]

Description will be given of the first modification example of the daylighting device of the seventh embodiment.

Figure 41:
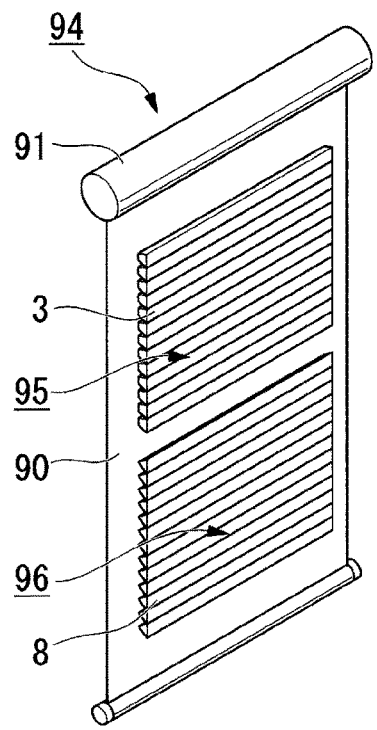
FIG. 41 is a perspective view which shows a modification example of the daylighting device.

FIG. 41 is a perspective view of the daylighting device of the first modification example.

As shown in FIG. 41, in a daylighting device 94 of the first modification example, a light collecting surface is divided by two in the vertical direction and different types of planar optical members 95 and 96 are arranged in the upper half and the lower half. The planar optical member 95 on the upper side is, for example, configured by the linear bodies 3 of which the cross-sectional shape is a trapezoid. The planar optical member 96 on the lower side is, for example, configured by the linear bodies 8 of which the cross-sectional shape is triangular.

The types of the linear bodies which configure each of the planar optical members 95 and 96 are not limited thereto and appropriate changes thereto are possible. The same types of planar optical members may be arranged in the upper half and the lower half. However, in a case where different types of planar optical members are arranged, an effect that it is possible to reduce the unevenness of the light distribution and further make the illumination distribution uniform in a room is obtained in the same manner as the planar optical member 60 of the fourth embodiment shown in FIG. 30.

When a plurality of planar optical members with different light distribution are prepared and have a configuration in which replacement is possible, it is possible for the user to accordingly select an appropriate planar optical member according to changes in the height of the sun according to the season and changes in the incident angle of the sunlight according to diurnal motion. Due to this, it is possible to realize a daylighting device which is able to always obtain a desired light distribution.

[Second Modification Example of Daylighting Device]

Description will be given of the second modification example of the daylighting device of the seventh embodiment.

Figure 42:
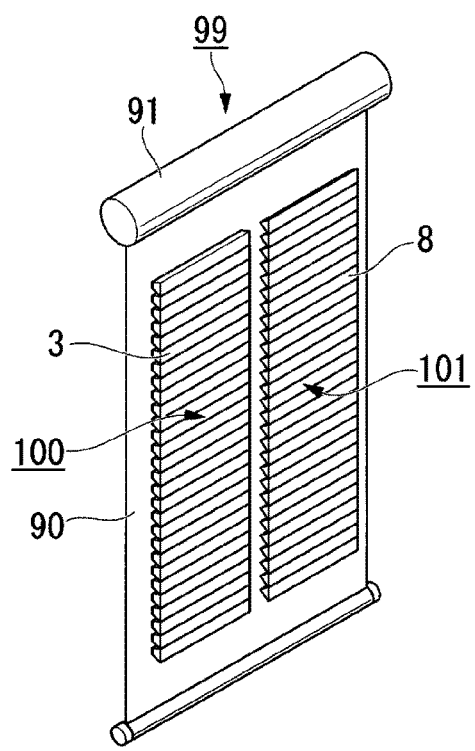
FIG. 42 is a perspective view which shows another modification example of the daylighting device.

FIG. 42 is a perspective view of the daylighting device of the second modification example.

As shown in FIG. 42, in a daylighting device 99 of the second modification example, a light collecting surface is divided by two in the horizontal direction and different types of planar optical members 100 and 101 are arranged in the left half and the right half. The planar optical member 100 on the left side is, for example, configured by the linear bodies 3 of which the cross-sectional shape is a trapezoid. The planar optical member 101 on the right side is, for example, configured by the linear bodies 8 of which the cross-sectional shape is triangular. In the daylighting device 99 of the second modification example, the same effects as the daylighting device of the first modification example are also obtained.

Eighth Embodiment

Description will be given of the eighth embodiment of the present invention using FIGS. 43A and 43B.

Figure 43A:
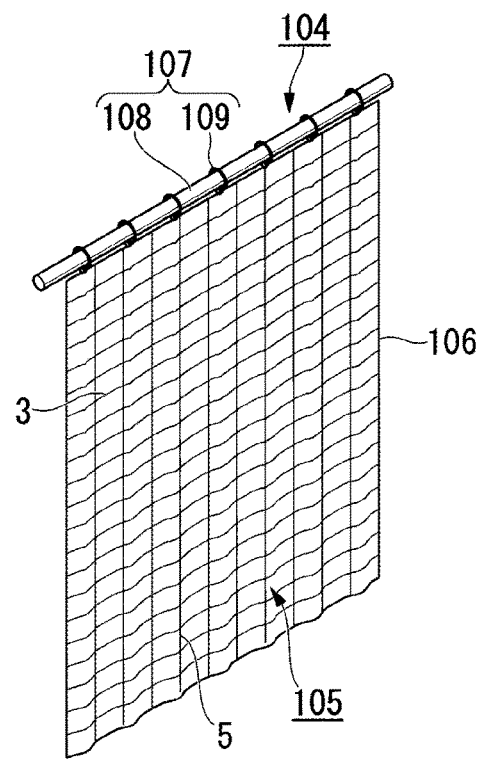
FIG. 43A is a perspective view which shows a daylighting device of an eighth embodiment in a light collecting state.
Figure 43B:
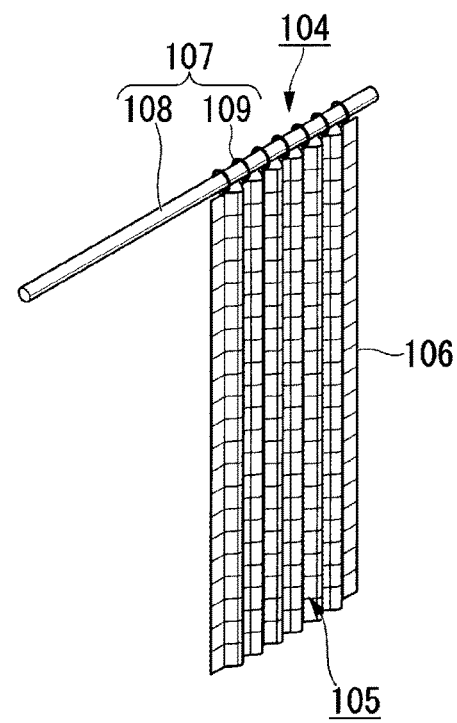
FIG. 43B is a perspective view which shows the daylighting device of the eighth embodiment in a stored state.

FIG. 43A and FIG. 43B are perspective views which show the planar optical member of the eighth embodiment and FIG. 43A shows a light collecting state and FIG. 43B shows a stored state.

As shown in FIG. 43A and FIG. 43B, a daylighting device 104 of the eighth embodiment is provided with a planar optical member 105 of the first to sixth embodiments, a support member 106 which supports the planar optical member 105, and a storing mechanism 107 which folds and stores the planar optical member 105 so as to be able to be taken in and out. The daylighting device 104 is, for example, installed by the window and takes sunlight into a room through the planar optical member 105. The storing mechanism 107 is provided with a rail 108 in a bar form which is attached along the upper side of the window and a plurality of rings 109 in which the rail 108 is inserted.

In a case of the present embodiment, the plurality of the linear bodies 3 of the planar optical member 105 have a diameter which is, for example, as thin as tens of µm to hundreds of µm, have flexibility, and the entirety thereof is formed in the form of fabric with the warp 5. The support member 106 is a frame portion which is formed, for example, using fabric. Due to this, it is possible to fold the planar optical member 105. However, the point that the orientations of the reflective surface and the refractive surface of the plurality of the linear bodies 3 substantially match is the same as the first to seventh embodiments. The plurality of the rings 109 are attached along the upper side of the support member 106 at certain intervals. The daylighting device 104 of the eighth embodiment is able to be treated in the same manner as, for example, curtains.

According to the daylighting device 104 of the eighth embodiment, by using the planar optical member of the first to sixth embodiments, the user in the room does not experience much glare and it is possible to realize a daylighting device which is able to improve the brightness of the room. In addition, since it is possible to switch between a light collecting state and a stored state, for example, there is flexibility in the uses such as installation at a place where the scenery is important and switching the daylighting device 104 to a stored state when viewing the scenery.

[First Modification Example of Daylighting Device]

Description will be given of the first modification example of the daylighting device of the eighth embodiment.

Figure 44:
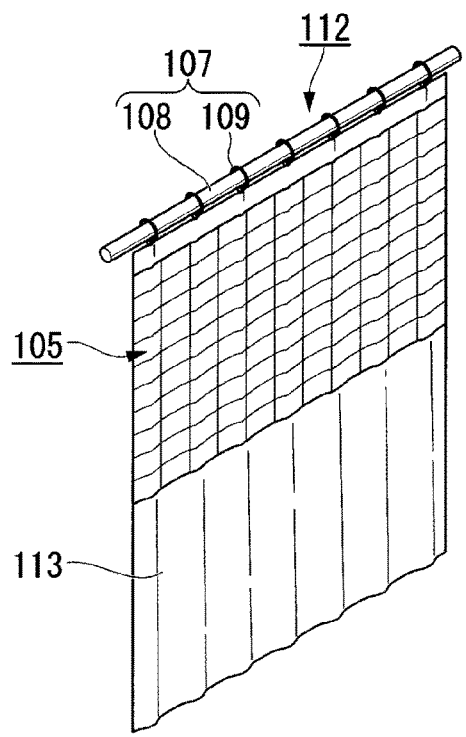
FIG. 44 is a perspective view which shows a modification example of the daylighting device.

FIG. 44 is a perspective view of the daylighting device of the first modification example.

As shown in FIG. 44, in a daylighting device 112 of the first modification example, the planar optical member 105 of the daylighting device of the eighth embodiment is arranged on the upper part of a fabric which is a support member 113. For example, when the fabric has a light shielding function such as being used for light shielding curtains, only light which is incident to the upper part of the daylighting device 112 passes through the planar optical member 105. Accordingly, the user in a room does not experience much glare and it is possible to realize a daylighting device which is able to improve the brightness of the room. In this case, the support member 113 is provided on the same surface as the main surface of the planar optical member 105 and functions as a light adjusting member which adjusts the amount of light which is incident from the outside. In addition, by installing the planar optical member 105 at a position at eye level or higher, it is possible to collect light while preserving privacy.

Ninth Embodiment

Description will be given of the ninth embodiment of the present invention using FIG. 45 and FIG. 46.

Figure 45:
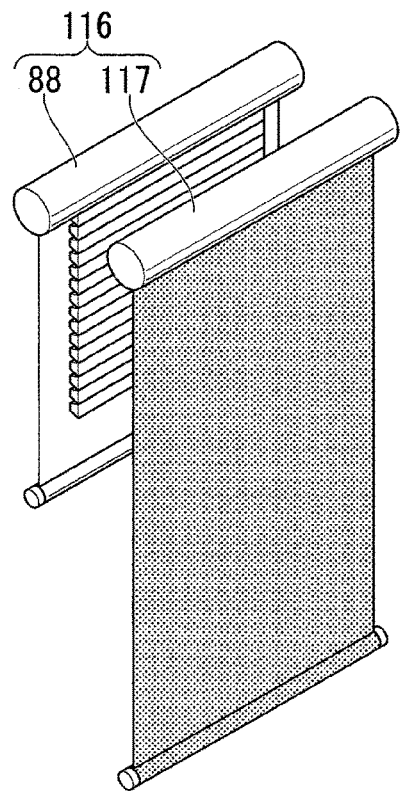
FIG. 45 is a perspective view which shows a daylighting device of a ninth embodiment.

FIG. 45 is a perspective view which shows the daylighting device of the ninth embodiment. FIG. 46 is a lateral view of the daylighting device.

Figure 46:
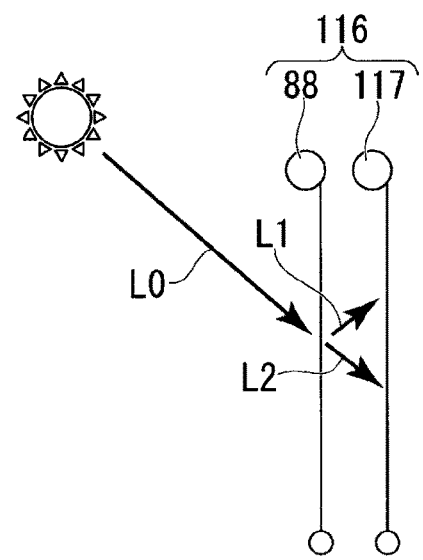
FIG. 46 is a view which shows a state where light is reflected by the daylighting device.

In FIG. 45 and FIG. 46, the same reference numerals are used for the constituent elements which are common to the diagrams which are used in the first embodiment and detailed description thereof will be omitted.

As shown in FIG. 45, a daylighting device 116 of the ninth embodiment is provided with the daylighting device 88 of the seventh embodiment shown in FIG. 40A and FIG. 40B and a light shielding roll screen 117. The daylighting device 88 is arranged on the rear surface side when viewed from the user and the light shielding roll screen 117 is arranged on the front surface side. It is possible to adjust the drawing lengths of the daylighting device 88 and the light shielding roll screen 117 individually. Here, the specific form of the light shielding roll screen 117 may be, for example, light shielding cloth, a lace cloth, or bamboo blinds.

As shown in FIG. 46, the daylighting device 88 illuminates the ceiling or wall by raising a part of the light L1 out of the sunlight L0 which is incident to a room from the window to the upper side above the horizontal plane. However, the light L2 which proceeds to the side below the horizontal plane is present depending on the height of the sun. The light L2 which proceeds to the side below the horizontal plane is seen by the user in the room and the user may experience glare. According to the daylighting device 116 of the ninth embodiment, since the daylighting device 88 and the light shielding roll screen 117 are combined, it is possible to appropriately carry out adjustments such that the light shielding roll screen 117 is drawn down in the day when there is a large amount of the light L2 which proceeds below the horizontal plane and the indoors is bright and the light shielding roll screen 117 is drawn up at other times, or the like. In this case, the light shielding roll screen 117 is provided in a direction which overlaps the main surface of the planar optical member of the daylighting device 88 and functions as a light adjusting member which adjusts the amount of light which is incident from the planar optical member.

[First Modification Example of Daylighting Device]

Description will be given of the first modification example of the daylighting device of the ninth embodiment.

Figure 47:
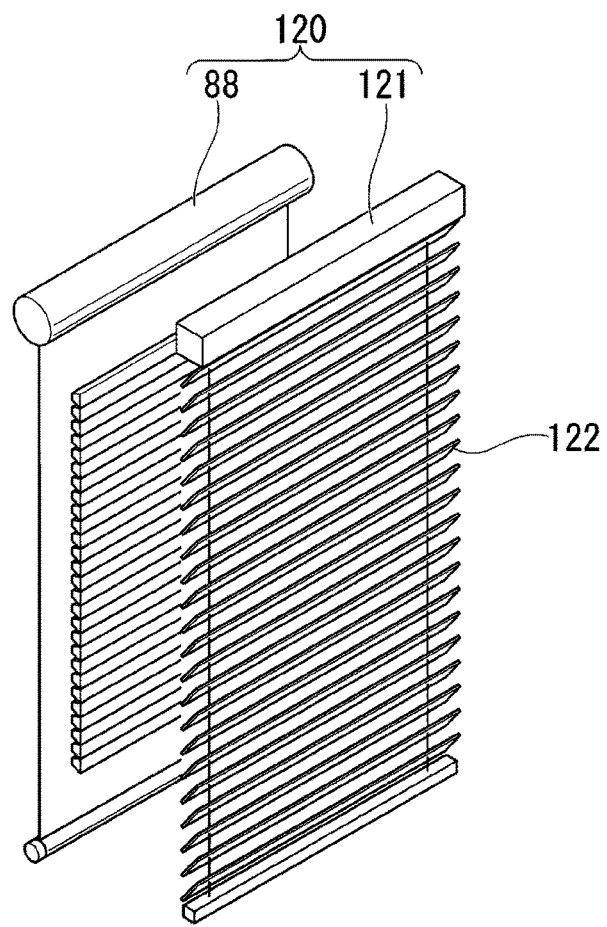
FIG. 47 is a perspective view which shows a modification example of the daylighting device.
Figure 48:
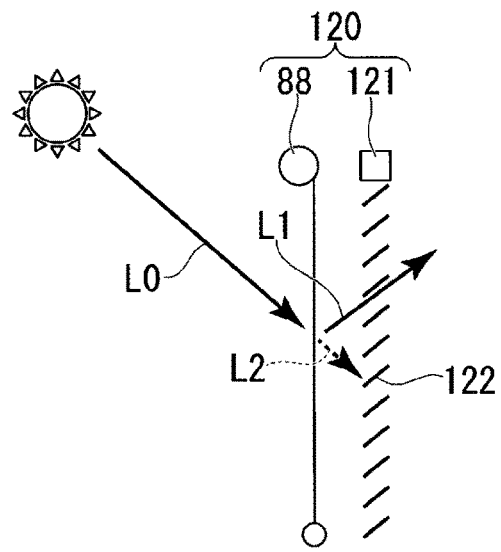
FIG. 48 is a view which shows a state where light is reflected by the daylighting device.

FIG. 47 is a perspective view which shows the daylighting device of the first modification example. FIG. 48 is a lateral view of the daylighting device.

In FIG. 47 and FIG. 48, the same reference numerals are used for the constituent elements which are common to the diagrams which are used in the first embodiment and detailed description thereof will be omitted.

As shown in FIG. 47, a daylighting device 120 of the first modification example is provided with the daylighting device 88 of the seventh embodiment shown in FIG. 40A and FIG. 40B and a blind 121. The daylighting device 88 is arranged on the rear surface side when viewed by the user and the blind 121 is arranged on the front surface side. It is possible to adjust the drawing lengths of the daylighting device 88 and the blind 121 individually. The blind 121 is provided with a plurality of slats 122. It is possible to adjust the angle of the plurality of the slats 122 with respect to the horizontal plane.

As shown in FIG. 48, there is the light L2 which passes through the daylighting device 88 and proceeds to the side below the horizontal plane depending on the height of the sun. The light L2 which proceeds to the lower side in this manner may be shielded by the slats 122 of the blind 121. In a case of the blind 121, unlike the light shielding roll screen, it is possible to use the light L1 which passes through the daylighting device 88 and proceeds to the side above the horizontal plane without being shielded. That is, it is possible to only shield bright light with the blind 121. In this case, the blind 121 is provided in a direction which overlaps the main surface of the planar optical member of the daylighting device 88 and functions as a light adjusting member which adjusts the amount of light which is incident from the planar optical member.

Here, the technical range of the present invention is not limited to the embodiments described above and it is possible to add various types of changes within a range which does not depart from the spirit of the present invention.

Figure 49:
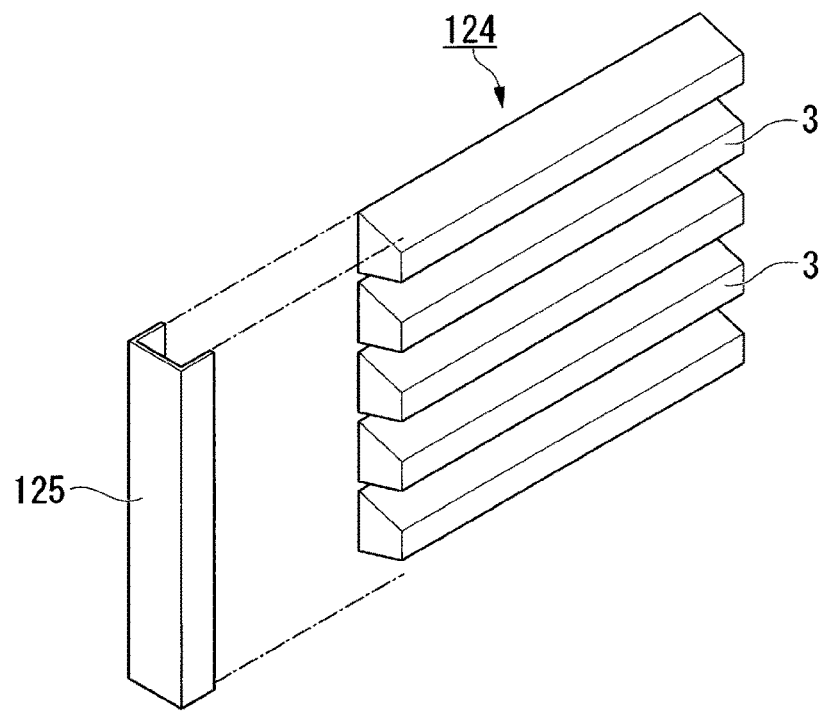
FIG. 49 is a perspective view which shows a modification example of the planar optical member.

For example, in the embodiments described above, a member in a thread form is used as the binding member which binds a plurality of linear bodies; however, instead of this configuration, for example, a member in a strip form may be used as shown in FIG. 49. Regarding a planar optical member 124 shown in FIG. 49, a tape 125 where an adhesive agent is coated over the entire surface is used as a binding member and the end sections of the plurality of the linear bodies 3 are fixed in a form of being interposed by the tape 125.

In this case, it is possible to match the orientations of the reflective surfaces and the refractive surfaces of the plurality of the linear bodies and the same effects as the embodiments described above are also obtained. Other than this, it is possible to appropriately change the shape, number, arrangement, and the like of each of the members which configure the planar optical member and the daylighting device.

Tenth Embodiment

Description will be given of the tenth embodiment of the present invention using FIG. 50 to FIG. 51.

The basic configuration of the planar optical member of the tenth embodiment is the same as the first embodiment, but the member (the binding member) which binds a plurality of linear bodies is different from the first embodiment.

Figure 50:
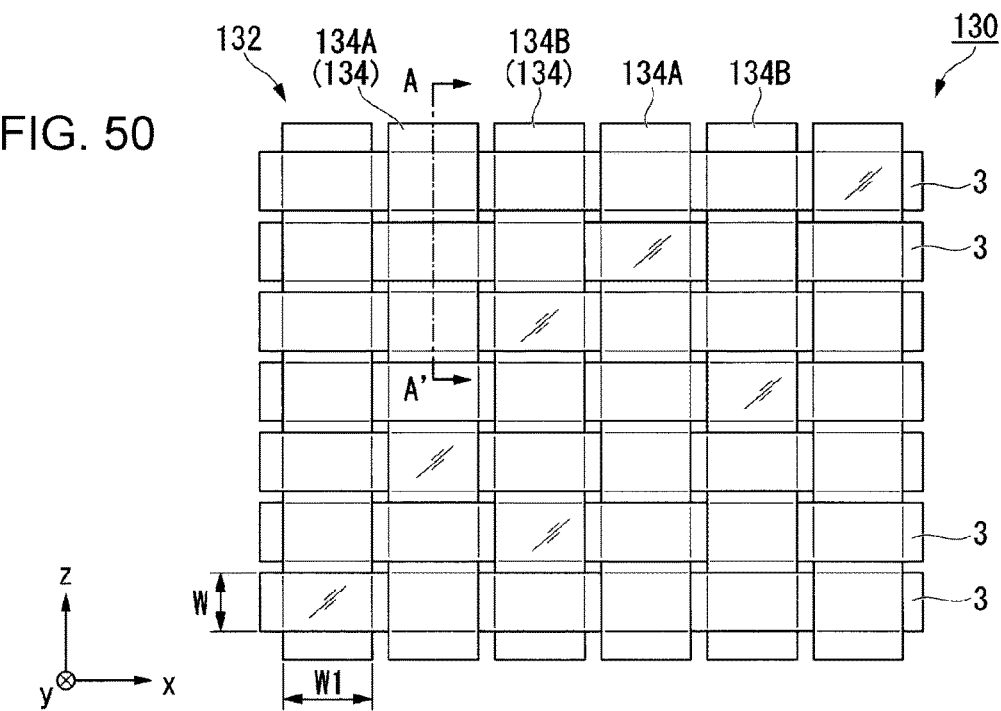
FIG. 50 is a front view which shows a schematic configuration of a planar optical member of a tenth embodiment.

FIG. 50 is a front view which shows a schematic configuration of the planar optical member of the tenth embodiment. FIG. 51 is a cross-sectional view taken along a line A-A' in FIG. 50.

Figure 51:
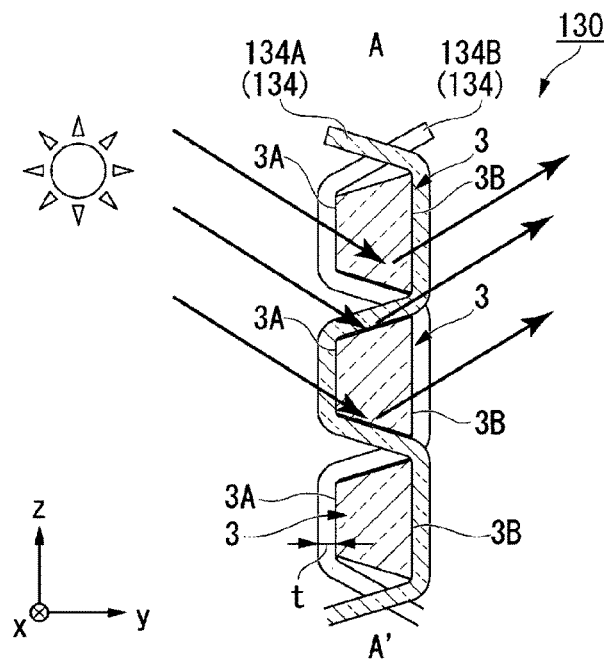
FIG. 51 is a cross-sectional view taken along a line A-A in FIG. 50.

As shown in FIG. 50 and FIG. 51, in a planar optical member 130 of the tenth embodiment, the linear bodies 3 of which the cross-sectional shape is a trapezoid which is the same as the first embodiment are used. The planar optical member 130 is configured by one layer planar structure body 132. The planar structure body 132 which configures the planar optical member 130 is provided with a plurality of the linear bodies 3 and a plurality of the binding members 134 which bind the linear bodies 3. The plurality of the binding members 134 extend in a direction which substantially intersects with the plurality of the linear bodies 3, that is, the vertical direction.

The binding members 134 are configured by optically transparent materials. As the optically transparent materials, for example, optically transparent resin materials such as polyethylene, polypropylene, acryl, polystyrene, acrylonitrile•butadiene•styrene copolymer synthesized resins (ABS resins), polyamide, polycarbonate, polytetrafluoroethylene (fluorocarbon resin), polyethylene terephthalate (PET), and vinyl chloride, or optically transparent inorganic compounds such as glass, mixtures of the materials described above, and the like may be used. Due to this, the incident light passes through the binding members 134 and is incident to the linear bodies 3 without being shielded by the binding members 134.

The binding members 134 are not necessarily colorless and may be colored. For example, when the transmittance >0%, a sufficient effect is obtained. When the binding members 134 are colored, it is possible to impart design characteristics.

The binding members 134 may be long members of which the entire shape is similar to fibers, threads, filament, and the like, or may be long members with flexibility which are similar to a strip form, a bar form, or the like.

As shown in FIG. 50, a plurality of the binding members 134 are lined up along the longitudinal direction of the linear bodies 3. A first binding member 134A out of the plurality of the binding members 134 alternately passes through on the front surface 3B side and the rear surface 3A side of the plurality of the linear bodies 3 so as to pass through the front surface 3B side of an arbitrary linear body 3 and pass through the rear surface 3A side of the linear body 3 which is adjacent to the linear body 3 in the vertical direction (a z direction) as shown in FIG. 51.

On the other hand, a second binding member 134B which is adjacent to the first binding member 134A alternately passes through the rear surface 3A side and the front surface 3B side of the plurality of the linear bodies 3 so as to be contrary to the first binding member 134A so as to pass through in a direction which is different from the first binding member 134A (the rear surface 3A side of the linear body 3) and pass through the front surface 3B side of the linear body 3 which is adjacent to the linear body 3 in the vertical direction (the z direction) as shown in FIG. 50.

A width W1 in a lateral direction (an x direction) of the binding members 134 has the same dimension or more as the maximum width W in the lateral direction (the z direction) of the linear body 3. The thickness t of the binding members 134 is the dimension for obtaining the flexibility with which it is possible to easily change shapes in the thickness direction. The arrangement intervals between the adjacent linear bodies 3 in the vertical direction are regulated by the thickness of the binding members 134.

As shown in FIG. 51, the present embodiment has a configuration in which a plurality of the binding members 134 with transparency are present substantially without gaps in the extending direction of the linear bodies 3 and bind the plurality of the linear bodies 3 which are lined up in the vertical direction. By using the binding members 134 with optical transparency, light passes through the binding members 134 and is incident to the linear bodies 3 even when a large number of the binding members 134 are lined up and arranged in the longitudinal direction of the linear bodies 3.

In detail, out of the light which is incident to the planar optical member 130, the light which is incident to some of the binding members 134 which are partially present on the light incident side of the linear bodies 3 passes through the binding members 134 and is incident to the linear bodies 3. The light which is incident to the linear bodies 3 via the binding members 134 is emitted as light which is refracted in the linear bodies 3 and proceeds upward (to the ceiling in the room).

On the other hand, out of the incident light, the light which is directly incident to the linear bodies 3 (the front surface 3A which is exposed) passes through the binding members 134 which are partially present on the light emitting side and proceeds upward (to the ceiling in a room) after being refracted in the linear bodies 3. In this manner, since the light is emitted as it is without being interrupted by the binding members 134 with transparency, it is possible to improve the light collecting efficiency compared to a configuration which uses the binding members without optical transparency.

The light collecting efficiency in the planar optical member 130 of the present embodiment will be shown below.

(Light collecting efficiency)≈(light collecting efficiency of linear body 3)×(light collecting efficiency of binding member 134)

Accordingly, the higher the light transmittance of the binding member 134, the more the light collecting efficiency of the planar optical member 130 is improved. Here, in practice, the transmittance in the gaps between the linear bodies 3 which are lined up in the vertical direction also has an influence. Detailed description will be given thereof below.

[First Modification Example of Binding Member]

Description will be given of the first modification example of the binding member in the tenth embodiment using FIG. 52A, FIG. 52B, FIG. 53A, and FIG. 53B.

Figure 52A:
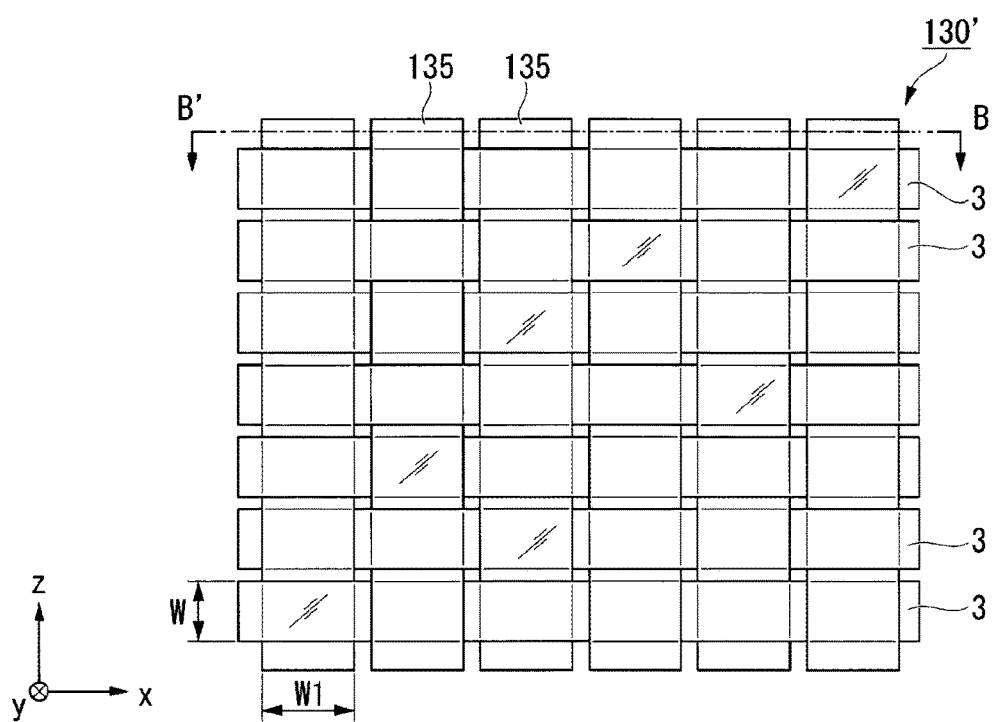
FIG. 52A is a front view of the planar optical member which is provided with the binding member of the first modification example.
Figure 52B:
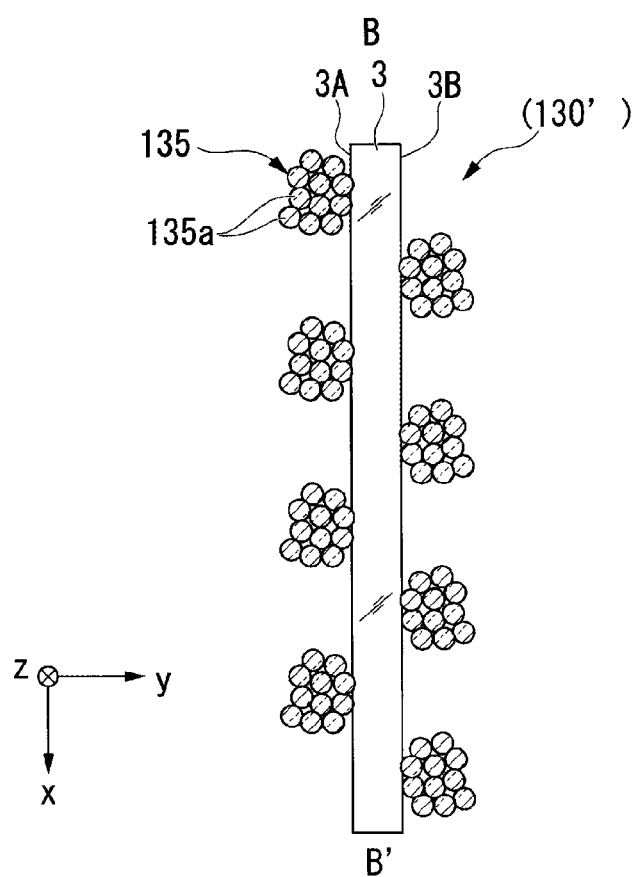
FIG. 52B is a cross-sectional view taken along a line B-B' in FIG. 52B.
Figure 53A:
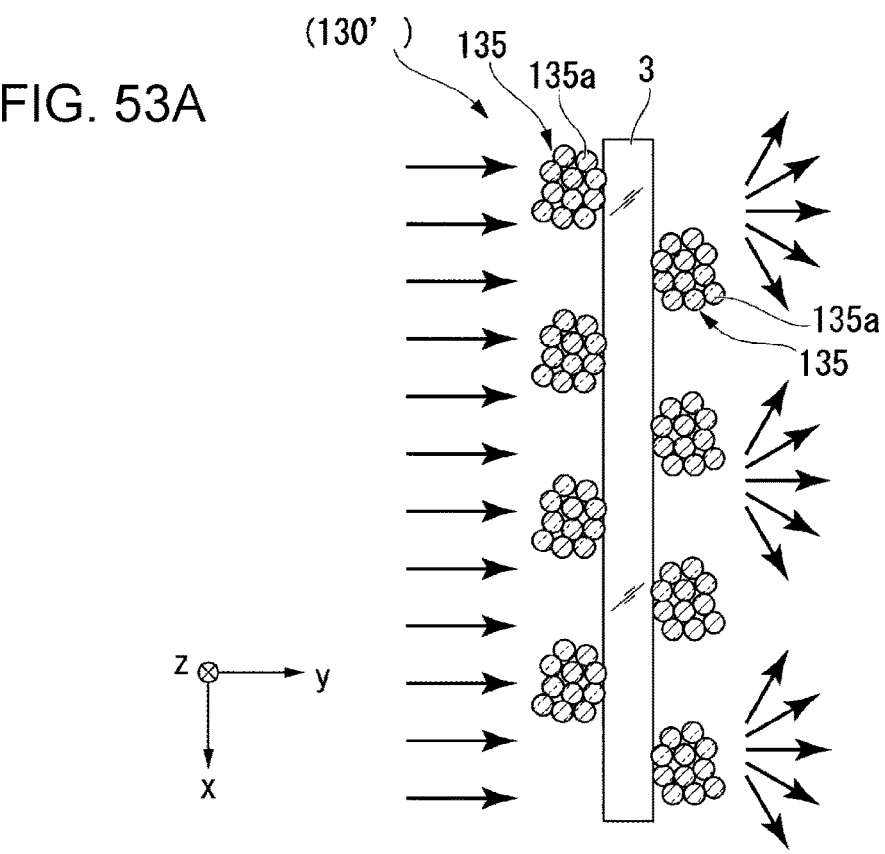
FIG. 53A is a first view which shows optical characteristics of the binding member which is the first modification example.
Figure 53B:
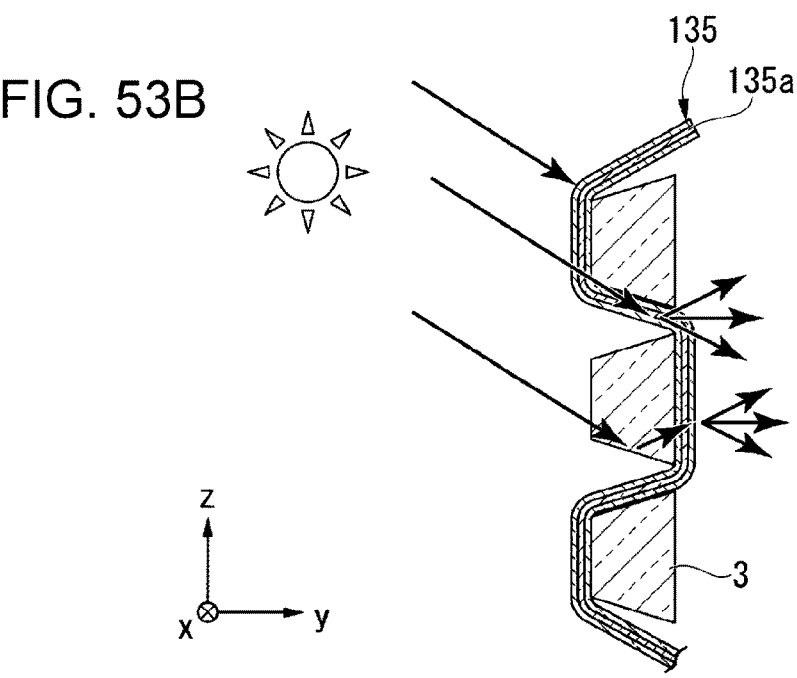
FIG. 53B is a second view which shows optical characteristics of the binding member which is the first modification example.

FIG. 52A is a front view of the planar optical member which is provided with the binding members of the first modification example and FIG. 52B is a cross-sectional view taken along a line B-B' in FIG. 52A. FIG. 53A and FIG. 53B are views which show optical characteristics of the binding member which is the first modification example.

As shown in FIG. 52A and FIG. 52B, binding members 135 of the first modification example are formed of a collection of a plurality of long members 135a with optical transparency. The configuration gives the binding members 135 light scattering characteristics. In detail, as shown in FIGS. 53A and 53B, the configuration is a configuration in which reflection occurs at the interface of each of the long members 135a which configure the binding members 135. The light which is incident to the binding members 135 is reflected by an interface of each of the long members 135a and is strong scattering light.

The binding members 135 of the present modification example have a light scattering property other than optical transparency as described above. For this reason, it is possible to expect a power saving effect since it is possible to obtain a uniformly bright environment by eliminating the differences in the brightness and darkness in a room.

In addition, since it is not necessary to separately add members with light scattering characteristics, the costs are low and the configuration of the planar optical member 130' is simple.

Here, the number of the long members 135a is a number which is able to impart a scattering property to a degree at which a person who is in a room does not experience glare and a degree which does not greatly decrease the light collecting efficiency as the planar optical member 130'. In addition, in a case of using twisted threads as the binding members 135, the configuration is a configuration in which the number of single fibers is reduced to be less than the existing twisted threads. At this time, the thickness or the like of the single fibers is desirably changed as appropriate in order to secure the strength. The scattering property of the light which is emitted from the planar optical member 130' is controlled by appropriately adjusting the amount of the linear members (single fibers) or the degree of twisting.

Description will be given of an example of a room model.

Figure 54:
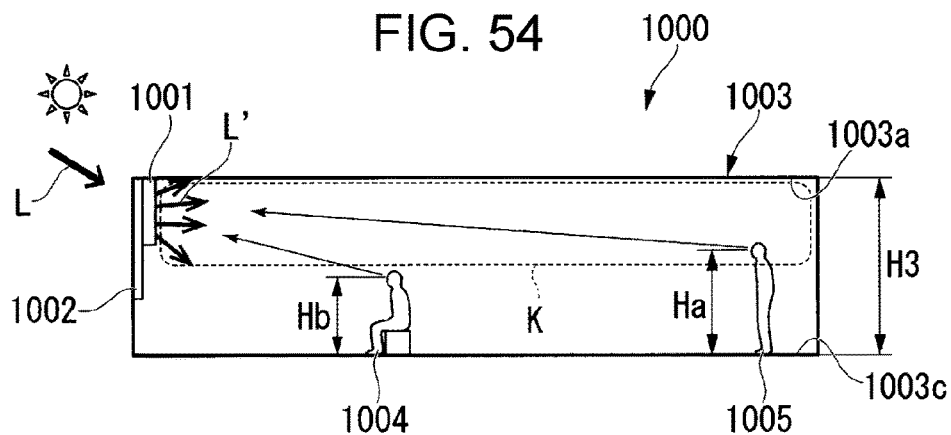
FIG. 54 is a view which shows an example of a room model (in a case where the scattering characteristics of the planar optical member are strong).

FIG. 54 is a view which shows an example of a room model 1000. The room model 1000 is, for example, a model which assumes that a planar optical member 1001 is used in an office. FIG. 54 shows a window 1002 where the planar optical member 1001 is installed, a room 1003, a ceiling 1003a, a floor 1003c, a person 1004 sitting in a chair, and a person 1005 standing on the floor 1003c.

The planar optical member 1001 is installed on an upper part of the indoor side of the window 1002.

In the room model 1000, the position of a person's eyes is assumed to be, for example, 0.8 m to 1.8 m from the floor 1003c. The height Ha of the eyes of the person 1005 standing on the floor 1003c is, for example, 1.8 m. The height Hb of the eyes of the person 1004 sitting in a chair is, for example, 0.8 m. The range of the position of a person's eyes is assumed based on the heights Ha and Hb of the eyes.

The planar optical member 1001 has a function which allows the external light L to proceed toward the ceiling 1003*a*.

The light L' which proceeds toward the ceiling 1003*a* is reflected by the ceiling 1003*a* and irradiates the inside of the room to provide illumination. However, in practice, the light L' which passes through the planar optical member 1001 not only proceeds toward the ceiling 1003*a* but also proceeds toward the floor 1003*c*. The region which is surrounded by the dotted line in FIG. 54 indicates a region K in the room irradiated by the planar optical member 1001.

In this manner, other than the light which proceeds toward the ceiling 1003*a*, light which proceeds to the positions of the eyes of the people 1004 and 1005 who are in a room is also present in the light L' which passes through the planar optical member 1001. This light is glaring light which makes the people 1004 and 1005 who are in a room experience glare. In the room model 1000, the region in which the people 1004 and 1005 who are in a room experience glare is a glare region (which is omitted from the diagram). The range of the glare region is regulated based on the region in which a person moves and the position of the person's eyes. The glare region is, for example, a region of 0.8 m to 1.8 m from the floor 1003*c*.

In particular, in a case where the scattering strength of the light which is emitted from the planar optical member 1001 is excessively strong, the portion other than the ceiling 1003*a* is also irradiated with light as shown in FIG. 54 and the people 1004 and 1005 who are in the room experience a strong glare. In addition, the energy saving effect is also small.

Figure 55A:
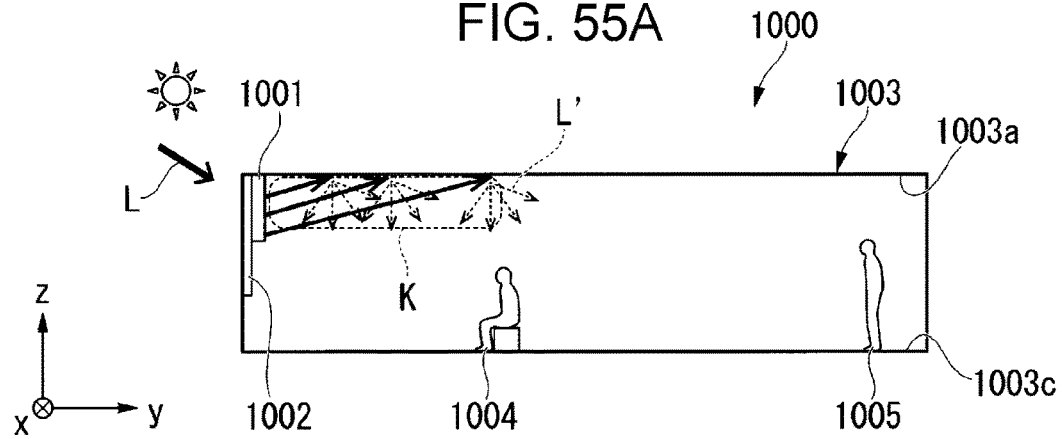
FIG. 55A is a view which shows an example of a room model (in a case where the scattering characteristics of the planar optical member are weak) and a lateral view of the room.
Figure 55B:
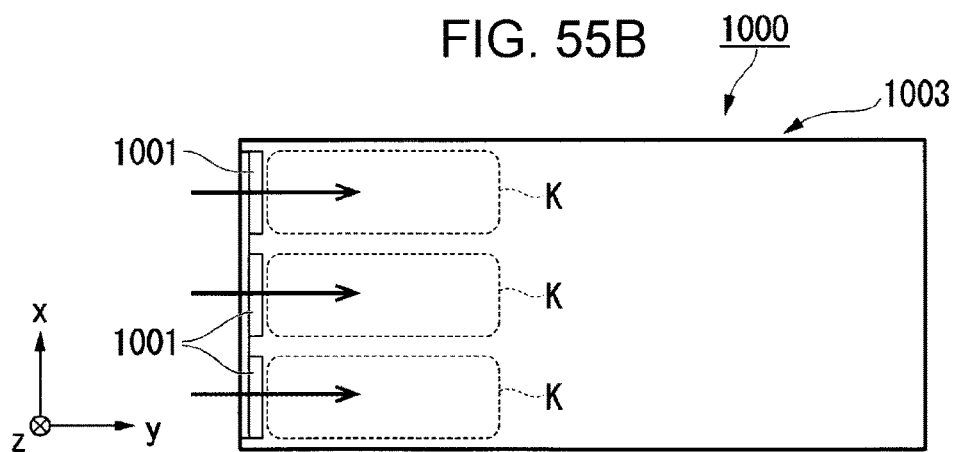
FIG. 55B is a view which shows an example of a room model (in a case where the scattering characteristics of the planar optical member are weak) and where the room is viewed from the ceiling side.

On the other hand, in a case where the scattering strength of the light which is emitted from the planar optical member 1001 is excessively weak, as is clear from the irradiated region K shown in FIGS. 55A and 55B, the light which is emitted from the planar optical member 1001 is concentrated on a part of the ceiling 1003*a* (the ceiling 1003*a* near the window 1002) and the entire ceiling 1003*a* is not irradiated. In other words, the irradiated area on the ceiling 1003*a* of the emitted light which is emitted from the planar optical member 1001 is narrow and the area in which it is possible to turn off the illumination in the room is limited. In addition, the vicinity of the irradiated area is excessively bright and the difference between the brightness and darkness from the far part of the room is large. Therefore, it is necessary to turn on the illumination in the far part in the room and the energy saving effect is small.

Here, the planar optical member 1001 is an existing planar optical member from the background art.

Figure 56A:
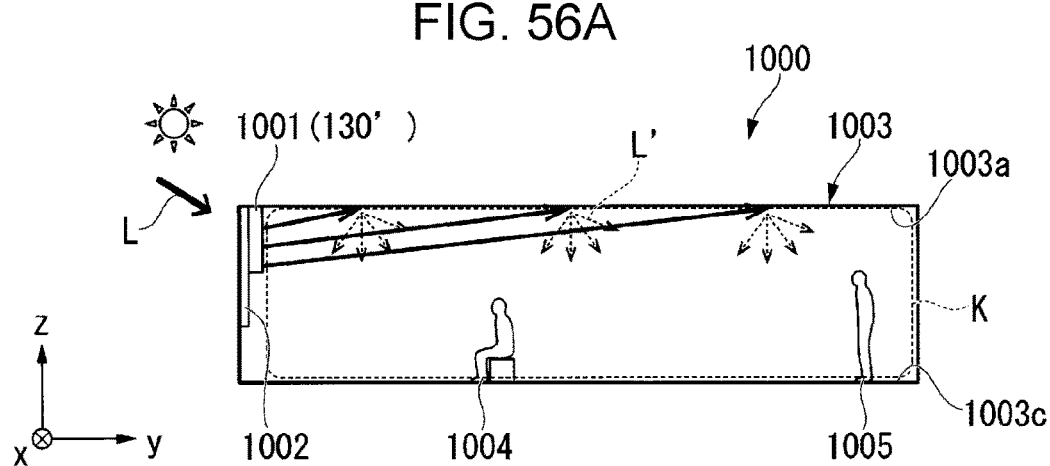
FIG. 56A is a view which shows an example of a room model (in a case where the scattering characteristics of the planar optical member are appropriate) and a lateral view of the room.
Figure 56B:
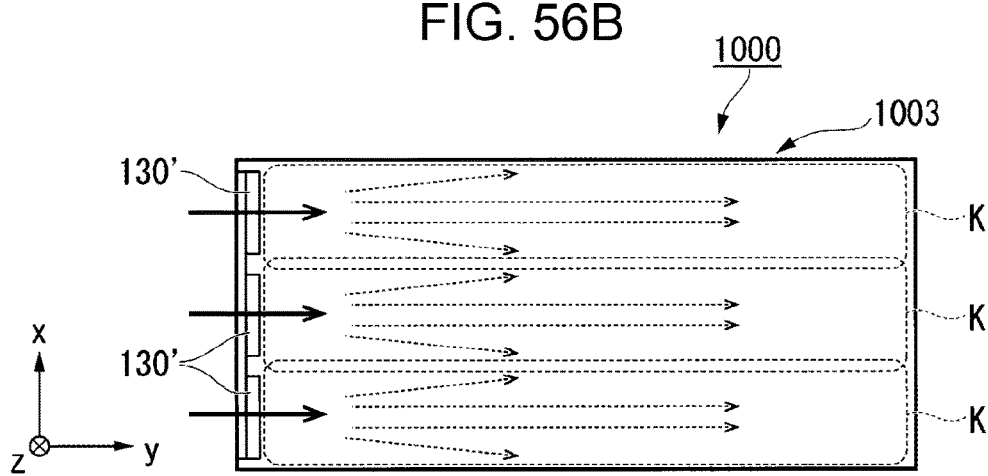
FIG. 56B is a view which shows an example of a room model (in a case where the scattering characteristics of the planar optical member are appropriate) and where the room is viewed from the ceiling side.

FIG. 56A and FIG. 56B are of the room model 1000 which is provided with the planar optical member 130', which is the modification example of the tenth embodiment, as the planar optical member 1001. As the irradiated region K shown in FIG. 56A and FIG. 56B, the emitted light which is scattered and emitted in the planar optical member 130' irradiates the entirety of the ceiling 1003*a* in the room. In other words, since the light which is emitted from the planar optical member 130' is scattered light, the strength of the light which proceeds toward the ceiling 1003*a* is reduced and the people 1004 and 1005 who are in the room do not experience glare. In addition, it is possible to distribute the light which proceeds toward the ceiling 1003*a* in the vicinity of the window toward the far part of the room where the amount of light is little compared to by the window. Due to this, the room environment has a substantially uniform brightness.

In this manner, out of the light L which is incident to the room 1003 through the window 1002, it is possible to relatively increase the brightness of the light which proceeds toward the ceiling 1003*a* in the far part of the room 1003 while reducing the brightness of the glare light or the light which proceeds toward the ceiling 1003*a* in the vicinity of the window. In addition, it is possible to guide the light L which proceeds toward the ceiling 1003*a* to the far part of the room 1003 without the people 1004 and 1005 who are in the room 1003 experiencing glare. The light L' which is reflected by the ceiling 1003*a* brightly illuminates the room 1003 over a wide range instead of the illuminating light. Therefore, it is possible to turn off the lighting system of the room 1003 which is far back in the room and it is possible to expect an energy saving effect which saves the energy which the lighting system of the room 1003 would consume during the day.

Eleventh Embodiment

Description will be given of the eleventh embodiment of the present invention using FIG. 57 to FIG. 60B.

The basic configuration of the planar optical member of the eleventh embodiment is the same as the first embodiment, but the member (the binding member) which binds a plurality of linear bodies is different from the first embodiment.

Figure 57:
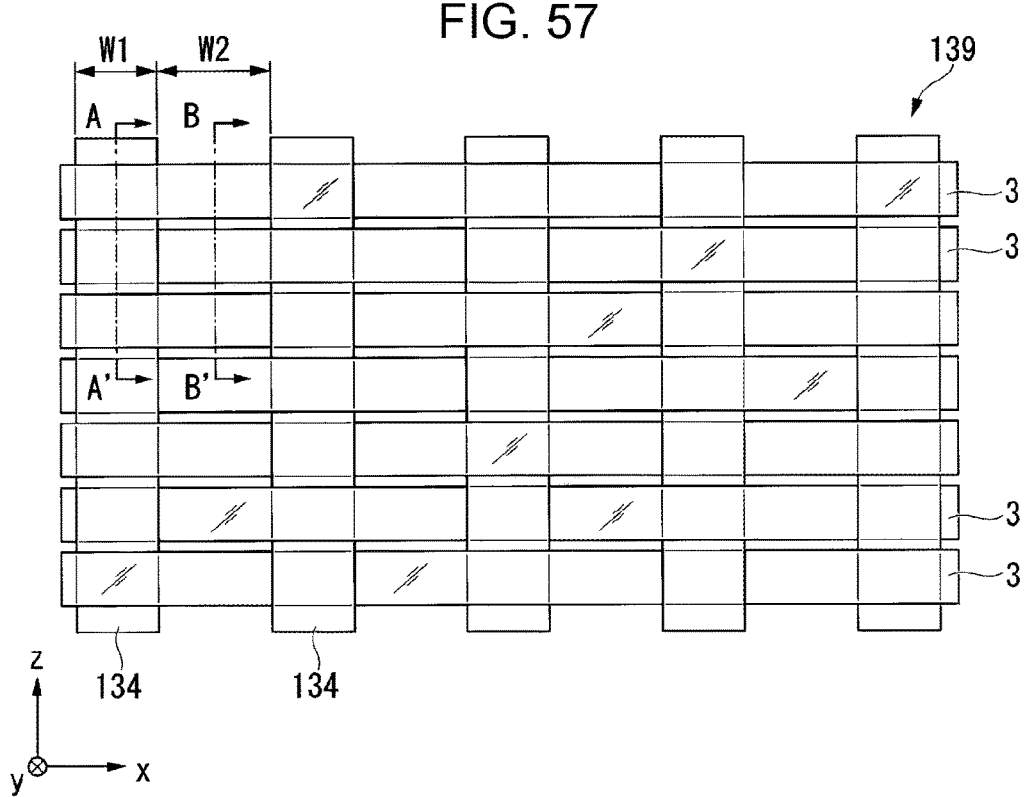
FIG. 57 is a front view which shows a state where an arrangement density of the binding members in the planar optical member is low.

FIG. 57 is a front view which shows a state where an arrangement density of binding members in the planar optical member is low.

Figure 58A:
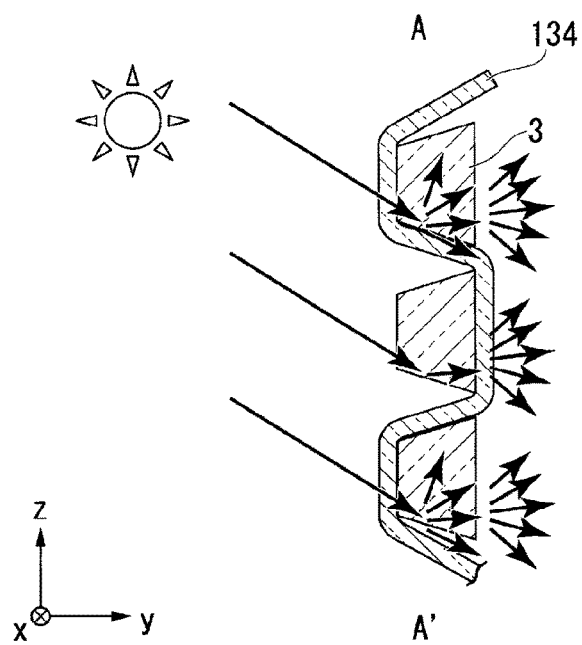
FIG. 58A is a cross-sectional view taken along a line A-A' in FIG. 57.
Figure 58B:
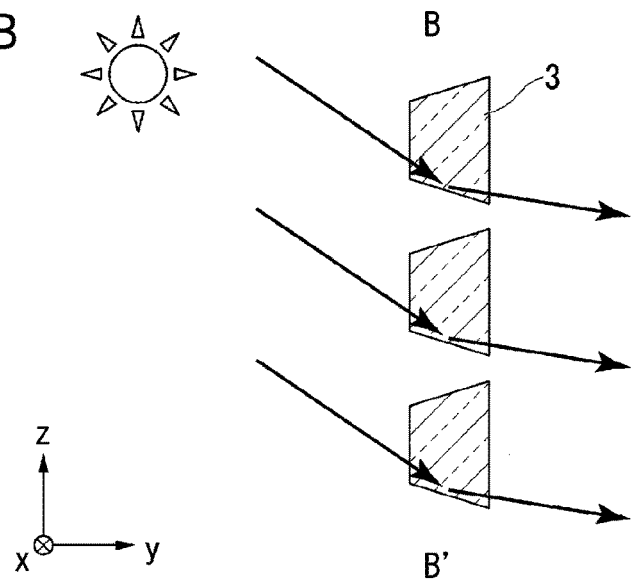
FIG. 58B is a cross-sectional view taken along a line B-B' in FIG. 57.

FIG. 58A is a cross-sectional view taken along a line A-A' in FIG. 57. FIG. 58B is a cross-sectional view taken along a line B-B' in FIG. 57.

In a planar optical member 139 shown in FIG. 57, the plurality of the binding members 134 are arranged at predetermined intervals in the extending direction of the linear bodies 3. In other words, in the first region W1 in which the binding members 134 and the linear bodies 3 are overlapped in a plan view, incident light passes through both the binding members 134 and the linear bodies 3 (FIG. 58A). However, in the second region W2 in which there are only the linear bodies 3 and the binding members 134 are not overlapped, the incident light only passes through the linear bodies 3 and does not pass through the binding members 134 (FIG. 58B). For this reason, depending on the height of the sun, there are cases where a large amount of the light which passes through the linear bodies 3 becomes glaring light.

As shown in FIG. 58A, the incident light is scattered by the binding member 134 in the first region W1 in the planar optical member 139. For this reason, the incident light is scattered in the planar optical member 139 and emitted to the inside of the room.

On the other hand, as shown in FIG. 58B, the incident light only passes through the linear bodies 3 in the second region W2 and the light is not scattered. For this reason, most of the light which is emitted from the linear bodies 3 proceeds in the same direction and there is a high level of illumination compared to the light which passes through via the binding members 134. Therefore, depending on the height of the sun, there are cases where the light which is emitted from the planar optical member 139 is glaring for the person who is in the room.

In order to prevent this, it is sufficient if the configuration is a configuration in which all the incident light passes through the binding members 134. In other words, the configuration in which the pitches of the plurality of the binding members 134 are narrowed and the arrangement density of the plurality of the binding members 134 is increased is desired.

Figure 59:
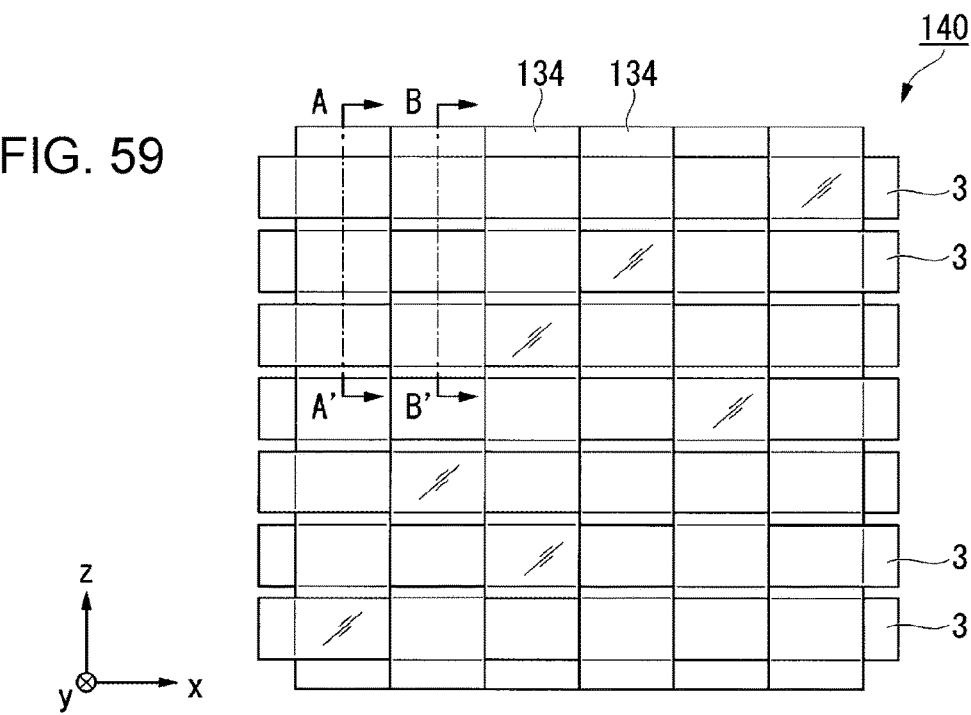
FIG. 59 is a front view which shows a schematic configuration of a planar optical member of an eleventh embodiment.
Figure 60A:
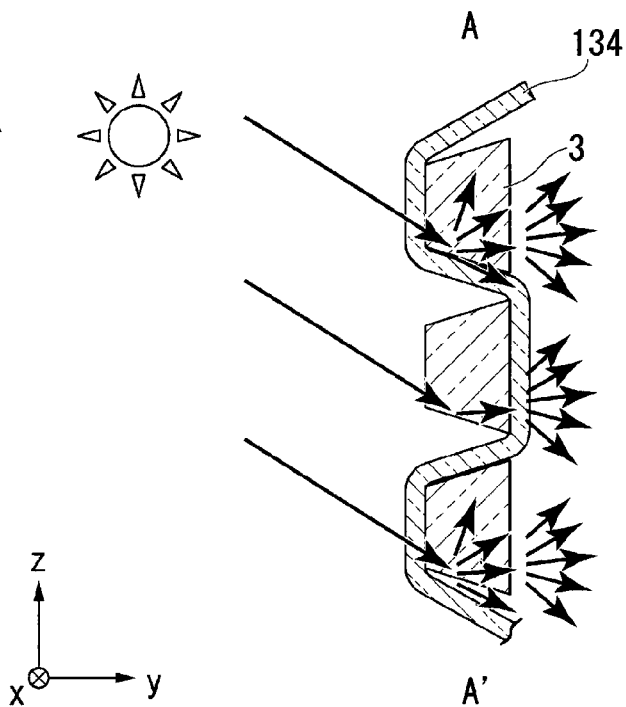
FIG. 60A is a cross-sectional view taken along a line A-A' in FIG. 59.
Figure 60B:
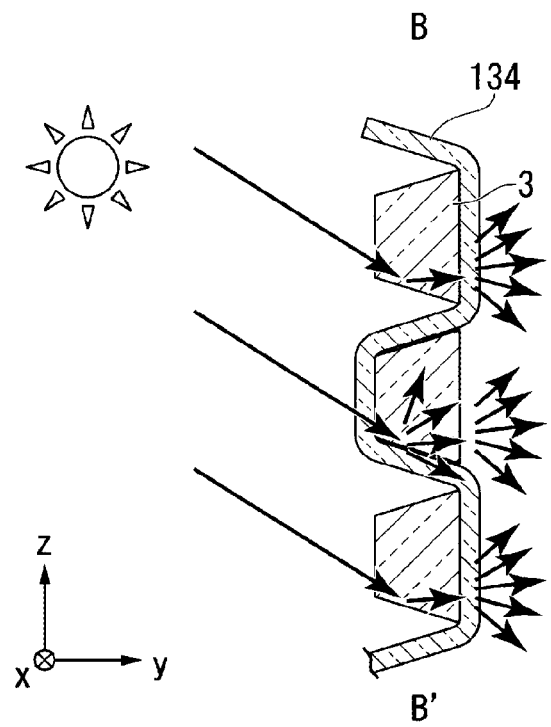
FIG. 60B is a cross-sectional view taken along a line B-B' in FIG. 59.

FIG. 59 is a front view which shows a schematic configuration of a planar optical member 140 of the eleventh embodiment. FIG. 60A is a cross-sectional view taken along a line A-A' in FIG. 59 and FIG. 60B is a cross-sectional view taken along a line B-B' in FIG. 59.

As shown in FIG. 59, the planar optical member 140 of the eleventh embodiment is arranged in a state where the plurality of the binding members 134 are adjacent to each other in the extending direction of the linear bodies 3. The plurality of the binding members 134 extend in a state of being parallel to each other and at least a part of each of the extending directions, substantially the entire length direction here, is in contact with the adjacent binding members 134.

In this manner, by having a configuration in which the pitches of the plurality of the binding members 134 are reduced to eliminate the distance therebetween, substantially all the light which is incident to the planar optical member 140 is scattered in the binding members 134. Thus, the light which is emitted from the planar optical member 140 is light of which the brightness is lower than the light which is emitted from the planar optical member 139 (FIG. 57) described above in which light which only passes through the linear bodies 3 is mixed and it is possible to obtain an environment with no glare for a person in the room and in which the entire room is uniformly bright.

Twelfth Embodiment

Description will be given of the twelfth embodiment of the present invention using FIG. 61A, FIG. 61B, FIG. 62A, and FIG. 62B.

The basic configuration of the planar optical member of the twelfth embodiment is the same as the first embodiment, but the member (the binding member) which binds a plurality of linear bodies is different from the first embodiment.

Figure 61A:
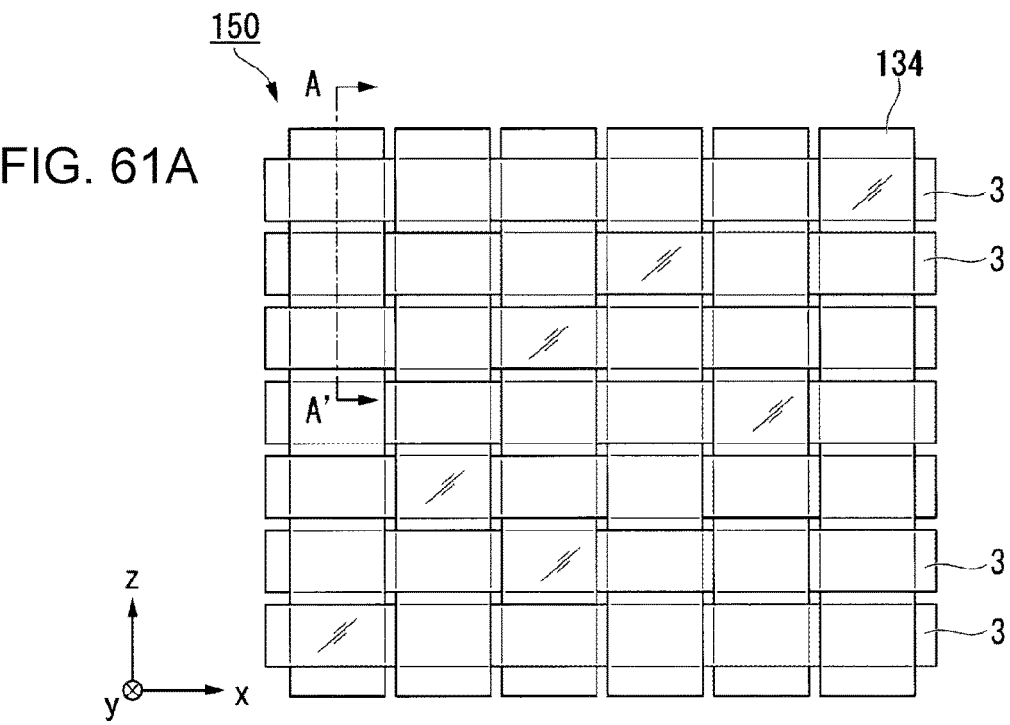
FIG. 61A is a front view of a planar optical member of a twelfth embodiment.
Figure 61B:
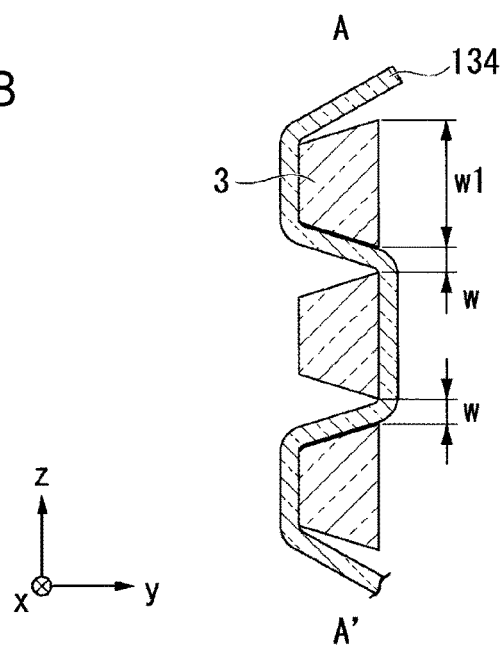
FIG. 61B is a cross-sectional view taken along a line A-A' in FIG. 61A.
Figure 62A:
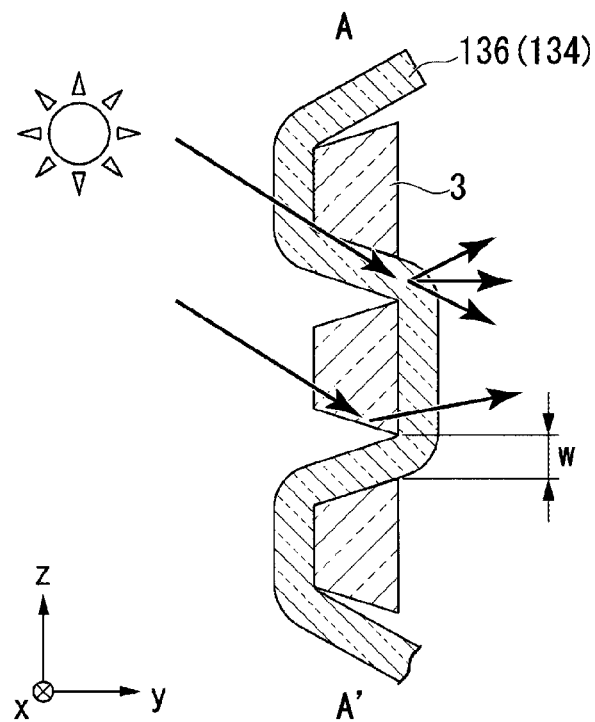
FIG. 62A is a view which corresponds to a cross-sectional view taken along a line A-A' in FIG. 61A and FIG. 61B and shows a state in a case where the binding member is fatter (thicker) than the linear member.
Figure 62B:
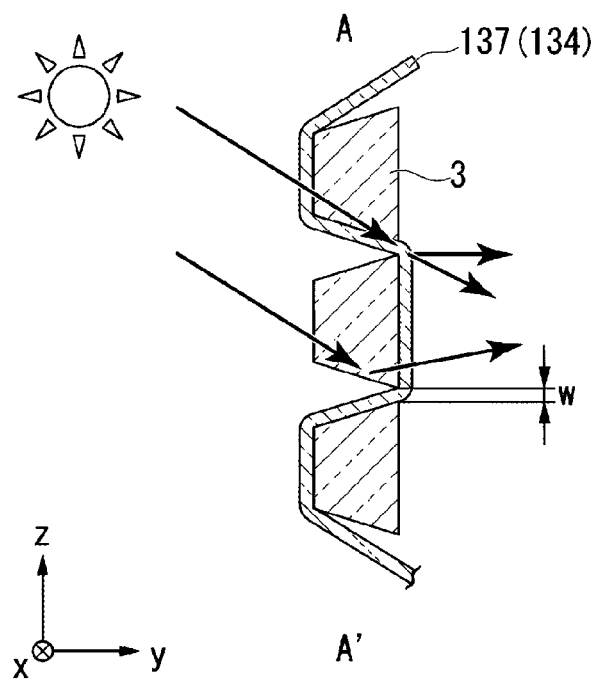
FIG. 62B is a view which corresponds to a cross-sectional view taken along a line A-A' in FIG. 61A and FIG. 61B and shows a state in a case where the binding member is slimmer (thinner) than the linear member.

FIG. 61A is a front view of the planar optical member of the twelfth embodiment and FIG. 61B is a cross-sectional view taken along a line A-A' in FIG. 61A. FIG. 62A and FIG. 62B are each views which correspond to the cross-sectional view taken along a line A-A' in FIG. 61A and FIG. 62A is a view which shows a state in a case where the binding member is fatter (thicker) than the linear member and FIG. 62B is a view which shows a state in a case where the binding member is slimmer (thinner) than the linear member.

As shown in FIG. 61A and FIG. 61B, in a planar optical member 150 of the present embodiment, the gap w between the linear bodies 3 which are lined up in a vertical direction (the z direction) depends on the fatness (thickness) of the binding member 134. In other words, the gap w between the linear bodies 3 is larger when the binding member 134 is fat (thick) and the gap w between the linear bodies 3 is smaller when the binding member 134 is slim (thin).

Here, the gap w between the linear bodies 3 which are adjacent to each other in the up and down direction does not fulfill the light collecting function in the manner of the linear bodies 3. Therefore, as shown in FIG. 62A, in a case of using fat (thick) binding members 136, since the gap w between the linear bodies 3 is large, an amount of light which passes through the gap w is increased and the light collecting efficiency is not good. In addition, as shown in FIG. 62B, in a case of using slim (thin) binding members 137, since the gap w between the linear bodies 3 is small, an amount of light which passes through the linear bodies 3 is increased and the light collecting efficiency is increased.

In the present embodiment, as shown in FIG. 61B and FIG. 62B, it is sufficient if the fatness (thickness) of the binding members 134 is equal to or less than the maximum width w1 in the lateral direction of the linear bodies 3. In a case where the fatness (thickness) of the binding members 134 and the maximum width w1 in the lateral direction of the linear bodies 3 are equal, there is an effect of exhibiting approximately 50% of the light collecting function of the linear bodies 3.

Thirteenth Embodiment

Description will be given of the thirteenth embodiment of the present invention using FIG. 63A to FIG. 64 and FIG. 67.

The basic configuration of the planar optical member of the thirteenth embodiment is the same as the first embodiment, but the member (the binding member) which binds a plurality of linear bodies is different from the first embodiment.

Figure 63A:
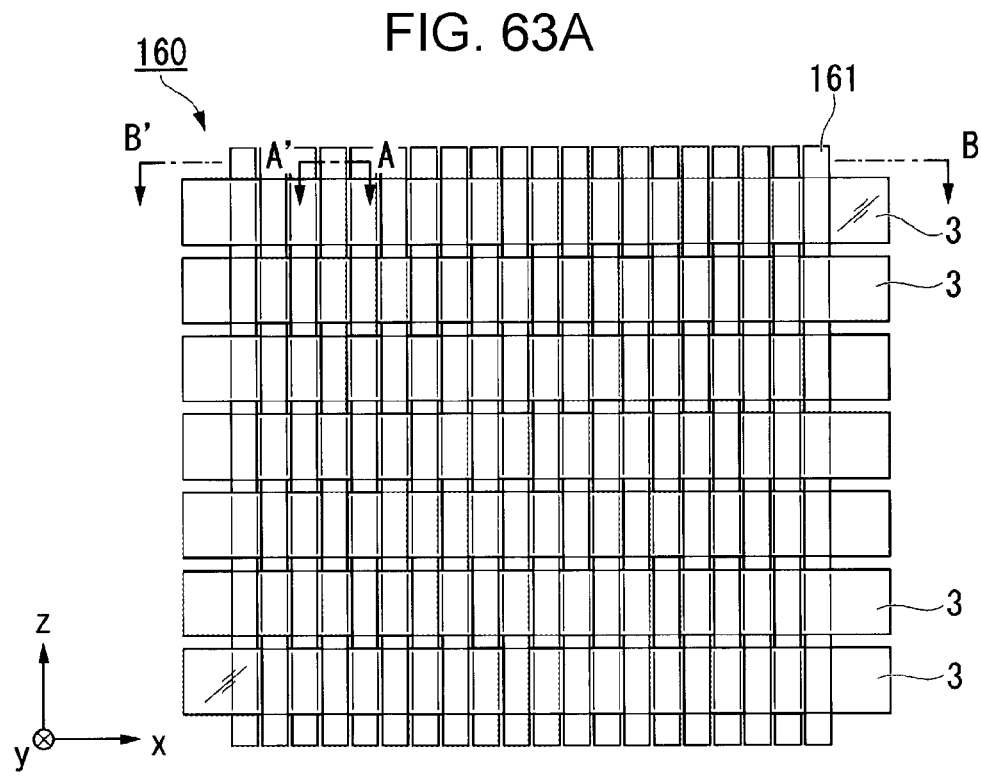
FIG. 63A is a front view which shows a schematic configuration of a planar optical member of a thirteenth embodiment.
Figure 63B:
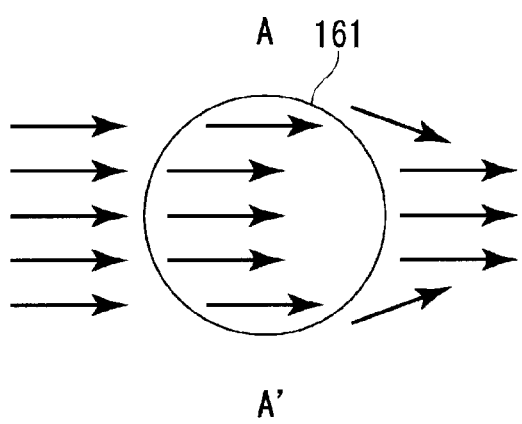
FIG. 63B is a cross-sectional view taken along a line A-A' in FIG. 63A and FIG. 64.
Figure 64:
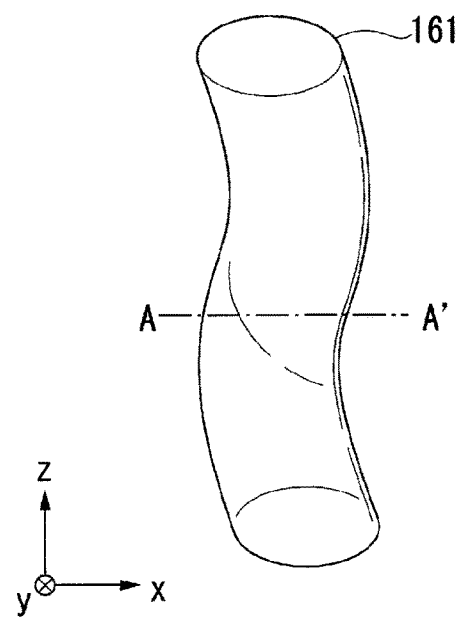
FIG. 64 is a partially enlarged view which shows a binding member in the thirteenth embodiment.
Figure 67:
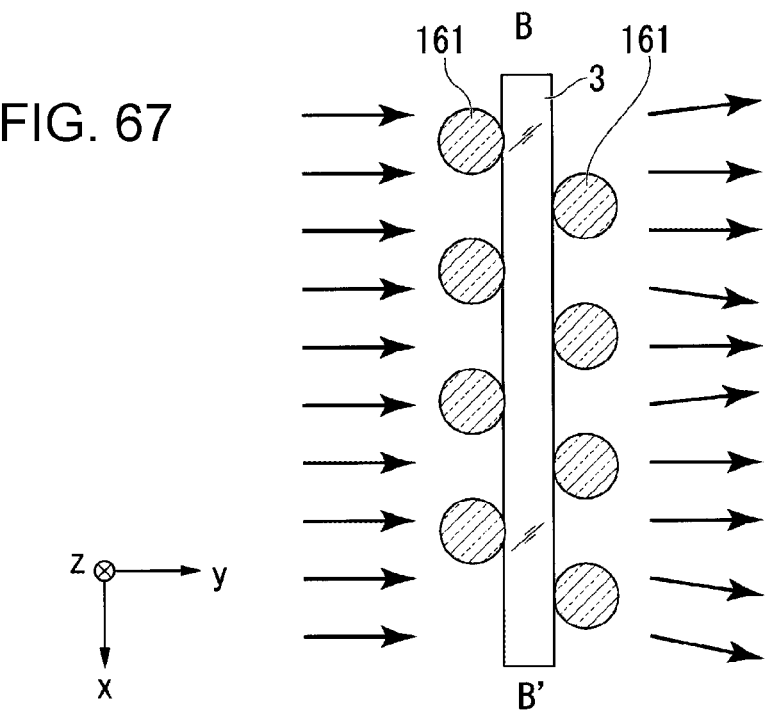
FIG. 67 is a cross-sectional view taken along a line B-B' in FIG. 63A.

FIG. 63A is a front view which shows a schematic configuration of a planar optical member 160 of the thirteenth embodiment and FIG. 63B is a cross-sectional view taken along a line A-A' in FIG. 63A and FIG. 64. The cross-sectional view taken along a line B-B' in FIG. 63A is shown in FIG. 67. FIG. 64 is a partially enlarged view which shows a binding member in the thirteenth embodiment.

As shown in FIG. 63A and FIG. 64, a binding member 161 in the planar optical member 160 of the present embodiment is a long member with transparency formed of polymer substances. Examples of the binding member 161 include untwisted single fibers, synthetic fiber threads, and the like. As shown in FIG. 63B, the cross-sectional shape which intersects with the length direction of the binding member 161 is substantially circular in a state where tension is not applied.

Here, description will be given of a comparative example with the present embodiment.

Figure 65A:
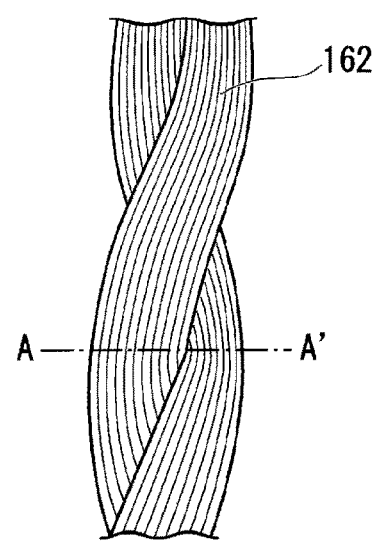
FIG. 65A is a view which shows a structure of the binding member formed of multifilaments and a cross-sectional view which shows the external appearance.
Figure 65B:
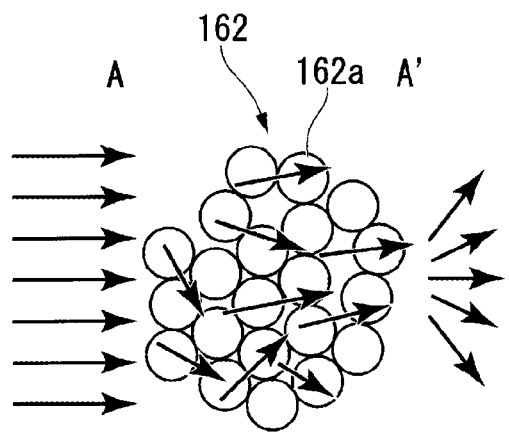
FIG. 65B is a view which shows a structure of the binding member formed of multifilaments and a cross-sectional view taken along a line A-A' in FIG. 65A.
Figure 66:
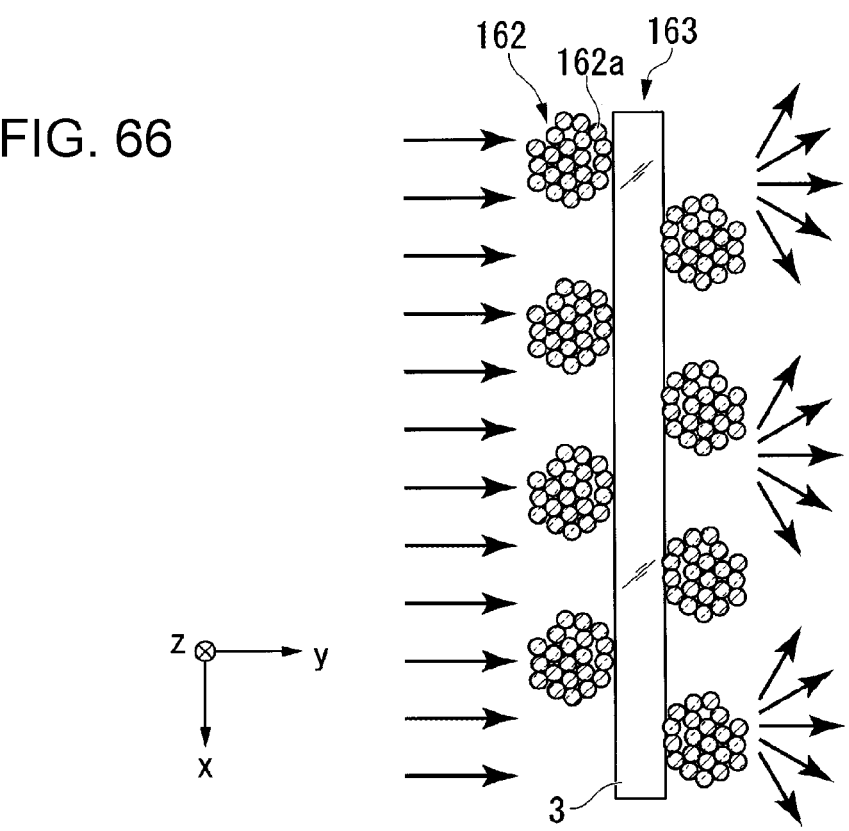
FIG. 66 is a view which shows optical characteristics of the planar optical member which is provided with binding members formed of twisted threads.

FIG. 65A and FIG. 65B are views which show a structure of the binding member where a large number of linear members are twisted to be one member (a multifilament) and FIG. 65A shows the external appearance and FIG. 65B is a cross-sectional view taken along a line A-A' in FIG. 65A. FIG. 66 is a view which shows the optical characteristics of the planar optical member which is provided with binding members formed of twisted threads.

A binding member 162 shown in FIGS. 65A and 65B is formed by twisting a large number of the linear members 162a to be one member (a multifilament). Examples of the linear member 162a include single fibers. In a planar optical member 163 which is provided with the binding member 162, as shown in FIG. 66, the incident light is repeatedly refracted for each interface of the large number of the linear members 162a in the binding member 162, becomes scattered light, and is emitted. The light which passes through the large number of linear members 162a becomes white light since the scattering is excessively strong, and is glare for the person in the room. In addition, the light collecting efficiency in the linear bodies 3 is greatly decreased since the scattering light which is emitted from the binding member 162 is incident to the linear bodies 3.

With respect to this, as shown in FIG. 67, it is possible to minimize the interface with air since the planar optical member 160 of the present embodiment uses the binding member 161 formed of one linear member formed of polymer substances. Due to this, the number of times when the incident light is refracted in the binding member 161 is greatly reduced and it is possible to suppress the light which is emitted from the binding member 161 from scattering. Therefore, the light collecting efficiency in the linear body 3 is not greatly decreased and it is possible to emit the incident light toward the ceiling in the room. In this manner, it is possible to achieve an improvement in the energy saving effect during the day.

[First Modification Example of Binding Member]

Description will be given of the first modification example of the binding member in the thirteenth embodiment using FIG. 68A to FIG. 68C.

The cross-sectional shape of the binding member 161 described above is circular in the longitudinal direction. However, the cross-sectional shape of the binding member is not limited thereto. For example, the cross-sectional shape may take a form which will be described below.

Figure 68A:
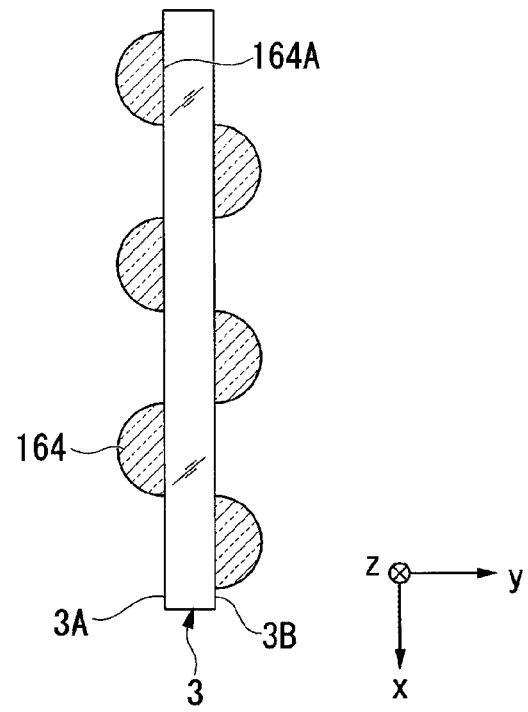
FIG. 68A is a first view which shows a variation of a cross-section shape of the first modification example of the binding member in the thirteenth embodiment.
Figure 68B:
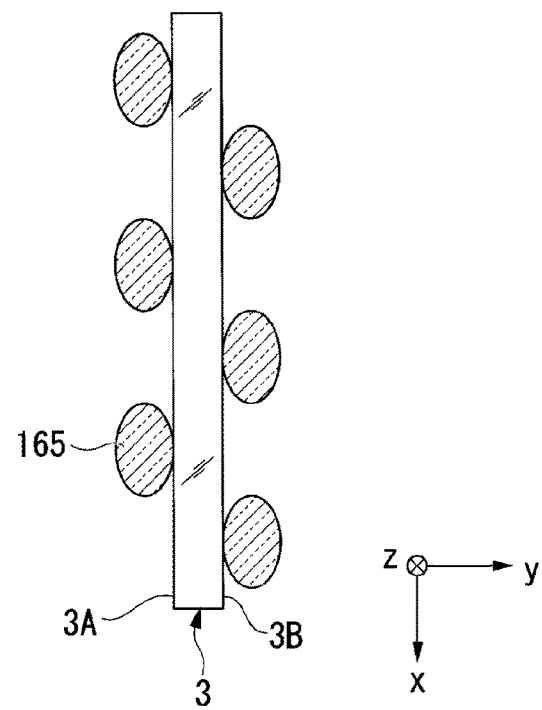
FIG. 68B is a second view which shows a variation of the cross-section shape of the first modification example of the binding member in the thirteenth embodiment.
Figure 68C:
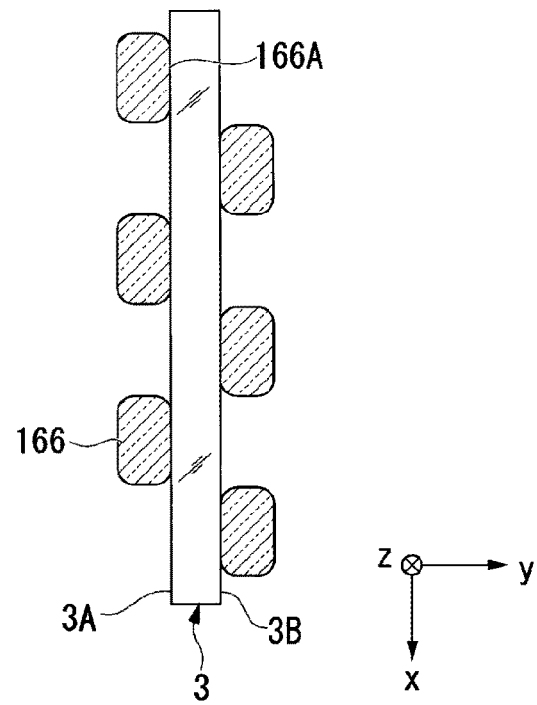
FIG. 68C is a third view which shows a variation of the cross-section shape of the first modification example of the binding member in the thirteenth embodiment.

FIG. 68A to FIG. 68C are views which show variations of the cross-sectional shape of the binding member in the first modification example.

As shown in FIG. 68A, the binding member may be a binding member 164 of which the cross-sectional shape which intersects in the longitudinal direction forms a half circle. Each of the binding members 164 binds each of the linear bodies 3 in a state where a flat surface 164A thereof is opposed to the front surface 3B or the rear surface 3A of the linear bodies 3. The length of the flat surface 164A is equivalent to the diameter (a long axis) and the thickness dimension of the binding member 164 is equivalent to the radius (a short axis).

As shown in FIG. 68B, the binding member may be a binding member 165 of which the cross-sectional shape which intersects in the longitudinal direction forms an oval. Each of the binding members 165 binds each of the linear bodies 3 in a state where the long axis direction in the cross-sectional view is along the longitudinal direction of the linear bodies 3.

As shown in FIG. 68C, the binding member may be a binding member 166 of which the cross-sectional shape which intersects in the longitudinal direction forms a rectangle. Each of the binding member 166 binds each of the linear bodies 3 in a state where the longitudinal (long axis) direction in the cross-sectional view is along the longitudinal direction of the linear bodies 3, that is, a state where a long side 166A is opposed to the front surface 3B or the rear surface 3A of the linear bodies 3.

In this manner, the contact area with respect to the linear bodies 3 is widened by making a binding member of which the aspect ratio of the cross-sectional shape is greater than 1. By making this shape, it is possible to stably support the linear bodies 3. In addition, since the scattering degree of light changes according to the cross-sectional shape of the binding member, the shape may be selected according to the amount or the like of the light which is incident from the window in which it is installed.

[Second Modification Example of Binding Member]

Figure 69A:
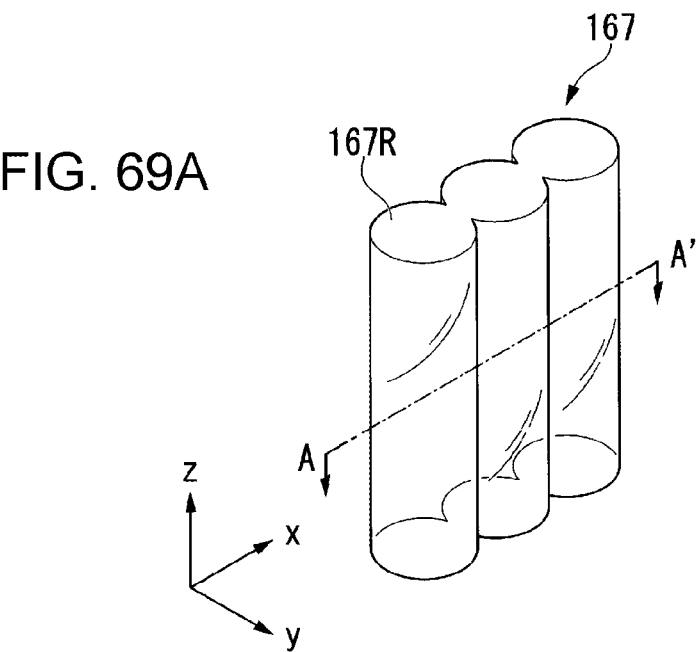
FIG. 69A is a perspective view which shows an external appearance of a binding member of a second modification example.

Description will be given of the second modification example of the binding member in the thirteenth embodiment using FIG. 69A and FIG. 69B. FIG. 69A is a perspective view which shows the external appearance of the binding member of the second modification example and FIG. 69B is a cross-sectional view taken along a line A-A' in FIG. 69A.

Figure 69B:
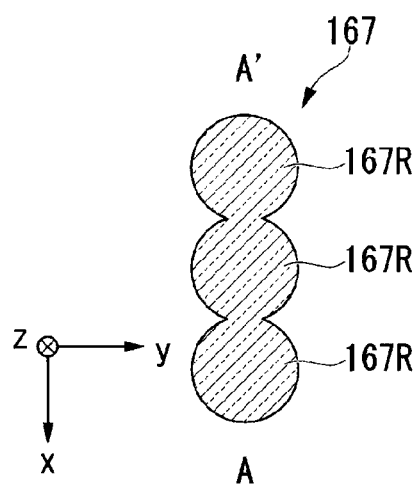
FIG. 69B is a cross-sectional view taken along a line A-A' in FIG. 69A.

A binding member 167 shown in FIG. 69A and FIG. 69B has a plurality of regions 167R of which the cross-sectional shape is circular and forms a strip as a whole. Here, the configuration is a configuration in which the binding member 167 is provided with three regions 167R; however, the binding member 167 may have two regions 167R or may have four or more regions 167R. The areas and the shapes of each of the regions 167R is desirably equal to each other.

The binding member 167 is configured by a single polymer substance in which each of the regions 167R is integrated. Alternatively, the binding member 167 may be integrally configured by lining up a plurality of linear members which have one region 167R in one direction and adhering the linear members to each other. In this case, the binding member 167 is configured with an adhesion strength which is able to bear the tension strength along with binding a plurality of the linear bodies 3.

In this manner, by further increasing the aspect ratio in the cross-sectional shape of the binding member 167, the contact area with respect to the linear bodies 3 is widened and it is possible to more stably support the linear bodies 3.

Figure 70A:
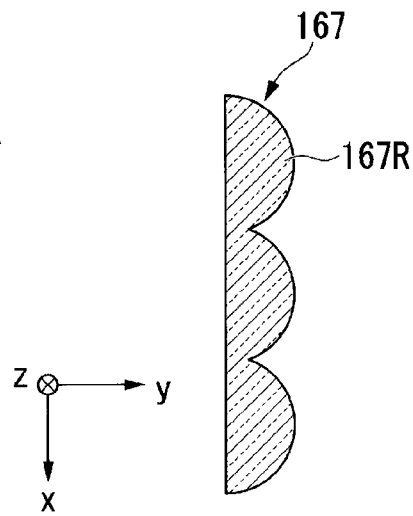
FIG. 70A is a first view which shows an example of a shape of each region in a cross-sectional view of the binding member.
Figure 70B:
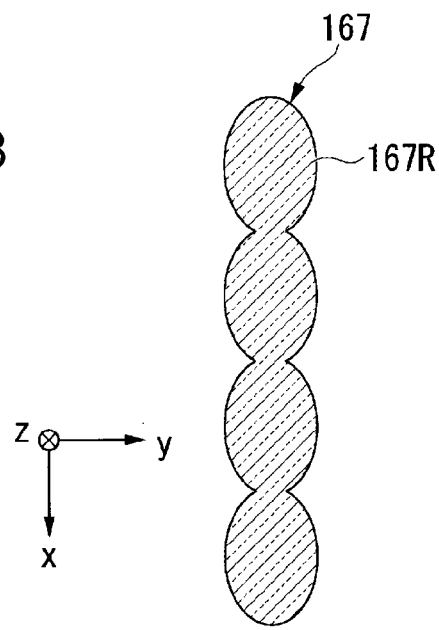
FIG. 70B is a second view which shows an example of a shape of each region in a cross-sectional view of the binding member.
Figure 70C:
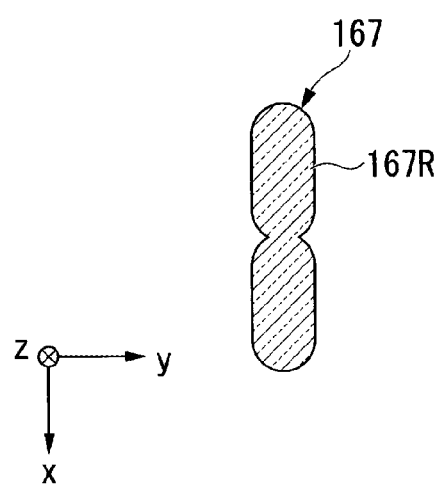
FIG. 70C is a third view which shows an example of a shape of each region in a cross-sectional view of the binding member.

The shape of each of the regions 167R in the cross-sectional view of the binding member 167 is not limited to being circular as described above. For example, as shown in FIG. 70A to FIG. 70C, the shape may be any one of a half circle shape, an oval, or a rectangular shape. As described above, it is possible to arbitrarily set the number of the regions 167R which configure the binding member 167.

Fourteenth Embodiment

Description will be given of the fourteenth embodiment of the present invention using FIG. 71A and FIG. 71B.

The basic configuration of the planar optical member of the fourteenth embodiment is the same as the first embodiment, but the member (the binding member) which binds a plurality of linear bodies is different from the first embodiment.

Figure 71A:
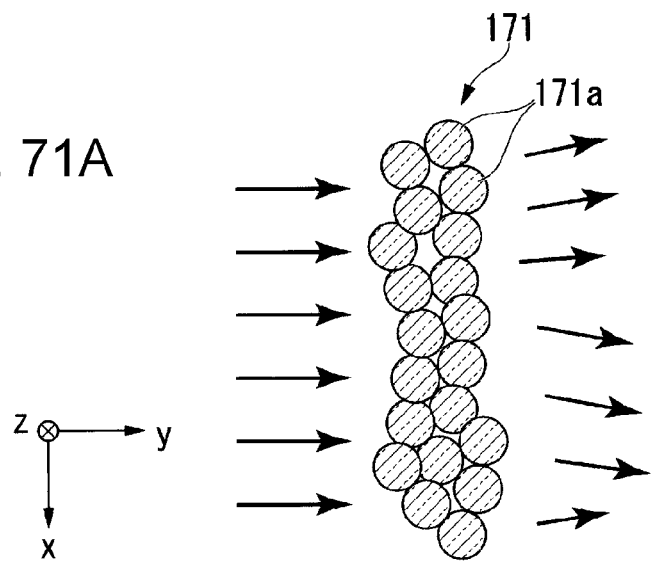
FIG. 71A is a view which shows a cross-sectional shape of a binding member in a fourteenth embodiment.
Figure 71B:
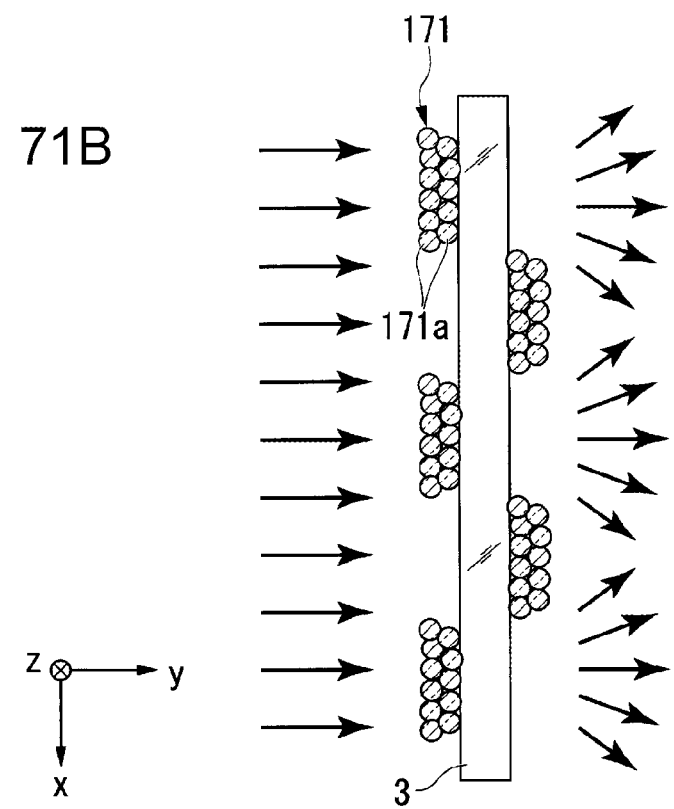
FIG. 71B is a view which shows optical characteristics of the planar optical member which uses the binding member which is shown in FIG. 71A.

FIG. 71A is a view which shows a cross-sectional shape of the binding member in the fourteenth embodiment and FIG. 71B is a view which shows optical characteristics of the planar optical member which uses the binding member shown in FIG. 71A.

As shown in FIG. 71A and FIG. 71B, a binding member 171 of the present embodiment is formed of a plurality of linear members 171a with transparency and is flat as a whole. The plurality of the linear members 171a are placed so as to expand in the length direction of the linear bodies 3 and the structure is different from a structure such as twisted threads where many of the linear members 171a tend to gather in the center. In the cross-sectional view which intersects in the length direction of the binding member 171, the number of the linear members 171a which are laminated in the lateral direction (a direction which intersects with the longitudinal direction of the linear bodies 3) is desirably small and is preferably approximately 3 at most. Each of the linear members 171a is desirably fixed to the others by an adhesive agent or the like which is not shown in the diagram. Alternatively, using a film as an assisting member, a plurality of the linear members 171a may be lined up on the one surface side or both sides so as to be flat, and fixed.

As shown in FIG. 65A, FIG. 65B, and FIG. 66 which are used in the description of the previous embodiment, in a case of the binding member 162 which is configured by twisted threads formed of the plurality of the linear members 162a, the incident light passes through many of the linear members 162a. Since the light is scattered on the interfaces of each of the linear members 162a, there is a concern that the scattering characteristic may be strengthened.

With respect to this, the binding member 171 of the present embodiment has a configuration in which the number of the linear members 171a which are present on the optical path (a y direction) of the incident light is smaller than the number of the linear members 171a which are lined up in the width direction (the x direction) of the linear bodies 3. The smaller the number of the linear members 171a which are laminated in the thickness direction (the y direction) of the binding member 171, the more it is possible to reduce the number of the linear members 171a through which the incident light passes, that is, the number of the interfaces where the light is refracted. Due to this, it is possible to suppress the scattering strength of the light which is emitted from a planar optical member 170.

In addition, since the plurality of the linear members 171a which configure the binding member 171 are fixed to each other by an adhesive agent or the like, it is possible to maintain the shape of the binding member 171 to be flat as a whole even in a case where tension is applied.

In addition, it is possible to control the scattering degree as a whole using the flatness (the aspect ratio) of the binding member 171.

Fifteenth Embodiment

Description will be given of the fifteenth embodiment of the present invention using FIGS. 72A and 72B.

The basic configuration of the planar optical member of the fifteenth embodiment is the same as the first embodiment, but the member (the binding member) which binds a plurality of linear bodies is different from the first embodiment.

Figure 72A:
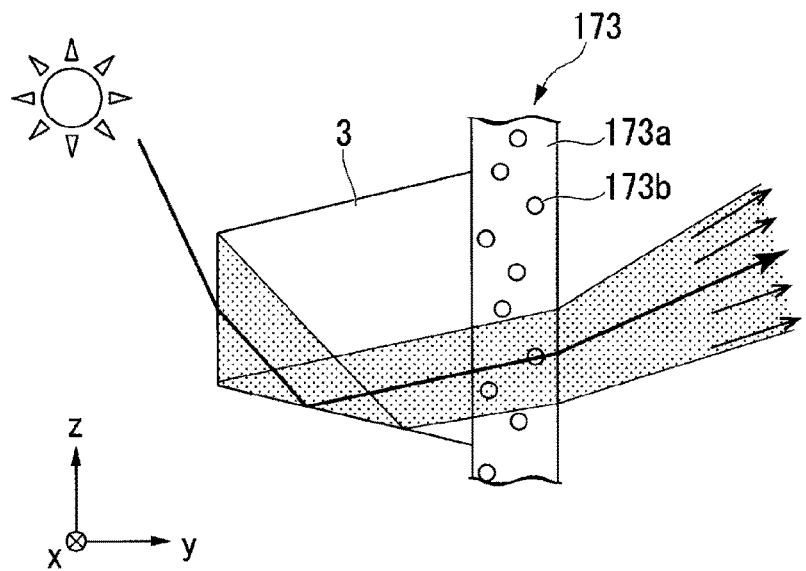
FIG. 72A is a cross-sectional view which shows a schematic configuration of a binding member of a fifteenth embodiment.
Figure 72B:
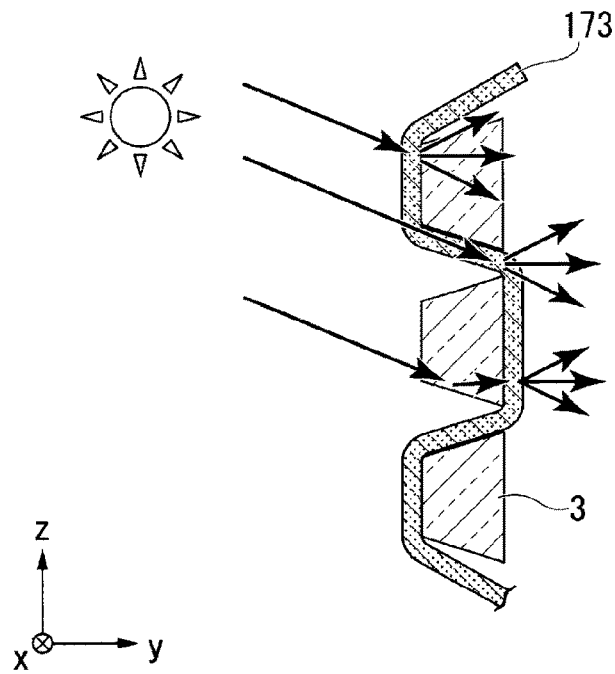
FIG. 72B is a view which shows optical characteristics of the planar optical member which uses the binding member which is shown in FIG. 72A.

FIG. 72A is a cross-sectional view which shows a schematic configuration of the binding member of the fifteenth embodiment and FIG. 72B is a view which shows the optical characteristics of the planar optical member which uses the binding member shown in FIG. 72A.

As shown in FIG. 72A, a binding member 173 of the present embodiment has light scattering characteristics and is configured by mixing in light scattering particles 173b which scatter light in an optically transparent resin material 173a. The light scattering particles 173b have a different refractive index from the optically transparent resin material 173a.

As shown in FIG. 72B, the light which is incident to a planar optical member 174 is isotropically scattered by the binding member 173 with light scattering characteristics and emitted. For this reason, the directions of the light which is emitted from the entire planar optical member 174 are dispersed and it is possible to irradiate a wide range of the ceiling. As a result, it is possible to make the illumination distribution on the ceiling uniform.

According to the present embodiment, since the binding member 173 itself has characteristics which scatter light, it is possible to add a light scattering function at a low cost without separately adding a light scattering member. In addition, the configuration as the planar optical member 174 is also simple.

[First Modification Example of Binding Member]

Figure 73A:
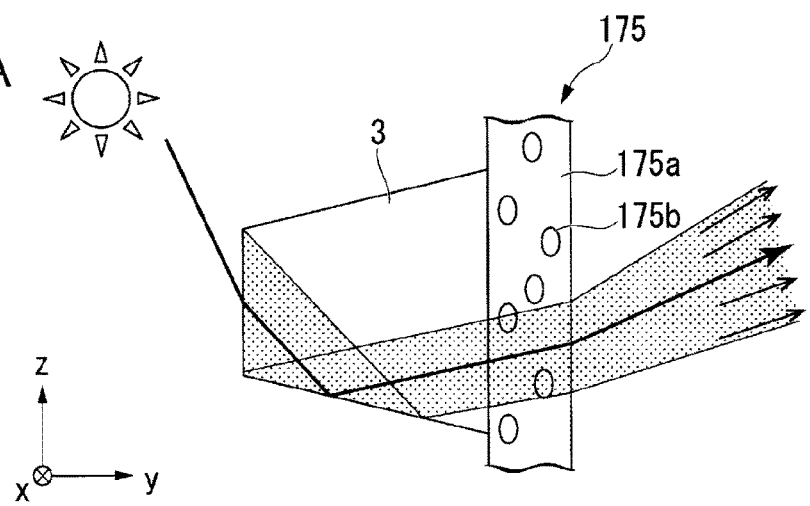
FIG. 73A is a partial cross-sectional view which shows a main part of the binding member of the first modification example in the fifteenth embodiment.

Description will be given of the first modification example of the binding member in the fifteenth embodiment using FIG. 73A and FIG. 73B. FIG. 73A is a partial cross-sectional view which shows a main part of the binding member of the first modification example and FIG. 73B is a view which shows optical characteristics of the planar optical member which uses the binding member shown in FIG. 73A.

A binding member 175 shown in FIG. 73A has anisotropic scattering characteristics. In detail, the plurality of light scattering particles 175b which are mixed in an optically transparent resin material 175a form an anisotropic shape which has a long axis and a short axis. The plurality of the light scattering particles 175b are oriented in the same direction and are oriented such that the long axis directions of each face the vertical direction (the z direction). The plurality of the light scattering particles 175b are a factor causing light scattering and it is possible to specifically scatter and emit the light which is incident to the binding member 175 in the short axis direction (the x direction) of the light scattering particles 175b.

Figure 73B:
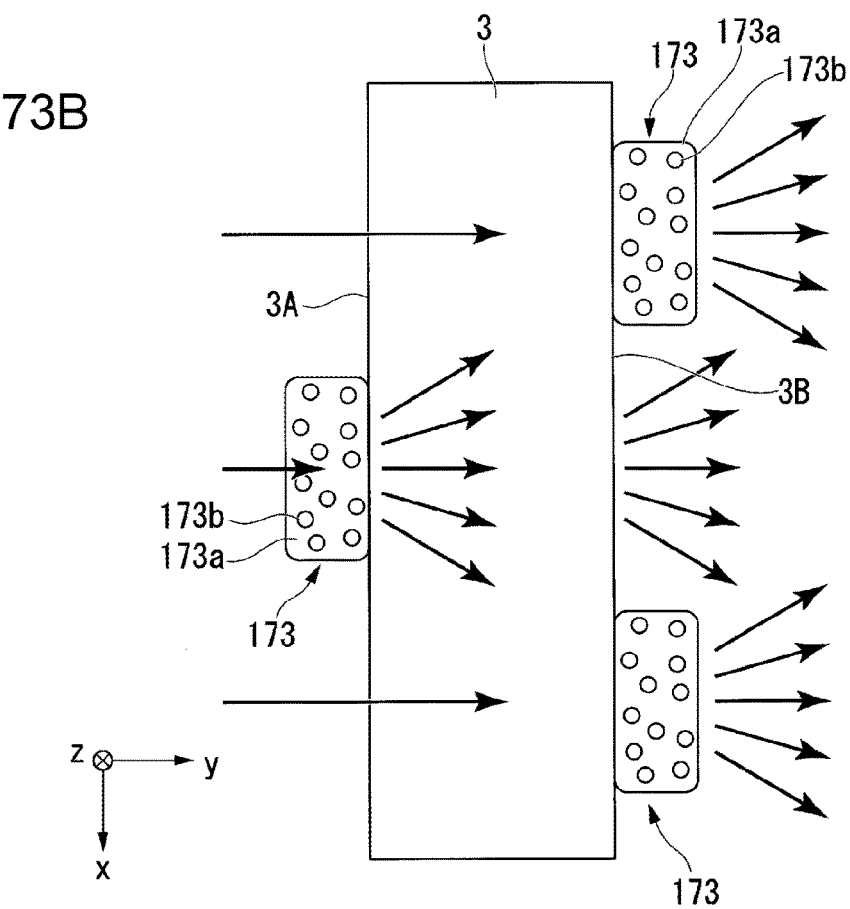
FIG. 73B is a view which shows optical characteristics of the planar optical member which uses the binding member which is shown in FIG. 73A.

Due to this, as shown in FIG. 73B, it is possible to specifically scatter light in the left and right direction of the room and the brightness in a specific direction (the up and down direction) is reduced and glare is not easily caused. In addition, by the light expanding in the left and right direction of the room (the window), it is possible to brighten the entirety of the room from the end to the end (in the horizontal direction) even when the window is small. In addition, there is an advantage in that it is possible to brighten the central section of the room and the like even when sunlight comes in diagonally.

Description was given above of favorable embodiments according to the present invention with reference to the attached diagrams; however, needless to say, the present invention is not limited to the examples. It is clear that a person skilled in the art is able to conceive of various types of modification examples or corrections within the range of the technical idea described in the claims and it is understood that these also naturally belong to the technical range of the present invention. The configurations of each of the embodiments may be appropriately combined.

For example, it is also possible to apply each of the planar optical members in the tenth embodiment to the fifteenth embodiment described above to a roll screen. For example, it is possible to make a structure which is suitable for a roll screen by using members with flexibility as the linear bodies 3 and making a material formed by weaving the binding member 134 and the linear bodies 3.

[Light Adjusting System]

Figure 75:
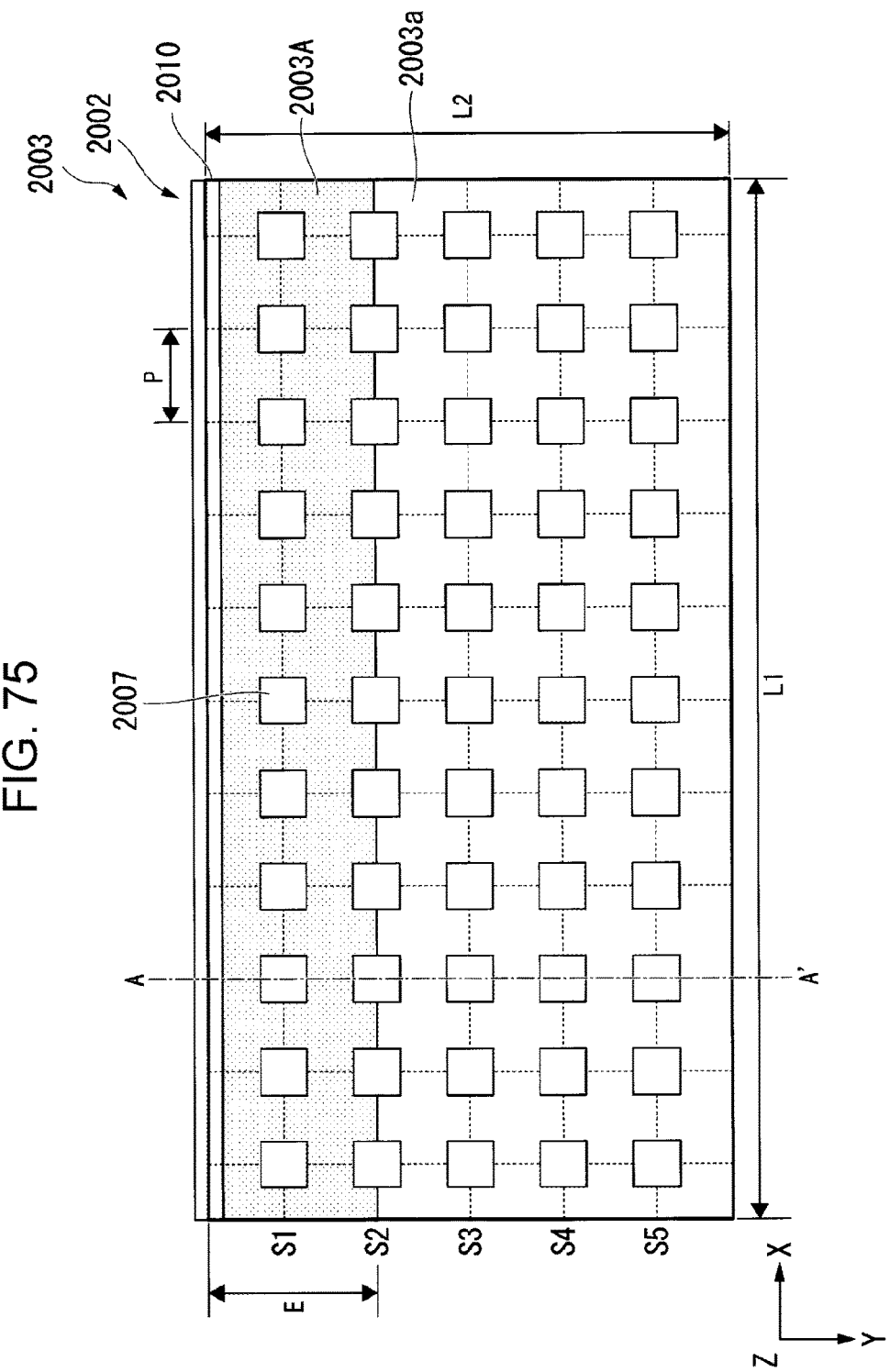
FIG. 75 is a plan view which shows a ceiling of the model of the room.

FIG. 74 is a view which shows a room model which is provided with a light collecting apparatus and a light adjusting system and a cross-sectional view taken along a line A-A' in FIG. 75. FIG. 75 is a plan view which shows a ceiling of a room model 2000.

In the room model 2000, the ceiling material which configures a ceiling 2003a of a room 2003 to which external light is introduced may have a high-level light reflecting property. As shown in FIG. 74 and FIG. 75, a ceiling material 2003A with a light reflecting property is installed on the ceiling 2003a of the room 2003 as the ceiling material with a light reflecting property. The ceiling material 2003A with a light reflecting property is for introducing the external light from a light collecting apparatus 2010 which is installed on a window 2002 to the far part of the room and is installed on the ceiling 2003a by the window. In detail, the ceiling material 2003a with a light reflecting property is installed in a predetermined region E (a region of approximately 3 m from the window 2002) of the ceiling 2003a.

As described above, the ceiling material 2003A with a light reflecting property functions to efficiently guide the external light which is introduced to the room via the window 2002, on which the light collecting apparatus 2010 (the light collecting apparatus of any of the embodiments described above) is installed, to the far part in the room. The external light which is introduced toward the ceiling 2003a in the room from the light collecting apparatus 2010 is reflected by the ceiling material 2003A with a light reflecting property, changes the orientation, and illuminates an upper surface 2005a of a desk 2005 which is placed in the back of the room. Due to this, an effect of brightening the upper surface 2005a of the desk is exhibited.

The ceiling material 2003A with a light reflecting property may have diffusion reflectivity or may have specular reflectivity. However, in order to have an effect of brightening the upper surface 2005a of the desk 2005 which is placed in the back of the room and an effect of suppressing glare light which is not comfortable for people in the room, both characteristics are preferably appropriately mixed.

In this manner, most of the light which is introduced to the room by the light collecting apparatus 2010 proceeds toward the ceiling in the vicinity of the window 2002; however, the amount of the light in the vicinity of the window 2002 is sufficient in many cases. For this reason, by using the ceiling material 2003A with a light reflecting property as described above therewith, it is possible to distribute the light which is incident to the ceiling (the region E) in the vicinity of the window toward the far part of the room where there is little light compared to by the window.

It is possible to produce the ceiling material 2003A with a light reflecting property, for example, by carrying out an embossing process using unevenness of approximately tens of microns in a metal board such as aluminum or depositing a thin film of metal such as aluminum on the front surface of a resin substrate formed with the same unevenness. Alternatively, the unevenness which is formed by the embossing process may be formed by a curved surface with a larger cycle.

Furthermore, by appropriately changing the embossing shape which is formed on the ceiling material 2003A with a light reflecting property, it is possible to control the light distribution characteristics or the distribution of the light in the room. For example, in a case of carrying out the embossing process in a stripe form which extends to the far part in the room, the light which is reflected by the ceiling material 2003A with a light reflecting property expands in the left and right direction (the direction which intersects with the longitudinal direction of the unevenness) of the window 2002. In a case where the size or the orientation of the window 2002 of the room 2003 is limited, using this property, it is possible to disperse the light in the horizontal direction using the ceiling material 2003A with a light reflecting property and reflect the light toward the far part in the room.

The light collecting apparatus 2010 is used as a part of the light adjusting system of the room 2003. The light adjusting system is configured by, for example, constituent members of the entire room which include the light collecting apparatus 2010, a plurality of indoor lighting apparatuses 2007, a solar adjusting apparatus 2008 which is installed on the window, a control system thereof, and the ceiling material 2003A with a light reflecting property which is installed on the ceiling 2003a.

The light collecting apparatus 2010 is installed on the upper side of the window 2002 of the room 2003 and the solar adjusting apparatus 2008 is installed on the lower side. Here, a blind is installed as the solar adjusting apparatus 2008; however, the present invention is not limited thereto.

The plurality of the indoor lighting apparatuses 2007 are arranged in the room 2003 in a lattice form in the left and right direction (the x direction) of the window 2002 and the length direction (the y direction) of the room. The plurality of the indoor lighting apparatuses 2007 configure the entire lighting system of the room 2003 with the light collecting apparatus 2010.

As shown in FIG. 74 and FIG. 75, for example, the ceiling 2003a of an office where the length $L_1$ in the horizontal direction (the x direction) of the window 2002 is 18 m and the length $L_2$ in the length direction (the y direction) of the room 2003 is 9 m is shown. Here, the indoor lighting apparatuses 2007 are each arranged in a lattice form at intervals P of 1.8 m in the horizontal direction (the x direction) of the ceiling 2003a and the length direction (the y direction).

In more detail, 50 of the indoor lighting apparatuses 2007 are arrayed in 10 lines (the x direction)×5 rows (the y direction).

The indoor lighting apparatuses 2007 are provided with an indoor lighting device 2007a, a brightness detecting section 2007b, and a control section 2007c and configured by the brightness detecting section 2007b and the control section 2007c being integrated in the indoor lighting device 2007a.

The indoor lighting apparatuses 2007 may each be provided with a plurality of the indoor lighting device 2007a and the brightness detecting sections 2007b. However, one brightness detecting section 2007b is provided with respect to each of the indoor lighting device 2007a. The brightness detecting section 2007b detects illumination of the target irradiation surface by receiving light of the reflected light of the target irradiation surface illuminated by the indoor lighting device 2007a. Here, the illumination of the upper surface 2005a of the desk 2005 which is placed in the room is detected by the brightness detecting section 200b.

The control sections 2007c, one of which is provided in each of the indoor lighting apparatuses 2007, are connected with each other. Each of the indoor lighting apparatuses 2007 performs feedback control which adjusts the output of light of an LED lamp of each of the indoor lighting device 2007a using the control sections 2007c which are connected with each other such that the illumination of the upper surface 2005a of a desk detected by each of the brightness detecting sections 2007b is a constant target illumination L0 (for example, average illumination: 750 lx).

Figure 76:
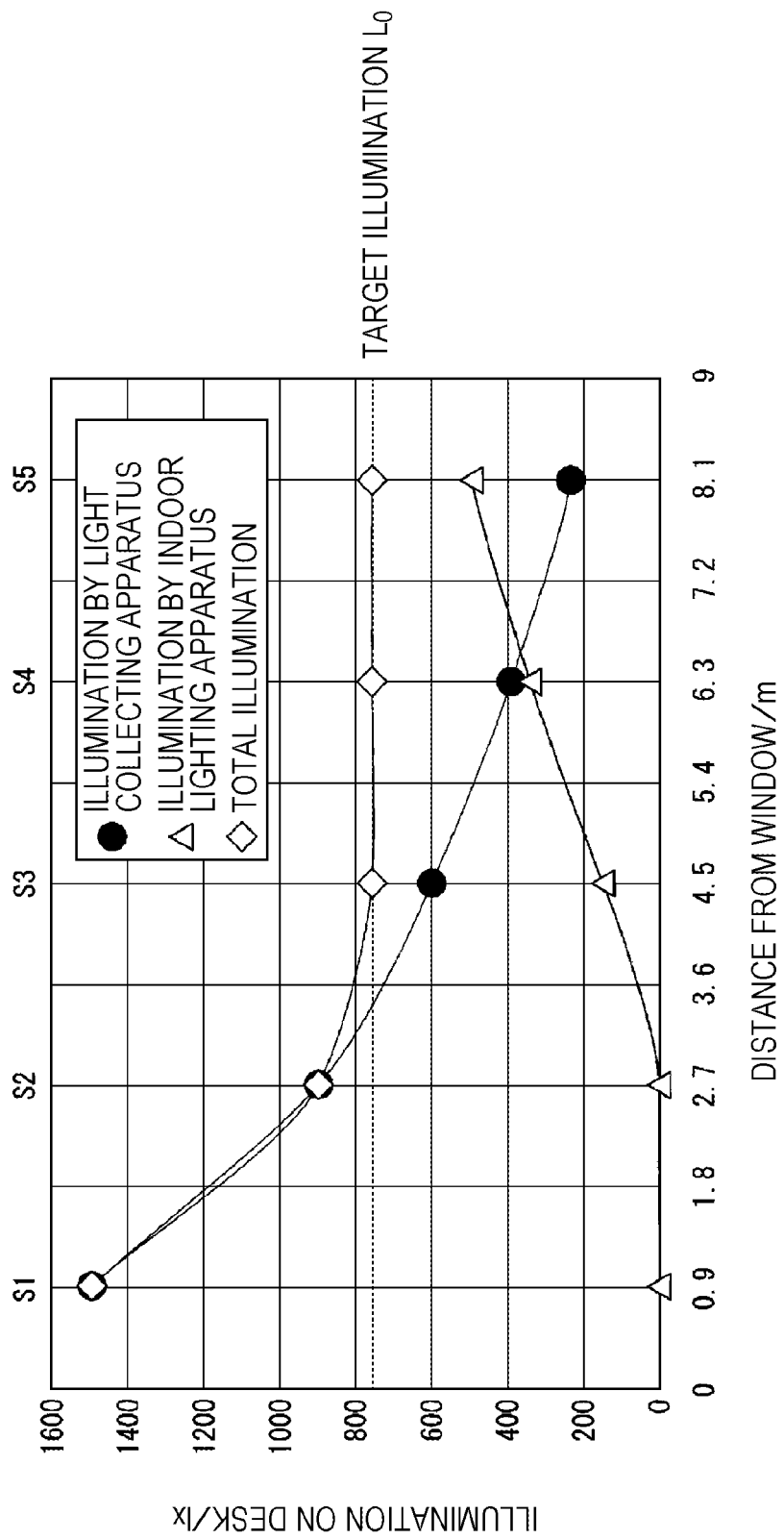
FIG. 76 is a graph which shows a relationship between illumination with light (natural light) which is collected in a room by a light collecting apparatus and illumination by an indoor lighting apparatus (a light adjusting system).

FIG. 76 is a graph which shows a relationship between illumination of light (natural light) which is collected in a room by a light collecting apparatus and illumination by an indoor lighting apparatus (a light adjusting system). In FIG. 76, the vertical axis shows the illumination (lx) of the upper surface of a desk and the horizontal axis shows the distance (m) from the window. In addition, the dotted line in the diagram shows the target illumination in the room. (●: Illumination by the light collecting apparatus, △: Illumination by the indoor lighting apparatus, ◇: Total illumination)

As shown in FIG. 76, the illumination of the upper surface of the desk which is created by the light which is collected by the light collecting apparatus 2010 is brighter in the vicinity of the window and the effect thereof is smaller further from the window. In the room where the light collecting apparatus 2010 is applied, the illumination is distributed in the far direction of the room using natural light collected from the window during the day. Thus, the light collecting apparatus 2010 is used with the indoor lighting apparatus 2007 which compensates for the illumination distribution in the room. The indoor lighting apparatus 2007 which is installed on the ceiling in the room detects the average illumination under each of the apparatuses using the brightness detecting section 2007b and provides light by adjusting and controlling the light such that the illumination of the upper surface of the desk in the entire room is the constant target illumination L0. Accordingly, the S1 row and S2 row which are installed in the vicinity of the window are mostly not turned on and the lights are turned on while increasing the output toward the far direction of the room in the S3 row, S4 row, and S5 row. As a result, the upper surface of the desk of the room is illuminated by the total amount of the illumination of the collected natural light and the illumination by the indoor lighting apparatuses 2007 and it is possible to realize 750 lx (the recommended maintained illumination in an office in "JIS Z9110 Rules for lighting levels"), which is the illumination of the upper surface of a desk, which is sufficient throughout the entire room during work.

As described above, by using the light collecting apparatus 2010 and the light adjusting system (the indoor lighting apparatus 2007) together, it is possible to distribute the light to the far part of the room and it is possible to further improve the brightness of the room and secure the illumination of the upper surface of a desk which is sufficient over the entire room during work. Accordingly, a more stable and brighter light environment is obtained without being affected by the season or the weather.

INDUSTRIAL APPLICABILITY

It is possible to use the present invention, for example, in a daylighting device for taking external light in a room and in a planar optical member which is used for the daylighting device.

REFERENCE SIGNS LIST

1, 33, 34, 35, 36, 41, 60, 64, 67, 70, 74, 79, 82, 89, 95, 96, 100, 101, 105, 124, 130, 140, 150, 160 planar optical member,
3, 8, 9, 10, 11, 12, 15, 16, 17, 18, 21, 22, 25, 26, 29, 30, 42, 44, 45, 48, 50, 51, 52, 68 linear body,
3C reflective surface,
3A, 3B refractive surface,
4, 75, 76, 83, 84 planar structure body,
5, 5A, 5B warp,
42M first portion,
42N second portion,
55, 57 linking linear body,
68H hole,
71 spacer,
88, 94, 99, 104, 112, 116, 120 daylighting device,
90, 106, 113 support member,
91 winding mechanism,
107 storing mechanism,
117 light shielding roll screen (light adjusting member),
121 blind light adjusting member),
125 tape (binding member),
134, 161, 164, 167, 171, 173, 175 binding member, 167R region.

The invention claimed is:

1. A planar optical member comprising:
a planar structure body comprising:
a plurality of linear bodies formed of optically transparent materials which are arrayed substantially in parallel, and
a plurality of binding members which are arranged in a direction which intersects with the plurality of the linear bodies and which bind the plurality of the linear bodies in a state of being arrayed substantially in parallel, the plurality of binding members fixing the plurality of linear bodies such that the plurality of linear bodies do not individually rotate,
wherein the linear bodies comprise
a reflective surface, which reflects light which is incident to the linear bodies along a direction which intersects with a length direction of the linear body, and
a refractive surface which refracts the light, and
in at least a part of the planar structure body,
orientations of the reflective surfaces of at least some of the linear bodies out of the plurality of the linear bodies substantially match, and
orientations of the refractive surfaces of at least some of the linear bodies out of the plurality of the linear bodies substantially match.

2. The planar optical member according to claim 1,
wherein the linear bodies comprise a first portion and a second portion at different positions in the length directions of the linear bodies,
a shape or dimensions of a cross-section of the first portion are different from a shape or dimensions of a cross-section of the second portion, and
the binding members are stretched over the second portions of the plurality of linear bodies to bind the plurality of linear bodies.

3. The planar optical member according to claim 1, wherein the plurality of the linear bodies include two or more types of linear bodies where cross-sectional shapes orthogonal to a length direction are different from each other.

4. A planar optical member comprising:
a planar structure body comprising:
a plurality of linear bodies formed of optically transparent materials which are arrayed substantially in parallel, and
a plurality of binding members which are arranged in a direction which intersects with the plurality of the linear bodies and which bind the plurality of the linear bodies in a state of being arrayed substantially in parallel, the plurality of binding members fixing the plurality of linear bodies such that the plurality of linear bodies do not individually rotate,
wherein the linear bodies comprise
a reflective surface, which reflects light which is incident to the linear bodies along a direction which intersects with a length direction of the linear body, and
a refractive surface which refracts the light,
in at least a part of the planar structure body,
orientations of the reflective surfaces of at least some of the linear bodies out of the plurality of the linear bodies substantially match, and
orientations of the refractive surfaces of at least some of the linear bodies out of the plurality of the linear bodies substantially match, and
some of the linear bodies out of the plurality of the linear bodies comprise a linking section configured to integrally links the linear bodies which are adjacent to each other.

5. The planar optical member according to claim 4, further comprising:
a plurality of the planar structure bodies,
wherein the plurality of the planar structure bodies are laminated in a direction which is orthogonal to a main surface.

6. The planar optical member according to claim 4, further comprising:

a linear light shielding member which is arranged substantially in parallel to the linear bodies in at least a part of at least one of the planar structure bodies out of the plurality of the planar structure bodies.

7. The planar optical member according to claim 4, wherein a shape of a cross-section which is orthogonal to a length direction of the linear bodies is any one of substantially triangular, substantially quadrangular, and substantially pentagonal.

8. The planar optical member according to claim 4, wherein the binding members have a light scattering and emitting characteristic, and
the binding members comprise a plurality of regions which comprise a different refractive index from peripheral regions.

9. The planar optical member according to claim 4, wherein an interval between the binding members which are adjacent to each other is equal to or less than a width dimension in a direction which intersects with a length direction of the linear bodies.

10. The planar optical member according to claim 4, wherein the planar optical member comprises a shape in which a thickness of the binding members is thinner than a thickness of the linear bodies.

11. The planar optical member according to claim 4, wherein the binding members comprise a cross-sectional shape in a direction which intersects with a length direction which has a long axis and a short axis, and
the long axis is in contact with the linear body with an orientation along a length direction of the linear bodies.

12. The planar optical member according to claim 4, wherein the binding members comprise a plurality of regions which are lined up in a direction which intersects with a length direction.

13. The planar optical member according to claim 4, wherein the binding members comprise a plurality of linear members.

14. The planar optical member according to claim 13, wherein, in the binding member formed of the plurality of the linear members, a number of the linear members which are present on an optical path of light which is incident to the binding member is smaller than a number of the linear members which are lined up in a length direction of the linear body.

15. The planar optical member according to claim 4, wherein the planar optical member is allocated on a surface on which another planar optical member is allocated.

16. The planar optical member according to claim 4, further comprising:
a winding mechanism configured to wind the planar optical member in and out.

17. The planar optical member according to claim 4, further comprising:
a light adjusting member configured to adjusts an amount of light which is incident from outside on the same surface as a main surface of the planar optical member.

18. A daylighting device comprising:
a planar optical member; and
a support member which supports the planar optical member,
wherein external light is taken in through the planar optical member,
wherein the planar optical member comprises:
a planar structure body which comprises:
a plurality of linear bodies formed of optically transparent materials which are arrayed substantially in parallel, and
a plurality of binding members which are arranged in a direction which intersects with the plurality of the linear bodies and which bind the plurality of the linear bodies in a state of being arrayed substantially in parallel, the plurality of binding members fixing the plurality of linear bodies such that the plurality of linear bodies do not individually rotate,
wherein the linear bodies comprise
a reflective surface, which reflects light which is incident to the linear bodies along a direction which intersects with a length direction of the linear body, and
a refractive surface which refracts the light,
in at least a part of the planar structure body,
orientations of the reflective surfaces of at least some of the linear bodies out of the plurality of the linear bodies substantially match, and
orientations of the refractive surfaces of at least some of the linear bodies out of the plurality of the linear bodies substantially match.

19. The daylighting device according to claim 18, further comprising:
a winding mechanism configured to wind the planar optical member in and out.

20. The daylighting device according to claim 18, further comprising:
a light adjusting member configured to adjust an amount of light which is incident from outside on the same surface as a main surface of the planar optical member.

* * * * *